(12) United States Patent
Okamoto et al.

(10) Patent No.: US 8,905,844 B2
(45) Date of Patent: Dec. 9, 2014

(54) STORAGE MEDIUM STORING LOAD DETECTING PROGRAM AND LOAD DETECTING APPARATUS

(75) Inventors: Motoi Okamoto, Kyoto (JP); Shigehiro Kasamatsu, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1244 days.

(21) Appl. No.: 12/230,922

(22) Filed: Sep. 8, 2008

(65) Prior Publication Data

US 2009/0094442 A1    Apr. 9, 2009

(30) Foreign Application Priority Data

Oct. 5, 2007    (JP) ................... 2007-261798

(51) Int. Cl.
  *A63F 13/02*  (2006.01)
  *A63F 13/20*  (2014.01)
  *A63F 13/40*  (2014.01)

(52) U.S. Cl.
  CPC .............. *A63F 13/06* (2013.01); *A63F 13/10* (2013.01); *A63F 2300/1043* (2013.01); *A63F 2300/1068* (2013.01); *A63F 2300/305* (2013.01); *A63F 2300/6045* (2013.01); *A63F 2300/638* (2013.01); *A63F 2300/69* (2013.01)
  USPC .......................................................... 463/36

(58) Field of Classification Search
  CPC .................. A63F 2300/1062; A63F 2300/1068
  USPC ............... 463/3, 16, 20, 35–37, 40, 7, 39; 273/138.1, 138.2, 139, 141 A, 141 R, 273/142 A, 142 B, 142 C, 142 H, 142 HA, 273/460–461; 345/475, 606; 472/15; 473/451–452; 482/1, 9, 54, 70, 78, 91, 482/121, 140; 725/38, 40, 133, 141, 153
  See application file for complete search history.

(56) References Cited

U.S. PATENT DOCUMENTS 588,172 A    8/1897  Peters
688,076 A   12/1901  Ensign
(Continued)

FOREIGN PATENT DOCUMENTS

DE    40 04 554    8/1991
DE   195 02 918    8/1996
(Continued)

OTHER PUBLICATIONS

Interface, Inc.—Advanced Force Measurement—SM Calibration Certificate Installation Information, 1984.
(Continued)

*Primary Examiner* — Damon Pierce
*Assistant Examiner* — Allen Chan
(74) *Attorney, Agent, or Firm* — Nixon & Vanderhye, P.C.

(57) ABSTRACT

A load detecting apparatus includes a load controller, and judges a motion of a player on the basis of detected load values. Judgment timing for a motion of putting the feet on and down from the controller is decided on the basis of an elapsed time from an instruction of a motion. In a case that a step-up-and-down exercise is performed, a judgment timing of a motion for bringing about a state both of the feet are put down on a ground at a fourth step is decided on the basis of a judgment timing of a motion of putting a third step down.

18 Claims, 21 Drawing Sheets

(56) References Cited

U.S. PATENT DOCUMENTS

| | | |
|---|---|---|
| D188,376 S | 7/1960 | Hotkins et al. |
| 3,184,962 A | 5/1965 | Gay |
| 3,217,536 A | 11/1965 | Motsinger et al. |
| 3,424,005 A | 1/1969 | Brown |
| 3,428,312 A | 2/1969 | Machen |
| 3,712,294 A | 1/1973 | Muller |
| 3,752,144 A | 8/1973 | Weigle, Jr. |
| 3,780,817 A | 12/1973 | Videon |
| 3,826,145 A | 7/1974 | McFarland |
| 3,869,007 A | 3/1975 | Haggstrom et al. |
| 4,058,178 A | 11/1977 | Shinohara et al. |
| 4,104,119 A | 8/1978 | Schilling |
| 4,136,682 A | 1/1979 | Pedotti |
| 4,246,783 A | 1/1981 | Steven et al. |
| 4,296,931 A | 10/1981 | Yokoi |
| 4,337,050 A | 6/1982 | Engalitcheff, Jr. |
| 4,404,854 A | 9/1983 | Krempl et al. |
| 4,488,017 A | 12/1984 | Lee |
| 4,494,754 A | 1/1985 | Wagner, Jr. |
| 4,558,757 A | 12/1985 | Mori et al. |
| 4,569,519 A | 2/1986 | Mattox et al. |
| 4,574,899 A | 3/1986 | Griffin |
| 4,577,868 A | 3/1986 | Kiyonaga |
| 4,598,717 A | 7/1986 | Pedotti |
| 4,607,841 A | 8/1986 | Gala |
| 4,630,817 A | 12/1986 | Buckley |
| 4,660,828 A | 4/1987 | Weiss |
| 4,680,577 A | 7/1987 | Straayer et al. |
| 4,688,444 A | 8/1987 | Nordstrom |
| 4,691,694 A | 9/1987 | Boyd et al. |
| 4,711,447 A | 12/1987 | Mansfield |
| 4,726,435 A | 2/1988 | Kitagawa et al. |
| 4,739,848 A | 4/1988 | Tulloch |
| 4,742,832 A | 5/1988 | Kauffmann et al. |
| 4,742,932 A | 5/1988 | Pedragosa |
| 4,800,973 A | 1/1989 | Angel |
| 4,838,173 A | 6/1989 | Schroeder et al. |
| 4,855,704 A | 8/1989 | Betz |
| 4,880,069 A | 11/1989 | Bradley |
| 4,882,677 A | 11/1989 | Curran |
| 4,893,514 A | 1/1990 | Gronert et al. |
| 4,907,797 A | 3/1990 | Gezari et al. |
| 4,927,138 A | 5/1990 | Ferrari |
| 4,970,486 A | 11/1990 | Gray et al. |
| 4,982,613 A | 1/1991 | Becker |
| D318,073 S | 7/1991 | Jang |
| 5,044,956 A | 9/1991 | Behensky et al. |
| 5,049,079 A | 9/1991 | Furtado et al. |
| 5,052,406 A | 10/1991 | Nashner |
| 5,054,771 A | 10/1991 | Mansfield |
| 5,065,631 A | 11/1991 | Ashpitel et al. |
| 5,076,584 A * | 12/1991 | Openiano ................. 463/36 |
| 5,089,960 A | 2/1992 | Sweeney, Jr. |
| 5,103,207 A | 4/1992 | Kerr et al. |
| 5,104,119 A | 4/1992 | Lynch |
| 5,116,296 A | 5/1992 | Watkins et al. |
| 5,118,112 A | 6/1992 | Bregman et al. |
| 5,151,071 A | 9/1992 | Jain et al. |
| 5,195,746 A | 3/1993 | Boyd et al. |
| 5,197,003 A | 3/1993 | Moncrief et al. |
| 5,199,875 A | 4/1993 | Trumbull |
| 5,203,563 A | 4/1993 | Loper, III |
| 5,207,426 A | 5/1993 | Inoue et al. |
| 5,259,252 A | 11/1993 | Kruse et al. |
| 5,269,318 A | 12/1993 | Nashner |
| 5,299,810 A | 4/1994 | Pierce et al. |
| 5,303,715 A | 4/1994 | Nashner et al. |
| 5,360,383 A | 11/1994 | Boren |
| 5,362,298 A | 11/1994 | Brown et al. |
| 5,368,546 A | 11/1994 | Stark et al. |
| 5,405,152 A | 4/1995 | Katanics et al. |
| 5,431,569 A | 7/1995 | Simpkins et al. |
| 5,462,503 A | 10/1995 | Benjamin et al. |
| 5,466,200 A | 11/1995 | Ulrich et al. |
| 5,469,740 A | 11/1995 | French et al. |
| 5,474,087 A | 12/1995 | Nashner |
| 5,476,103 A | 12/1995 | Nahsner |
| 5,507,708 A | 4/1996 | Ma |
| 5,541,621 A | 7/1996 | Nmngani |
| 5,541,622 A | 7/1996 | Engle et al. |
| 5,547,439 A | 8/1996 | Rawls et al. |
| 5,551,445 A | 9/1996 | Nashner |
| 5,551,693 A | 9/1996 | Goto et al. |
| 5,577,981 A | 11/1996 | Jarvik |
| D376,826 S | 12/1996 | Ashida |
| 5,584,700 A | 12/1996 | Feldman et al. |
| 5,584,779 A | 12/1996 | Knecht et al. |
| 5,591,104 A | 1/1997 | Andrus et al. |
| 5,613,690 A | 3/1997 | McShane et al. |
| 5,623,944 A | 4/1997 | Nashner |
| 5,627,327 A | 5/1997 | Zanakis |
| D384,115 S | 9/1997 | Wilkinson et al. |
| 5,669,773 A | 9/1997 | Gluck |
| 5,689,285 A | 11/1997 | Asher |
| 5,690,582 A | 11/1997 | Ulrich et al. |
| 5,697,791 A | 12/1997 | Nashner et al. |
| 5,713,794 A | 2/1998 | Shimojima et al. |
| 5,721,566 A | 2/1998 | Rosenberg et al. |
| 5,746,684 A | 5/1998 | Jordan |
| 5,785,630 A | 7/1998 | Bobick et al. |
| D397,164 S | 8/1998 | Goto |
| 5,788,618 A | 8/1998 | Joutras |
| 5,792,031 A | 8/1998 | Alton |
| 5,800,314 A | 9/1998 | Sakakibara et al. |
| 5,805,138 A | 9/1998 | Brawne et al. |
| 5,813,958 A | 9/1998 | Tomita |
| 5,814,740 A | 9/1998 | Cook et al. |
| 5,820,462 A | 10/1998 | Yokoi et al. |
| 5,825,308 A | 10/1998 | Rosenberg |
| 5,837,952 A | 11/1998 | Oshiro et al. |
| D402,317 S | 12/1998 | Goto |
| 5,846,086 A | 12/1998 | Bizzi et al. |
| 5,853,326 A | 12/1998 | Goto et al. |
| 5,854,622 A | 12/1998 | Brannon |
| 5,860,861 A | 1/1999 | Lipps et al. |
| 5,864,333 A | 1/1999 | O'Heir |
| 5,872,438 A | 2/1999 | Roston |
| 5,886,302 A | 3/1999 | Germanton et al. |
| 5,888,172 A | 3/1999 | Andrus et al. |
| 5,889,507 A | 3/1999 | Engle et al. |
| D407,758 S | 4/1999 | Isetani et al. |
| 5,890,995 A | 4/1999 | Bobick et al. |
| 5,897,457 A | 4/1999 | Mackovjak |
| 5,897,469 A | 4/1999 | Yalch |
| 5,901,612 A | 5/1999 | Letovsky |
| 5,902,214 A | 5/1999 | Makikawa et al. |
| 5,904,639 A | 5/1999 | Smyser et al. |
| D411,258 S | 6/1999 | Isetani et al. |
| 5,912,659 A | 6/1999 | Rutledge et al. |
| 5,919,092 A | 7/1999 | Yokoi et al. |
| 5,921,780 A | 7/1999 | Myers |
| 5,921,899 A | 7/1999 | Rose |
| 5,929,782 A | 7/1999 | Stark et al. |
| 5,947,824 A | 9/1999 | Minami et al. |
| 5,976,063 A | 11/1999 | Joutras et al. |
| 5,980,256 A | 11/1999 | Carmein |
| 5,980,429 A | 11/1999 | Nashner |
| 5,984,785 A | 11/1999 | Takeda et al. |
| 5,987,982 A | 11/1999 | Wenman et al. |
| 5,989,157 A | 11/1999 | Walton |
| 5,993,356 A | 11/1999 | Houston et al. |
| 5,997,439 A | 12/1999 | Ohsuga et al. |
| 6,001,015 A | 12/1999 | Nishiumi et al. |
| 6,007,428 A | 12/1999 | Nishiumi et al. |
| 6,010,465 A | 1/2000 | Nashner |
| D421,070 S | 2/2000 | Jang et al. |
| 6,037,927 A | 3/2000 | Rosenberg |
| 6,038,488 A | 3/2000 | Barnes et al. |
| 6,044,772 A | 4/2000 | Gaudette et al. |
| 6,063,046 A | 5/2000 | Allum |
| 6,086,518 A | 7/2000 | MacCready, Jr. |
| 6,102,803 A | 8/2000 | Takeda et al. |
| 6,102,832 A | 8/2000 | Tani |
| D431,051 S | 9/2000 | Goto |

(56) References Cited

U.S. PATENT DOCUMENTS

| | | |
|---|---|---|
| 6,113,237 A | 9/2000 | Ober et al. |
| 6,147,674 A | 11/2000 | Rosenberg et al. |
| 6,152,564 A | 11/2000 | Ober et al. |
| D434,769 S | 12/2000 | Goto |
| D434,770 S | 12/2000 | Goto |
| 6,155,926 A | 12/2000 | Miyamoto et al. |
| 6,162,189 A | 12/2000 | Girone et al. |
| 6,167,299 A | 12/2000 | Galchenkov et al. |
| 6,190,287 B1 | 2/2001 | Nashner |
| 6,200,253 B1 | 3/2001 | Nishiumi et al. |
| 6,203,432 B1 | 3/2001 | Roberts et al. |
| 6,216,542 B1 | 4/2001 | Stockli et al. |
| 6,216,547 B1 | 4/2001 | Lehtovaara |
| 6,220,865 B1 | 4/2001 | Macri et al. |
| D441,369 S | 5/2001 | Goto |
| 6,225,977 B1 | 5/2001 | Li |
| 6,227,968 B1 | 5/2001 | Suzuki et al. |
| 6,228,000 B1 | 5/2001 | Jones |
| 6,231,444 B1 | 5/2001 | Goto |
| 6,239,806 B1 | 5/2001 | Nishiumi et al. |
| 6,241,611 B1 | 6/2001 | Takeda et al. |
| 6,244,987 B1 | 6/2001 | Ohsuga et al. |
| D444,469 S | 7/2001 | Goto |
| 6,264,558 B1 | 7/2001 | Nishiumi et al. |
| 6,280,361 B1 | 8/2001 | Harvey et al. |
| D447,968 S | 9/2001 | Pagnacco et al. |
| 6,295,878 B1 | 10/2001 | Berme |
| 6,296,595 B1 | 10/2001 | Stark et al. |
| 6,325,718 B1 | 12/2001 | Nishiumi et al. |
| 6,330,837 B1 | 12/2001 | Charles et al. |
| 6,336,891 B1 | 1/2002 | Fedrigon et al. |
| 6,353,427 B1 | 3/2002 | Rosenberg |
| 6,354,155 B1 | 3/2002 | Berme |
| 6,357,827 B1 | 3/2002 | Brightbill et al. |
| 6,359,613 B1 | 3/2002 | Poole |
| D456,410 S | 4/2002 | Ashida |
| D456,854 S | 5/2002 | Ashida |
| D457,570 S | 5/2002 | Brinson |
| 6,387,061 B1 | 5/2002 | Nitto |
| 6,388,655 B1 | 5/2002 | Leung |
| 6,389,883 B1 | 5/2002 | Berme et al. |
| 6,394,905 B1 | 5/2002 | Takeda et al. |
| 6,402,635 B1 | 6/2002 | Nesbit et al. |
| D459,727 S | 7/2002 | Ashida |
| D460,506 S | 7/2002 | Tamminga et al. |
| 6,421,056 B1 | 7/2002 | Nishiumi et al. |
| 6,436,058 B1 | 8/2002 | Krahner et al. |
| D462,683 S | 9/2002 | Ashida |
| 6,450,886 B1 * | 9/2002 | Oishi et al. ................ 463/36 |
| 6,454,679 B1 | 9/2002 | Radow |
| 6,461,297 B1 | 10/2002 | Pagnacco et al. |
| 6,470,302 B1 | 10/2002 | Cunningham et al. |
| 6,482,010 B1 | 11/2002 | Marcus et al. |
| 6,510,749 B1 | 1/2003 | Pagnacco et al. |
| 6,514,145 B1 | 2/2003 | Kawabata et al. |
| 6,515,593 B1 | 2/2003 | Stark et al. |
| 6,516,221 B1 | 2/2003 | Hirouchi et al. |
| D471,594 S | 3/2003 | Nojo |
| 6,543,769 B1 | 4/2003 | Podoloff et al. |
| 6,563,059 B2 | 5/2003 | Lee |
| 6,568,334 B1 | 5/2003 | Gaudette et al. |
| 6,616,579 B1 | 9/2003 | Reinbold et al. |
| 6,624,802 B1 | 9/2003 | Klein et al. |
| 6,632,158 B1 | 10/2003 | Nashner |
| 6,636,161 B2 | 10/2003 | Rosenberg |
| 6,636,197 B1 | 10/2003 | Goldenberg et al. |
| 6,638,175 B2 | 10/2003 | Lee et al. |
| 6,663,058 B1 | 12/2003 | Peterson et al. |
| 6,676,520 B2 | 1/2004 | Nishiumi et al. |
| 6,676,569 B1 | 1/2004 | Radow |
| 6,679,776 B1 | 1/2004 | Nishiumi et al. |
| 6,685,480 B2 * | 2/2004 | Nishimoto et al. ........... 434/247 |
| 6,695,694 B2 * | 2/2004 | Ishikawa et al. ................ 463/7 |
| 6,697,049 B2 | 2/2004 | Lu |
| 6,719,667 B2 | 4/2004 | Wong et al. |
| 6,726,566 B2 | 4/2004 | Komata |
| 6,764,429 B1 | 7/2004 | Michalow |
| 6,797,894 B2 | 9/2004 | Montagnino et al. |
| 6,811,489 B1 | 11/2004 | Shimizu et al. |
| 6,813,966 B2 | 11/2004 | Dukart |
| 6,817,973 B2 | 11/2004 | Merril et al. |
| D500,100 S | 12/2004 | Van Der Meer |
| 6,846,270 B1 | 1/2005 | Etnyre |
| 6,859,198 B2 | 2/2005 | Onodera et al. |
| 6,872,139 B2 | 3/2005 | Sato et al. |
| 6,872,187 B1 | 3/2005 | Stark et al. |
| 6,888,076 B2 | 5/2005 | Hetherington |
| 6,913,559 B2 | 7/2005 | Smith |
| 6,936,016 B2 | 8/2005 | Berme et al. |
| D510,391 S | 10/2005 | Merril et al. |
| 6,975,302 B1 | 12/2005 | Ausbeck, Jr. |
| 6,978,684 B2 | 12/2005 | Nurse |
| 6,991,483 B1 | 1/2006 | Milan et al. |
| D514,627 S | 2/2006 | Merril et al. |
| 7,004,787 B2 | 2/2006 | Milan |
| D517,124 S | 3/2006 | Merril et al. |
| 7,011,605 B2 | 3/2006 | Shields |
| 7,033,176 B2 | 4/2006 | Feldman et al. |
| 7,038,855 B2 | 5/2006 | French et al. |
| 7,040,986 B2 | 5/2006 | Koshima et al. |
| 7,070,542 B2 | 7/2006 | Reyes et al. |
| 7,083,546 B2 | 8/2006 | Zillig et al. |
| 7,100,439 B2 | 9/2006 | Carlucci |
| 7,121,982 B2 | 10/2006 | Feldman |
| 7,126,584 B1 | 10/2006 | Nishiumi et al. |
| 7,127,376 B2 | 10/2006 | Nashner |
| 7,163,516 B1 | 1/2007 | Pagnacco et al. |
| 7,179,234 B2 | 2/2007 | Nashner |
| 7,195,355 B2 | 3/2007 | Nashner |
| 7,202,424 B2 | 4/2007 | Carlucci |
| 7,202,851 B2 | 4/2007 | Cunningham et al. |
| 7,270,630 B1 | 9/2007 | Patterson |
| 7,307,619 B2 | 12/2007 | Cunningham et al. |
| 7,308,831 B2 | 12/2007 | Cunningham et al. |
| 7,331,226 B2 | 2/2008 | Feldman et al. |
| 7,335,134 B1 | 2/2008 | Lavelle |
| RE40,427 E | 7/2008 | Nashner |
| 7,416,537 B1 | 8/2008 | Stark et al. |
| 7,530,929 B2 | 5/2009 | Feldman et al. |
| 7,722,501 B2 | 5/2010 | Nicolas et al. |
| 7,938,751 B2 | 5/2011 | Nicolas et al. |
| 8,075,449 B2 * | 12/2011 | Lee ................................ 482/8 |
| 2001/0001303 A1 | 5/2001 | Ohsuga et al. |
| 2001/0007825 A1 * | 7/2001 | Harada et al. ................... 463/7 |
| 2001/0018363 A1 | 8/2001 | Goto et al. |
| 2001/0050683 A1 | 12/2001 | Ishikawa et al. |
| 2002/0055422 A1 | 5/2002 | Airmet et al. |
| 2002/0080115 A1 | 6/2002 | Onodera et al. |
| 2002/0185041 A1 | 12/2002 | Herbst |
| 2003/0054327 A1 | 3/2003 | Evensen |
| 2003/0069108 A1 | 4/2003 | Kaiserman et al. |
| 2003/0107502 A1 | 6/2003 | Alexander |
| 2003/0176770 A1 | 9/2003 | Merril et al. |
| 2003/0193416 A1 | 10/2003 | Ogata et al. |
| 2004/0038786 A1 | 2/2004 | Kuo et al. |
| 2004/0041787 A1 | 3/2004 | Graves |
| 2004/0077464 A1 | 4/2004 | Feldman et al. |
| 2004/0099513 A1 | 5/2004 | Hetherington |
| 2004/0110602 A1 | 6/2004 | Feldman |
| 2004/0127337 A1 | 7/2004 | Nashner |
| 2004/0147317 A1 * | 7/2004 | Ito et al. ........................ 463/36 |
| 2004/0163855 A1 | 8/2004 | Carlucci |
| 2004/0180719 A1 | 9/2004 | Feldman et al. |
| 2004/0259688 A1 | 12/2004 | Stabile |
| 2005/0070154 A1 | 3/2005 | Milan |
| 2005/0076161 A1 | 4/2005 | Albanna et al. |
| 2005/0130742 A1 | 6/2005 | Feldman et al. |
| 2005/0202384 A1 | 9/2005 | DiCuccio et al. |
| 2006/0097453 A1 | 5/2006 | Feldman et al. |
| 2006/0161045 A1 | 7/2006 | Merril et al. |
| 2006/0205565 A1 | 9/2006 | Feldman et al. |
| 2006/0211543 A1 | 9/2006 | Feldman et al. |
| 2006/0217233 A1 * | 9/2006 | Lee ................................ 482/9 |
| 2006/0217243 A1 | 9/2006 | Feldman et al. |

(56) References Cited

U.S. PATENT DOCUMENTS

| | | |
|---|---|---|
| 2006/0223634 A1 | 10/2006 | Feldman et al. |
| 2006/0258512 A1 | 11/2006 | Nicolas et al. |
| 2007/0021279 A1 | 1/2007 | Jones |
| 2007/0027369 A1 | 2/2007 | Pagnacco et al. |
| 2007/0155589 A1 | 7/2007 | Feldman et al. |
| 2007/0219050 A1 | 9/2007 | Merril |
| 2008/0012826 A1 | 1/2008 | Cunningham et al. |
| 2008/0228110 A1 | 9/2008 | Berme |
| 2008/0261696 A1 | 10/2008 | Yamazaki et al. |
| 2009/0093315 A1 | 4/2009 | Matsunaga et al. |

FOREIGN PATENT DOCUMENTS

| | | |
|---|---|---|
| DE | 297 12 785 | 1/1998 |
| DE | 20 2004 021 792 U1 | 5/2011 |
| DE | 20 2004 021 793 U1 | 5/2011 |
| EP | 0 275 665 | 7/1988 |
| EP | 0 299 738 | 1/1989 |
| EP | 0 335 045 | 10/1989 |
| EP | 0 519 836 | 12/1992 |
| EP | 1 043 746 A1 | 10/2000 |
| EP | 1 120 083 A2 | 8/2001 |
| EP | 1 127 599 A2 | 8/2001 |
| EP | 1 870 141 | 12/2007 |
| FR | 2 472 929 | 7/1981 |
| FR | 2 587 611 | 3/1987 |
| FR | 2 604 910 | 4/1988 |
| FR | 2 647 331 | 11/1990 |
| FR | 2 792 182 | 10/2000 |
| FR | 2 801 490 | 6/2001 |
| FR | 2 811 753 | 1/2002 |
| FR | 2 906 365 | 3/2008 |
| GB | 1 209 954 | 10/1970 |
| GB | 2 288 550 | 10/1995 |
| JP | 44-23551 | 10/1969 |
| JP | 55-95758 | 12/1978 |
| JP | 54-73689 | 6/1979 |
| JP | 55-113472 | 9/1980 |
| JP | 55-113473 | 9/1980 |
| JP | 55-125369 | 9/1980 |
| JP | 55-149822 | 11/1980 |
| JP | 55-152431 | 11/1980 |
| JP | 60-79460 | 6/1985 |
| JP | 60-153159 | 10/1985 |
| JP | 61-154689 | 7/1986 |
| JP | 62-34016 | 2/1987 |
| JP | 62-034016 | 2/1987 |
| JP | 63-158311 | 10/1988 |
| JP | 63-163855 | 10/1988 |
| JP | 63-193003 | 12/1988 |
| JP | 02-102651 | 4/1990 |
| JP | 2-238327 | 9/1990 |
| JP | 3-25325 | 2/1991 |
| JP | 3-103272 | 4/1991 |
| JP | 03-107959 | 11/1991 |
| JP | 6-063198 | 3/1994 |
| JP | 6-282373 | 10/1994 |
| JP | 7-213741 | 8/1995 |
| JP | 7-213745 | 8/1995 |
| JP | 07-239957 | 9/1995 |
| JP | 7-241281 | 9/1995 |
| JP | 7-241282 | 9/1995 |
| JP | 7-275307 | 10/1995 |
| JP | 7-302161 | 11/1995 |
| JP | 8-43182 | 2/1996 |
| JP | 08-131594 | 5/1996 |
| JP | 8-182774 | 7/1996 |
| JP | 08-182774 | 7/1996 |
| JP | 08-184474 | 7/1996 |
| JP | 8-184474 | 7/1996 |
| JP | 8-215176 | 8/1996 |
| JP | 08-244691 | 9/1996 |
| JP | 2576247 | 1/1997 |
| JP | 9-120464 | 5/1997 |
| JP | 9-168529 | 6/1997 |
| JP | 9-197951 | 7/1997 |
| JP | 9-305099 | 11/1997 |
| JP | 11-309270 | 11/1999 |
| JP | 2000-146679 | 5/2000 |
| JP | U3068681 | 5/2000 |
| JP | U3069287 | 6/2000 |
| JP | 2000-254348 | 9/2000 |
| JP | 3172738 | 6/2001 |
| JP | 2001-178845 | 7/2001 |
| JP | 2001-178965 | 7/2001 |
| JP | 2001-286451 | 10/2001 |
| JP | 2002-017934 | 1/2002 |
| JP | 2002-112984 | 4/2002 |
| JP | 2002-157081 | 5/2002 |
| JP | 2002-253534 | 9/2002 |
| JP | 2003-79599 | 3/2003 |
| JP | 2003-235834 | 8/2003 |
| JP | 2004-216142 | 8/2004 |
| JP | 2005-168963 | 6/2005 |
| JP | 3722678 | 11/2005 |
| JP | 2005-334083 | 12/2005 |
| JP | 2006-110211 | 4/2006 |
| JP | 3773455 | 5/2006 |
| JP | 2006-167094 | 6/2006 |
| JP | 3818488 | 9/2006 |
| JP | 2006-284539 | 10/2006 |
| JP | U3128216 | 12/2006 |
| JP | 2008-49117 | 3/2008 |
| WO | WO 91/11221 | 8/1991 |
| WO | WO 92/12768 | 8/1992 |
| WO | WO 98/40843 | 9/1998 |
| WO | WO 00/12041 | 3/2000 |
| WO | WO 00/57387 | 9/2000 |
| WO | WO 00/69523 | 11/2000 |
| WO | WO 02/29375 | 4/2002 |
| WO | WO 02/057885 | 7/2002 |
| WO | WO 2004/051201 | 6/2004 |
| WO | WO 2004/053629 | 6/2004 |
| WO | WO 2005/043322 | 5/2005 |
| WO | WO 2008/099582 | 8/2008 |

OTHER PUBLICATIONS

Hugh Stewart, "Isometric Joystick: A Study of Control by Adolescents and Young Adults with Cerebral Palsy," The Australian Occupational Therapy Journal, Mar. 1992, vol. 39, No. 1, pp. 33-39.

Raghavendra S, Rao, et al., "Evaluation of an Isometric and a Position Joystick in a Target Acquisition Task for Individuals with Cerebral Palsy," IEEE Transactions on Rehabilitation Engineering, vol. 8, No. 1, Mar. 2000, pp. 118-125.

D. Sengupta, et al., "Comparative Evaluation of Control Surfaces for Disabled Patients,"Proceedings of the 27th Annual Conference on Engineering in Medicine and Biology, vol. 16, Oct. 6-10, 1974, p. 356.

Ian Bogost, "The Rhetoric of Exergaming,"The Georgia Institute of Technology, 9 pages (date unknown).

Ludonauts, "Body Movin'," May 24, 2004, http://web.archive.org/web/20040611131903/http:/www.ludonauts.com; retrieved Aug. 31, 2010, 4 pages.

Atari Gaming Headquarters—AGH's Atari Project Puffer Page, http://www.atarihq.com/othersec/puffer/index.html, retrieved Sep. 19, 2002, 4 pages.

Michael Antonoff, "Real estate is cheap here, but the places you'd most want to visit are still under construction," Popular Science, Jun. 1993, pp. 33-34.

Steve Aukstakalnis and David Blatner, "The Art and Science of Virtual Reality—Silicon Mirage," 1992, pp. 197-207.

Electronics, edited by Michael Antonoff, "Video Gaines—Virtual Violence: Boxing Without Bruises," Popular Science, Apr. 1993, p. 60.

Stuart F. Brown, "Video cycle race," Popular Science, May 1989, p. 73.

Scanning the Field for Ideas, "Chair puts Player on the Joystick," Machine Design, No. 21, Oct. 24, 1991, XP 000255214, 1 page.

(56) References Cited

OTHER PUBLICATIONS

Francis Hamit, "Virtual Reality and the Exploration of Cyberspace," University of MD Baltimore County, 1993, 4 pages.

Innovation in Action—Biofeed back Motor Control, Active Leg Press—IsoLegPress, 2 pages (date unknown).

Ric Manning, "Videogame players get a workout with the Exertainment," The Gizmo Page from the Courier Journal Sep. 25, 1994, 1 page.

Tech Lines, Military—Arcade aces and Aviation—Winging it, Popular Mechanics, Mar. 1982, p. 163.

Sarju Shah, "Mad Catz Universal MC2 Racing Wheel: Mad Catz MC2 Universal," Game Spot, posted Feb. 18, 2005, 3 pages.

Joe Skorupa, "Virtual Fitness," Sports Science, Popular Mechanics, Oct. 1994, 3 pages.

AGH Musuem—Suncom Aerobics Joystick; http://atarihq.com/museum/2678/hardware/aerobics.html, (retrieved date unknown) 1 page.

Nintendo Zone—The History of Nintendo (1889-1997), retrieved Aug. 24, 1998 pp. 1, 9-10.

The Legible City, Computergraphic Installation with Dirk Groeneveld, Manhattan version (1989), Amsterdam version (1990), Karlsruhe version (1991), 3 pages.

The New Exertainment System. It's All About Giving Your Members Personal Choices, Life Fitness, Circle Reader Service Card No. 28, 1995, 1 page.

The Race Begins with $85, Randal Windracer, Circle Reader Service Card No. 34, 1990, 1 page.

Universal S-Video/Audio Cable; Product #5015, MSRP 9.99; http://www.madcatz.com/Defaultasp?Page=133&CategoryImg=Universa_Cables, retrieved May 12, 2005, 1 page.

Tom Dang, et al., "Interactive Video Exercise System for Pediatric Brain Injury Rehabilitation," Assistive Technology Research Center, Rehabilitation Engineering Service, National Rehabilitation Hospital, Proceedings of the RESNA 20th Annual Conference, Jun. 1998, 3 pages.

Linda S. Miller, "Upper Limb Exerciser," Biometrics Ltd—Unique Solutions for Clinical and Research Applications, 6 pages (date unknown).

Raymond W. McGorry, "A system for the measurement of grip forces and applied moments during hand tool use," Liberty Mutual Research Center for Safety and Health, Applied Ergonomics 32 (2001) 271-279.

NordicTrack's Aerobic Cross Trainer advertisement as shown in "Big Ideas—For a Little Money: Great Places to Invest $1,000 or Less," Kiplinger's Personal Finance Magazine, Jul. 1994, 3 pages.

Maurice R. Masliah, "Measuring the Allocation of Control in 6 Degree of Freedom Human-Computer Interaction Tasks," Graduate Department of Mechanical and Industrial Engineering, University of Toronto, 2001, 177 pages.

Leigh Arm Roman, "Boing! Combines Arcade Fun with Physical Training," Memphis—Health Care News: Monitoring the Pulse of Our Health Care Community, Sep. 20, 1996, One Section, 1 page.

"No More Couch Potato Kids," as shown in Orange Coast, Sep. 1994, p. 16.

Gary L. Downey, et al., "Design of an Exercise Arcade for Children with Disabilities," Resna, Jun. 26-30, 1998, pp. 405-407.

Frank Serpas, et al., "Forward-dynamics Simulation of Anterior Crueiate Ligament Forces Developed During Isokinetic Dynamometry," Computer Methods in Biomechanics and Biomedical Engineering, vol. 5 (1), 2002, pp. 33-43.

Carolyn Cosmos, "An 'Out of Wheelchair Experience'", The Washington Post, May 2, 2000, 3 pages.

"Look Ma! No Hands!", The Joyboard—Power Body Control, (date unknown).

David H. Ahl, "Controller update," Creative Computing, vol. 9, No. 12, Dec. 1983, p. 142.

Ian Bogost, "Water Cooler Games—The Prehistory of Wii Fit," Videogame Theory, Criticism, Design, Jul. 15, 2007, 2 pages.

Jeremy Reimer, "A history of the Amiga, part 2: The birth of Amiga," last updated Aug. 12, 2007, 2 pages.

The Amiga Joyboard (1982) image, Photos: Fun with plastic—peripherals that changed gaming; http://news.cnet.com/2300-27076_3-10001507-2.html (retrieved Jul. 23, 2010), 1 page.

The Amiga Power System Joyboard, Amiga history guide, http://www.amigahistory.co.uk/joyboard.html (retrieved Jul. 23, 2010), 2 pages.

"Joyboard," Wikipedia—the free encyclopedia, http://en.wikipedia.org/wiki/Joyboard (retrieved Jul. 26, 2010), 2 pages.

"Dance Dance Revolution," Wikipedia—the free encyclopedia, http://en.wikipedia.org/wiki/Dance Dance Revolution (retrieved Jul. 23, 2010), 9 pages.

"Cure for the couch potato," Kansas City Star (MO), Jan. 2, 2005, WLNR 22811884, 1 page.

JC Fletcher, "Virtually Overlooked: The Power Pad games," Joystiq, http://www.joystiq.com/2007/09/20/virtually-overlooked-the-power-pad-games/ (retrieved Jul. 26, 2010), 3 pages.

Family Fun Fitness, Nintendo Entertainment System, BANDAI, (date unknown).

"Power Pad/Family Fun and Fitness/Family Trainer," http://www.gamersgraveyard.com/repository/nes/peripherals/powerpad.html (retrieved Jul. 26, 2010), 2 pages.

"Power Pad Information," Version 1.0 (Sep. 23, 1999) http://www.gamersgraveyard.com/repository/nes/peripherals/powerpad.txt (retrieved Jul. 26, 2010), 2 pages.

Wii+Power+-Pad.jpg (image), http://bpl.blogger.com/_J5LEiGp54I/RpZbNpnLDgl/AAAAAAAAAic/Gum6DD3Umjg/s1600-h/Wii+Power+Pad.jpg (retrieved Jul. 26, 2010), 1 page.

Vs. Slalom—Videogame by Nintendo, KLOV—Killer List of Video Games, http://www.arcade-museum.com/game_detail.php?game_id=10368 (retrieved Jul. 26, 2010), 3 pages.

"Nintendo Vs. System," Wikipedia—the free encyclopedia, http://en.wikipedia.org/wiki/Nintendo_Vs._System (retrieved Jul. 26, 2010), 3 pages.

Vs. Slalom—Step Up to the Challenge, Nintendo, (date unknown).
Vs. Slalom—Live the Thrill, Nintendo, (date unknown).
Vs. Slalom—Operation Manual, MDS(MGS), Nintendo, 4 pages, (date unknown).

HyperspaceArcade.com—Specialists in Arcade Video Game Repair and Restoration, http://www.hyperspacearcade.com/VSTypes.html (retrieved Jul. 3, 2010), 3 pages.

Vs. Slalom—Attachment Pak Manual; for Installation in: VS. UniSystem (UPRIGHT) and VS. DualSystem (UPRIGHT), TM of Nintendo of America Inc., 1986, 15 pages.

Leiterman, "Project Puffer: Jungle River Cruise," Atari, Inc., 1982, 2 pages.

Leiterman, "Project Puffer: Tumbleweeds," Atari, Inc., 1982, 1 page.

Jerry Smith, "Other Input Devices," Human Interface Technology Laboratory, 2 pages, (date unknown).

Trevor Meers, "Virtually There: VR Entertainment Transports Players to Entrancing New Worlds," Smart Computing, vol. 4, Issue 11, Nov. 1993, 6 pages.

"Dance Aerobics," Moby Games, Feb. 12, 2008, 2 pages.

"Hard Drivin'," KLOV—Killer List of Video Games, The International Arcade Museum, http://www.arcade-museum.com, 6 pages, (date unknown).

"The World's First Authentic Driving Simulation Game!", Hard Drivin' -Get Behind the Wheel and Feel the Thrill (image), Atari games Corporation, 1 page, (date unknown).

Electronic Entertainment Expo (E3) Overview, Giant Bomb—E3 2004 (video game concept), http://www.giantbomb.com/e3-2004/92-3436/ (retrieved Sep. 3, 2010), 3 pages.

Guang Yang Amusement, Product Name: Live Boxer, 1 page, (date unknown).

Family Fun Fitness: Basic Set (Control Mat and Athletic World Game Pak), Nintendo Entertainment System, Bandai, (date unknown).

Roll & Rocker (image), 1 page, (date unknown).
Roll & Rocker, Enteractive (image), 2 pages, (date unknown).

Michael Goldstein, "Revolution on Wheels—Thatcher Ulrich," Nov.-Dec. 1994, 3 pages.

"Playboy on the Scene: Ride On!", 1 page, (date unknown).

Candace Putnam, "Software for Hardbodies: A virtual-reality hike machine takes you out on the open road," Design, 1 page, (date unknown).

(56) References Cited

OTHER PUBLICATIONS

Rachel, "No-Sweat Exercise—Can you get healthier without really trying?" Fitness, 1 page, (date unknown).
Fitness article, Sep. 1994, p. 402-404.
"Wired Top 10: Best Selling Toys in Jun. 1994," Wired Sep., 1994, 1 page.
"Top Skater," Sega Amusements U.S.A, Inc, 1 page, (date unknown).
Katharine Alter, et al., "Video Games for Lower Extremity Strength Training in Pediatric Brain Injury Rehabilitation," National Rehabilitation Hospital, 18 pages, (date unknown).
Cateye Recumbent GameBike Pro: Latest Technology in Exercise Bikes, beyondmoseying,com High Performance Exercise Equipment, 2 pages (advertisement; no date).
Fitness Fun, while Exercising and Getting FIT for Kids, Teens and Adults, (advertisement, no date).
Warranty Information and Your Joyboard: How it Works, Amiga Corporation, date unknown, 2 pages.
Complaint for Patent Infringement, *IA Labs CA, LLC* v. *Nintendo Co., Ltd. and Nintendo of America, Inc.*, United States District Court for the District of Maryland Northern Division (Apr. 2, 2010), 317 pages.
Plaintiff IA Labs CA, LLC's Opening Claim Construction Brief, *IA Labs CA, LLC* v. *Nintendo Co., Ltd. and Nintendo of America, Inc.*, United States District Court for the District of Maryland Southern Division (Dec. 13, 2010), 36 pages.
Nintendo Co., Ltd. and Nintendo of America Inc.'s Opening Claim Construction Brief, *IA Labs CA, LLC* v. *Nintendo Co., Ltd. and Nintendo of America, Inc.*, United States District Court for the District of Maryland Southern Division (Dec. 13, 2010), 55 pages.
Plaintiff IA Labs CA, LLC's Response Claim Construction Brief, *IA Labs CA, LLC* v. *Nintendo Co., Ltd. and Nintendo of America, Inc.*, United States District Court for the District of Maryland Southern Division (Jan. 6, 2011), 49 pages.
Nintendo Co., Ltd. and Nintendo of America Inc.'s Closing Claim Construction Brief, *IA Labs CA, LLC* v. *Nintendo Co., Ltd. and Nintendo of America, Inc.*, United States District Court for the District of Maryland Southern Division (Jan. 6, 2011), 25 pages.
Expert Report of Lee Rawls, Nov. 2, 2010, 37 pages (redacted).
Nintendo Co., Ltd. and Nintendo of America's Opposition to IA Labs CA, LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including the Appendix of Exhibits and Exhibits A-R, 405 pages.
Declaration of R. Lee Rawls in Support of Nintendo Co., Ltd. and Nintendo of America CA. LLC's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), including Exhibits 1, 3-12, 193 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States Distric Court for the District of Maryland Southern Division (May 16, 2011), 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant) United States District Court for the District of Maryland Southern Division (May 16, 2011), Appendix of Exhibits, 2 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 1, 36 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant) United States District Court for the District of Maryland Southern Division (May 16, 2011), Exhibit 2, 40 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 3, 85 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd et al.*, (Defendant), United States District Court for the District of Maryland Southern Division (May 16, 2011), Exhibit 4, 10 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States Distric Court for the District of Maryland Southern Division (May 16, 2011), Exhibit 5, 9 pages.
Declaration fo tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States Distrcit Court for the District of Maryland Southern Division (May 16, 2011), Exhibit 6, 17 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 7, 16 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al*, (Defendant) United States Distric Court for the District of Maryland Southern Division (May 16, 2011), Exhibit 8, 45 pages.
Declaration of Tyler C. Peterson Pursuant to Fed. R. Civ. P. 56(D) in Support of Nintendo Co., Ltd. and Nintendo of American Inc.'s Opposition to Plantiff's Motion for Partial Summary Judgment, *IA Labs CA, LLC*, (Plaintiff) v. *Nintendo Co., Ltd. et al*, (Defendant), United States District Court for the District of Maryland Southern Division (May 16, 2011), Exhibit 9, 4 pages.
Declaration of Tyler C. Peterson Pursuant to Fed. R. Civ. P. 56(D) in Support of Nintendo Co., Ltd. and Nintendo of American Inc.'s Opposition Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 10, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 11, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 12, 3 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant) United States District Court for the District of Maryland Southern Division (May 16, 2011), Exhibit 13, 7 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA*

(56) References Cited

OTHER PUBLICATIONS

*Labs CA, LLC*, (Plaintiff) v. *Nintendo Co., Ltd. et al.*, (Defendant), United States District Court for the District of Maryland Southern Division (May 16, 2011), Exhibit 14, 22 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 15, 45 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 16, 42 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 17, 19 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 18, 27 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 19, 13 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 20, 29 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al*, (Defendant), United States District Court for the District of Maryland Southern Division (May 16, 2011), Exhibit 21, 25 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 22, 11 pages.
Declaration of Tyler C. Peterson Pursuant to Fed. R. Civ. P. 56(D) in Support of Nintendo Co., Ltd. and Nintendo of American Inc.'s Opposition for Plaintiff's Motion for Partial Summary Judgment *IA Labs CA, LLC*, (Plaintiff) v. *Nintendo Co., Ltd. et al*, (Defendant), United States District Court for the District of Maryland Southern Division (May 16, 2011), Exhibit 23, 20 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 24, 7 pages.
Declaration of Tyler C. Peterson Pursuant to Fed. R. Civ. P. 56(D) in Support of Nintendo Co., Ltd. and Nintendo of American Inc.'s Opposition to Plaintfif's Motion for Partial Summary Judgment, *IA Labs CA, LLC*, (Plaintiff) v. *Nintendo Co., Ltd. et al.*, (Defendant), United States District Court for the District of Maryland Southern Division (May 16, 2011), Exhibit 25, 80 pages.
Declaration of Tyler C. Peterson Pursuant to Fed. R. Civ. P. 56(D) in Support of Nintendo Co., Ltd. and Nintendo of American Inc.'s Opposition to Plaintiff's Motion for Partial Summary Judgment, *IA Labs CA, LLC*, (Plaintiff) v. *Nintendo Co., Ltd. et al.*, (Defendant), United States District Court for the District of Maryland Souther Division (May 16, 2011), Exhibit 26, 32 pages.
U.S. Appl. No. 74/402,755, filed Jun. 14, 1993, 43 pages.
"AccuSway Dual Top: For Balance and Postural Sway Measurement," AMTI: Force and Motion, ISO 9001:2000, 2 pages.
Borzelli G., Cappozzo A., and Papa E., "Inter- and intra-individual variability of ground rejection forces during sit-to-stand with principal component analysis," Medical Engineering & Physics 21 (1999), pp. 235-240.
Chiari L., Cappello A., Lenzi D., and Della Croce U, "An Improved Technique for the Extraction of Stochasitc Parameters from Stabilograms," Gait and Posture 12 (2000), pp. 225-234.
Cutlip R., Hsiao H., Garcia R., Becker E., Mayeux B., "A comparison of different postures for scaffold end-frame disassembly," Applied Ergonomics 31 (2000), pp. 507-513.
Davis K.G., Marras W.S., Waters T.R., "Evaluation of spinal loading during lowering and lifting," The Ohio State University, Biodynamics Laboratory, Clinical Biomechanics vol. 13, No. 3, 1998 pp. 141-152.
Rolf G. Jacob, Mark S. Redfern, Joseph M. Furman, "Optic Flow-induced Sway in Anxiety Disorders Associated with Space and Motion Discomfort," Journal of Anxiety Disorders, vol. 9, No. 5, 1995, pp. 411-425.
Jorgensen M.J., Marras W.S., "The effect of lumbar back support tension on trunk muscle activity," Clinical Biomechanics 15 (2000), pp. 292-294.
Deborah L. King and Vladimir M. Zatsiorsky, "Extracting gravity line displacement from stabilographic recordings," Gait & Posture 6 (1997), pp. 27-38.
Kraemer W.J., Volek J.S., Bush J.A., Gotshalk L.A., Wagner P.R., Gómez A.L., Zatsiorsky V.M., Duzrte M., Ratamess N.A., Mazzetti S.A., Selle B.J., "Influence of compression hosiery on physiological responses to standing fatigue in women," The Human Performance Laboratory, Medical & Science in Sports & Exercise, 2000, pp. 1849-1858.
Papa E. and Cappozzo A., "A telescopic inverted-pendulum model of the musculo-skeletal system and its use for the analysis of the sit-to-stand motor task," Journal of Biomechanics 32 (1999), pp. 1205-1212.
Balance System, BalanceTrak 500, & Quantrem, ZapConnect.com: Medical Device Industry Portal, http://www.zapconnect.com/products/index/cfm/fuseaction/products, 2 pages. (Retrieved Apr. 5, 2011).
Bertec: Dominate Your Field, Physician's Quick Guide, Version 1.0.0, Feb. 2010, 13 pages.
Bertec: Dominate Your Field, Balancecheck Screener, Version 1.0.0, Feb. 2010, 35 pages.
Bertec: Dominate Your Field, Balancecheck Trainer, Version 1.0.0, Feb. 2010, 37 pages.
Bertec Corporation—BALANCECHECK Standard Screener Package, http://bertec.com/products/balance-systems/standard-screener.html, 1 page. (Retrieved Apr. 12, 2011).
Bertec Corporation—Balance Systems: Balancecheck Advanced balance assessment & training products for the balance professional, http://bertec.com/products/balance-systems.html, 1 page. (Retrieved Mar. 31, 2011).
Bertec Corporation—Balancecheck Mobile Screener Package: Portable balance screening with full functionality, http://bertec.com/products/balance-systems/mobile-screener .html, 1 page. (Retrieved Mar. 31, 2011).
Bertec Corporation—Balancecheck Standard Screener & Trainer Package: Advanced balance screening and rehabilitation system, http://bertec.com/products/balance-systems/standard-screener-trainer.html, 1 page. (Retrieved Mar. 31, 2011).
U.S. Appl. No. 75/136,330, filed Jul. 19, 1996, 47 pages.
Bertec: Dominate Your Field, Digital Acquire 4, Version 4.0.10, Mar. 2011, 22 pages.
Bertec: Dominate Your Field, Bertec Force Plates, Version 1.0.0, Sep. 2009, 31 pages.

(56) References Cited

OTHER PUBLICATIONS

Bertec: Dominate Your Field, Product Information: Force Plate FP4060-08:Product Details and Specifications, 4 pages.
Bertec: Dominate Your Field, Product Information: Force Plate FP4060-10:Product Details and Specifications, 2 pages.
U.S. Appl. No. 73/542,230, filed Jun. 10, 1985, 52 pages.
Brent L. Arnold and Randy J. Schmitz, "Examination of Balance Measures Produced by the Biodex Stability System," Journal of Athletic Training, vol. 33(4), 1998, pp. 323-327.
Trademark Registration No. 1,974,115 filed Mar. 28, 1994, 8 pages.
ICS Balance Platform, Fall Prevention: Hearing Assessment, Fitting Systems, Balance Assessment, Otometrics: Madsen, Aurical, ICS, 2 pages.
U.S. Appl. No. 75/471,542, filed Apr. 16, 1998, 102 pages.
VTI Force Platform, Zapconnect.com: Medical Device Industry Portal, http://zapconnect.com/products/index.cfm/fuseaction/products, 2 pages. (Retrieved Apr. 5, 2011).
Amin M., Girardi M., Konrad H.R., Hughes L., "A Comparison of Electronystagmorgraphy Results with Posturography Findings from the BalanceTrak 500," Otology Neurotology, 23(4), 2002, pp. 488-493.
Girardi M., Konrad H.R., Amin M., Hughes L.F., "Predicting Fall Risks in an Elderly Population: Computer Dynamic Posturography Versus Electronystagmography Test Results," Laryngoscope, 111(9), 2001, 1528-32.
Dr. Guido Pagnacco, Publications, 1997-2008, 3 pages.
College of Engineering and Applied Science: Electrical and Computer Engineering, University of Wyoming, Faculty: Guido Pagnacco, http://wwweng.uwyo.edu/electrical/faculty/Pagnacco.html, 2 pages. (Retrieved Apr. 20, 2011).
EyeTracker, IDEAS, DIFRA, 501(k) Summary: premarket notification, Jul. 5, 2007, 7 pages.
Vestibular technologies, copyright 2000-2004, 1 page.
Scopus preview—Scopus—Author details (Pagnacco, Guido), http:www.scopus.com/authid/detail.url?authorId=6603709393, 2 pages. (Retrieved Apr. 20, 2011).
Vestibular Technologies Company Page, "Vestibular technologies: Helping People Regain their Balance for Life," http:www.vestibtech.com/AboutUs.html, 2 pages. (Retrieved Apr. 20, 2011).
GN Otometrics Launces ICS Balance Platform: Portable system for measuring postural sway, http://audiologyonline.com/news/pf_news_detail.asp?news_id=3196, 1 page. (Retrieved Mar. 31, 2011).
U.S. Appl. No. 75/508,272, filed Jun. 25, 1998, 36 pages.
U.S. Appl. No. 75/756,991, filed Jul. 21, 1999, 9 pages.
U.S. Appl. No. 76/148,037, filed Oct. 17, 2000, 78 pages.
Vestibular technologies, VTI Products: BalanceTRAK User's Guide, Preliminary Version 0.1, 2005, 34 pages.
U.S. Appl. No. 76/148,037, filed Oct. 17, 2000, 57 pages.
Vestibular Technologies, Waybackmachine, http://vestibtech.com/balancetrak500.html, 7 pages. (Retrieved Mar. 30, 2011).
Vestibular Technologies, 2004 Catalog, 32 pages.
The Balance Trak 500—Normative Data, 8 pages.
State of Delaware: The Official Website of the First State, Division of Corporations—Online Services, http://delecorp.delaware.gov/tin/controller, 2 pages. (Retrieved Mar. 21, 2011).
Memorandum in Support of Plaintiff IA Labs' Motion for Partial Summary Judgment on Defendants' Affirmative Defense and Counterclaim that U.S. Patent No. 7,121,982 is Invalid Under 35 U.S.C. §§ 102 and 103, *IA Labs CA, LLC*, (Plaintiff) v. *Nintendo Co., Ltd. et al.*, (Defendant), United States District Court for the District of Maryland Southern Division (Apr. 27, 2011), 17 pages.
Addlesee, M.D., et al., "The ORL Active Floor," IEEE—Personal Communications, Oct. 1997.
Baek, Seongmin, et al., "Motion Evaluation for VR-based Motion Training," Eurographics 2001, vol. 20, No. 3, 2001.
Biodex Medical Systems, Inc.—Balance System SD Product Information—http://www.biodex.com/rehab/balance/balance_300feat.htm.
Chen, I-Chun, et al., "Effects of Balance Training on Hemiplegic Stroke Patients," Chang Gung Medical Journal, vol. 25, No. 9, pp. 583-590, Sep. 2002.
Dingwell, Jonathan, et al., "A Rehabilitation Treadmill with Software for Providing Real-Time Gait Analysis and Visual Feedback," Transactions of the ASME, Journal of Biomechanical Engineering, 118 (2), pp. 253-255, 1996.
Geiger, Ruth Ann, et al., "Balance and Mobility Following Stroke: Effects of Physical Therapy Interventions With and Without Biofeedback/Forceplate Training," Physical Therapy, vol. 81, No. 4, pp. 995-1005, Apr. 2001.
Harikae, Miho, "Visualization of Common People's Behavior in the Barrier Free Environment," Graduate Thesis—Master of Computer Science and Engineering in the Graduate School of the University of Aizu, Mar. 1999.
Hodgins, J.K., "Three-Dimensional Human Running," Proceedings: 1996 IEEE International Conference on Robotics and Automation, vol. 4, Apr. 1996.
Kim, Jong Yun, et al., "Abstract—A New VR Bike System for Balance Rehabilitation Training," Proceedings: 2001 IEEE Seventh International Conference on Virtual Systems and Multimedia, Oct. 2001.
McComas, Joan, et al., "Virtual Reality Applications for Prevention, Disability Awareness, and Physical Therapy Rehabilitation in Neurology: Our Recent Work," School of Rehabilitation Sciences, University of Ottawa—Neurology Report, vol. 26, No. 2, pp. 55-61, 2002.
NeuroCom International, Inc.—Balance Manager Systems/Products—http://resourcesonbalance.com/neurocom/products/index.aspx.
NeuroCom International, Inc.—Neurogame—http://resourcesonbalance.com/neurocom/products/NeuroGames.aspx.
Nicholas, Deborah S, "Balance Retraining After Stroke Using Force Platform Feedback," Physical Therapy, vol. 77, No. 5, pp. 553-558, May 1997.
Nintendo Co., Ltd.—Aerobic Exercise Rhythm Boxing—http://www.nintendo.co.jp/wii/rfnj/training/aerobics/aerobics07.html.
Redfern, Mark, et al., "Visual Influences of Balance," Journal of Anxiety Disorders, vol. 15, pp. 81-94, 2001.
Sackley, Catherine, "Single Blind Randomized Controlled Trial of Visual Feedback After Stroke: Effects on Stance Symmetry and Function," Disavility and Rehabilitation, vol. 19, No. 12, pp. 536-546, 1997.
Tossavainen, Timo, et al., "Postural Control as Assessed with Virtual Reality," Acta Otolaryngol, Suppl 545, pp. 53-56, 2001.
Tossavainen, Timo, et al., "Towards Virtual Reality Simulation in Force Platform Posturography," MEDINFO, pp. 854-857, 2001.
Tsutsuguchi, Ken, et al., "Human Walking Animation Based on Foot Reaction Force in the Three-Dimensional Virtual World," The Journal of Visualization and Computer Animation, vol. 11, pp. 3-16, 2000.
Wong, Alice, et al., "The Devlopment and Clinical Evaluation of a Standing Biofeedback Trainer," Journal of Rehabilitation Research and Development, vol. 34, No. 3, pp. 322-327, Jul. 1997.
Yang, Ungyeon, et al., "Implementation and Evaluation of 'Just Follow Me': An Immersive, VR-Based, Motion-Training System," Presence, vol. 11, No. 3, pp. 304-323, 2002.
Search Report (2 pgs.) dated May 27, 2011 issued in German Application No. 20 2004 021 793.7.
Japanese Office Action issued for corresponding Japanese Patent Application No. 2007-261798, dated Dec. 26, 2012.

\* cited by examiner (A) FIRST STEP

36

(B) SECOND STEP

36

(C) THIRD STEP

36

(D) FOURTH STEP

36

STORAGE MEDIUM STORING LOAD DETECTING PROGRAM AND LOAD DETECTING APPARATUS

CROSS REFERENCE OF RELATED APPLICATION

The disclosure of Japanese Patent Application No. 2007-261798 is incorporated herein by reference.

BACKGROUND OF THE INVENTION

1. Field of the Invention

The invention relates to a storage medium storing a load detecting program and a load detecting apparatus. More specifically, the present invention relates to a storage medium storing a load detecting program and a load detecting apparatus which perform processing by detecting load values imposed on a support plate on which a foot of a player is put.

2. Description of the Related Art

Conventionally, a load detecting apparatus equipped with a sensor for detecting a load of a subject is known in a field of medical equipment for purpose of exercises such as rehabilitation.

For example, in a Patent Document 1 (Japanese Patent Application Laid-Open No. 62-34016 [G01G 19/00, A61B 5/10, A61H 1/00, G01G 23/37]), a variable load display apparatus provided with two load sensors is disclosed. In this apparatus, right and left feet are put on the respective load sensors one by one. From the display of load values detected by the two load sensors, a balance between the right and left feet is measured.

Furthermore, in a Patent Document 2 (Japanese Patent Application Laid-open No. 7-275307 [A61H 1/02, A61B 5/11, A63B 23/04]), a center of gravity shift training apparatus with three load detecting means is disclosed. In this apparatus, both feet are put on a detection plate provided with the three load detecting means. By an arithmetic operation of signals detected from the three load detecting means, a position of the center of gravity is calculated and displayed, and whereby, training for shifting the center of gravity is performed.

However, in the above-described Patent Documents 1 and 2, although changes of the load in a state that the foot of the subject is put on the detection plate provided with the load detecting means (the balance between right and left and shift of the center of gravity) can be measured, there is a problem in that it is difficult to accurately determine a motion of putting the foot on and down from the detection plate like a step-up-and-down exercise. For example, consider now that a subject, putting one foot on the detection plate, is made to make a motion of putting the foot down from the detection plate to the ground according to an instruction of the screen. At this time, the change of the load put on the plate at a time when the subject puts the foot off from the detection plate is measured, the load value becomes approximately 0. However, at this step, since the subject merely puts the foot off from the detection plate, and has not finished the motion of putting the foot on the ground, if the motion is determined here, a time lag occurs between the timing when the motion is actually performed and the timing when the determination of the motion is performed in the apparatus. Thus, this makes it impossible to accurately determine the motion of the subject, and this gives the subject a strong uncomfortable feeling and an unnatural impression. Since the above-described Patent Documents 1 and 2 only disclose the measurement of the changes of the load with both of the feet are put on the plate, it is impossible to detect timing when the foot is put on the ground, so that such problems cannot be solved.

SUMMARY OF THE INVENTION

Therefore, it is a primary object of the present invention to provide a novel storage medium storing a load detecting program and a load detecting apparatus.

Another object of the present invention is to provide a storage medium storing a load detecting program and a load detecting apparatus capable of accurately determining timing of a motion such as putting a foot on and down from the stepping board by a player.

The present invention employs following features in order to solve the above-described problems. It should be noted that reference numerals inside the parentheses and the supplements show one example of a corresponding relationship with the embodiments described later for easy understanding of the present invention, and do not limit the present invention.

A first invention is a storage medium storing a load detecting program to be executed by a computer of a load detecting apparatus having a support board allowing a player to put the feet on. The load detecting program causes the computer to execute a load value detecting step, a motion instructing step, an elapsed time counting step, a judgment timing deciding step, and a first motion determining step. The load value detecting step detects a load value put on the support board. The motion instructing step instructs the player to perform a first motion. The elapsed time counting step counts an elapsed time from when the motion instructing step gives an instruction of the first motion. The judgment timing deciding step decides whether or not a first motion judgment timing has come on the basis of the elapsed time. The first motion determining step determines whether or not the first motion is performed on the basis of the load value detected by the load value detecting step when the judgment timing deciding step decides the judgment timing has come.

In the first invention, the load detecting program is executed in a computer (40, 42) of a load detecting apparatus (10, 12), and causes the load detecting apparatus to function as an apparatus for determining a motion of a player (user) on the basis of the detected load values, for example. The load detecting apparatus has a support board (36) for allowing the player to put the feet on, and the support board has a load sensor (36b), for example. A load value detecting step (S35, S75, S115, S163) detects a load value put on the support board. A load value depending on the motion by the player with respect to the support board is detected. A motion instructing step (S151) instructs the player to perform a first motion. For example, the instruction of the motion may be performed by displaying panels (400) representing the motion on a screen, and suitable timing may be shown by the timing of the movement or stop of the panels. An elapsed time counting step (S153, S155) counts an elapsed time (T4) from an instruction of the first motion is given. A judgment timing deciding step (S159, S161) decides whether or not the first motion judgment timing has come on the basis of the elapsed time. It is decided whether or not a suitable time for determining the execution of the first motion elapses from the instruction. A first motion determining step (S165) determines whether or not the first motion is performed on the basis of the detected load value when it is decided that the judgment timing has come.

According to the first invention, since the judgment timing is decided by the elapsed time from the start of the instruction of the motion, it is possible to determine the execution of the motion by properly deciding the judgment timing of the motion by the player.

A second invention is a storage medium storing a load detecting program according to the first invention, and the load detecting program causes the computer to further execute a load determining step for determining whether or not the load value detected by the load value detecting step becomes a predetermined state. The motion instructing step instructs the player to perform a second motion, the elapsed time counting step counts an elapsed time from when the instruction of the second motion is given, the judgment timing deciding step decides that the first motion judgment timing has come when the elapsed time from the instruction of the first motion reaches the elapsed time from when the instruction of the second motion is given to when the load determining step determines that the load value becomes the predetermined state.

In the second invention, a motion instructing step (S31, S71, S111) gives an instruction of a second motion, and an elapsed time counting step (S33, S49, S73, S89, S113, S129) counts an elapsed time from when the instruction of the second motion is given. A load determining step (S37, S41, S77, S81, S117, S121) determines whether or not the detected load value becomes a predetermined state. The predetermined state is a state that a condition for determining that the second motion is executed is satisfied, for example. That is, a judgment condition of a ratio of a load value to a body weight value, and a judgment condition in relation to a position of the center of gravity are decided in advance, and judgment of the condition is performed on the basis of the detected load value. The judgment timing deciding step decides that the first motion judgment timing has come when the elapsed time (T4) from the instruction of the first motion reaches the elapsed time (T3) from when the instruction of the second motion is given to when the load determining step determines that the load value becomes the predetermined state. The judgment timing of the first motion can be decided on the basis of the second motion judgment timing, so that it is possible to make a suitable judgment with simple processing.

A third invention is a storage medium storing a load detecting program according to the second invention, and the judgment timing deciding step decides that the first motion judgment timing has come in a case that the load determining step does not determines that the load value becomes the predetermined state from the instruction of the second motion, when the elapsed time from the instruction of the first motion becomes a predetermined time.

In the third invention, in the judgment timing deciding step, in a case that the load determining step does not determine that the load value becomes the predetermined state from the instruction of the second motion, that is, it is not determined that the second motion is performed by the player, when the elapsed time (T4) from the instruction of the first motion becomes a predetermined time (PS), it is decided that the first motion judgment timing has come. For example, the predetermined time is set to a value suitable for performing the first motion. Even if determination of the second motion is not performed, it is possible to decide the first motion judgment timing on the basis of the suitable timing set in advance.

A fourth invention is a storage medium storing a load detecting program according to the second invention, and the first motion is a motion, from a state that one foot of the player is put on the support board and the other foot is put on a ground, of putting the one foot down from the support board, and the second motion is a motion of putting only one foot down from the support board from a state that the player rides on the support board.

In the fourth invention, it is possible to properly decide judgment timing of a motion such as a step-up-and-down exercise.

A fifth invention is a storage medium storing a load detecting program according to the first invention, and the load detecting program causes the computer to further execute a notifying step for notifying the player that the first motion is performed when the first motion determining step determines that the first motion is performed.

In the fifth invention, the notifying step (S171) notifies the player that the first motion is performed by a sound output, an image display, etc. It is possible to easily inform the player whether or not the instructed motion is executed.

A sixth invention is a load detecting apparatus having a support board allowing a player to put the feet on, and comprises a load value detecting means, a motion instructing means, an elapsed time counting step, a judgment timing deciding means, and a first motion determining means. The load value detecting means detects a load value put on the support board. The motion instructing means instructs the player to perform a first motion. The elapsed time counting means counts an elapsed time from when the motion instructing means gives an instruction of the first motion. The judgment timing deciding means decides whether or not the first motion judgment timing has come on the basis of the elapsed time. The first motion determining means determines whether or not the first motion is performed on the basis of the load value detected by the load value detecting means when the judgment timing deciding means decides the judgment timing has come.

The sixth invention is a load detecting apparatus to which the storage medium storing a load detecting program according to the first invention is applied, and has an advantage similar to the first invention.

According to the present invention, since an elapsed time from when an instruction of a motion is performed is counted, and whether the judgment timing of the motion or not is decided on the basis of the elapsed time, it is possible to properly decide the judgment timing as to whether or not the player performs a motion of putting the feet on and down from the plate. Thus, it is possible to accurately determine whether or not the motion is performed.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
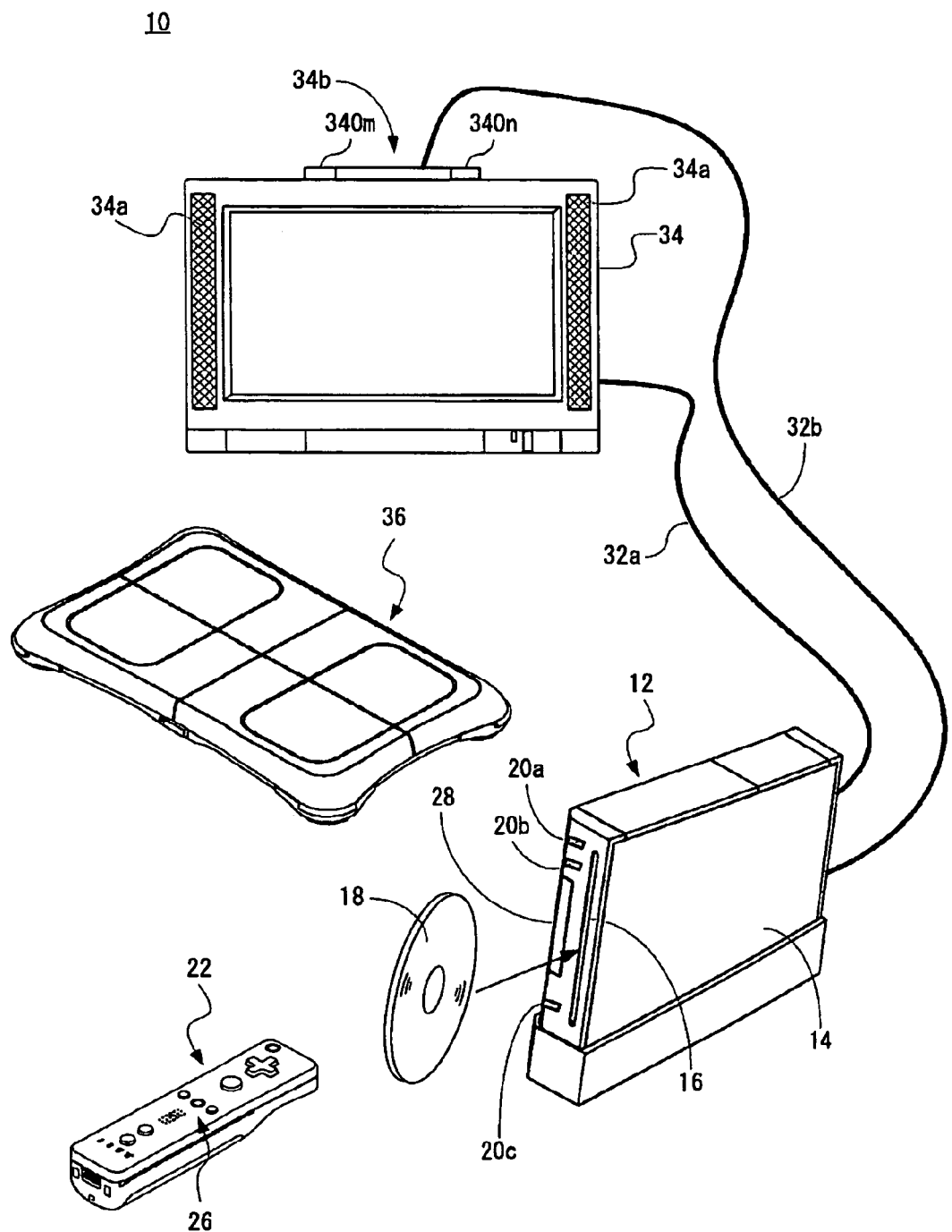
FIG. 1 is an illustrative view showing a game system of one embodiment of the present invention.

Referring to FIG. 1, a game system 10 of one embodiment of the present invention includes a video game apparatus hereinafter, simply referred to as "game apparatus") 12, a controller 22 and a load controller 36. In this embodiment, the game apparatus 12 and the load controller 36 function as a load detecting apparatus. Although illustration is omitted, the game apparatus 12 of this embodiment is designed such that it can be connected to four controllers (22, 36) at the maximum. Furthermore, the game apparatus 12 and the respective controllers (22, 36) are connected by radio. The wireless communication is executed according to a Bluetooth (registered trademark) standard, for example, but may be executed by other standards such as infrared rays, a wireless LAN.

The game apparatus 12 includes a roughly rectangular parallelepiped housing 14, and the housing 14 is furnished with a disk slot 16 on a front surface. An optical disk 18 as one example of an information storage medium storing game program, etc. is inserted from the disk slot 16 to be loaded into a disk drive 54 (see FIG. 2) within the housing 14. Around the disk slot 16, an LED and a light guide plate are arranged so as to be light on or off in accordance with various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory.

It should be noted that a general-purpose SD card can be employed as a memory card, but other general-purpose memory cards, such as MemoryStick, Multimedia Card (registered trademark) can be employed.

The game apparatus 12 has an AV cable connector 58 (see FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights in front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the operating buttons of the input means 26, a game or other application is started. Besides the operation on the input means 26, by moving the controller 22 itself, it is possible to move a moving image object (player object) in different directions or change the perspective of the user (camera position) in a 3-dimensional game world.

Figure 2:
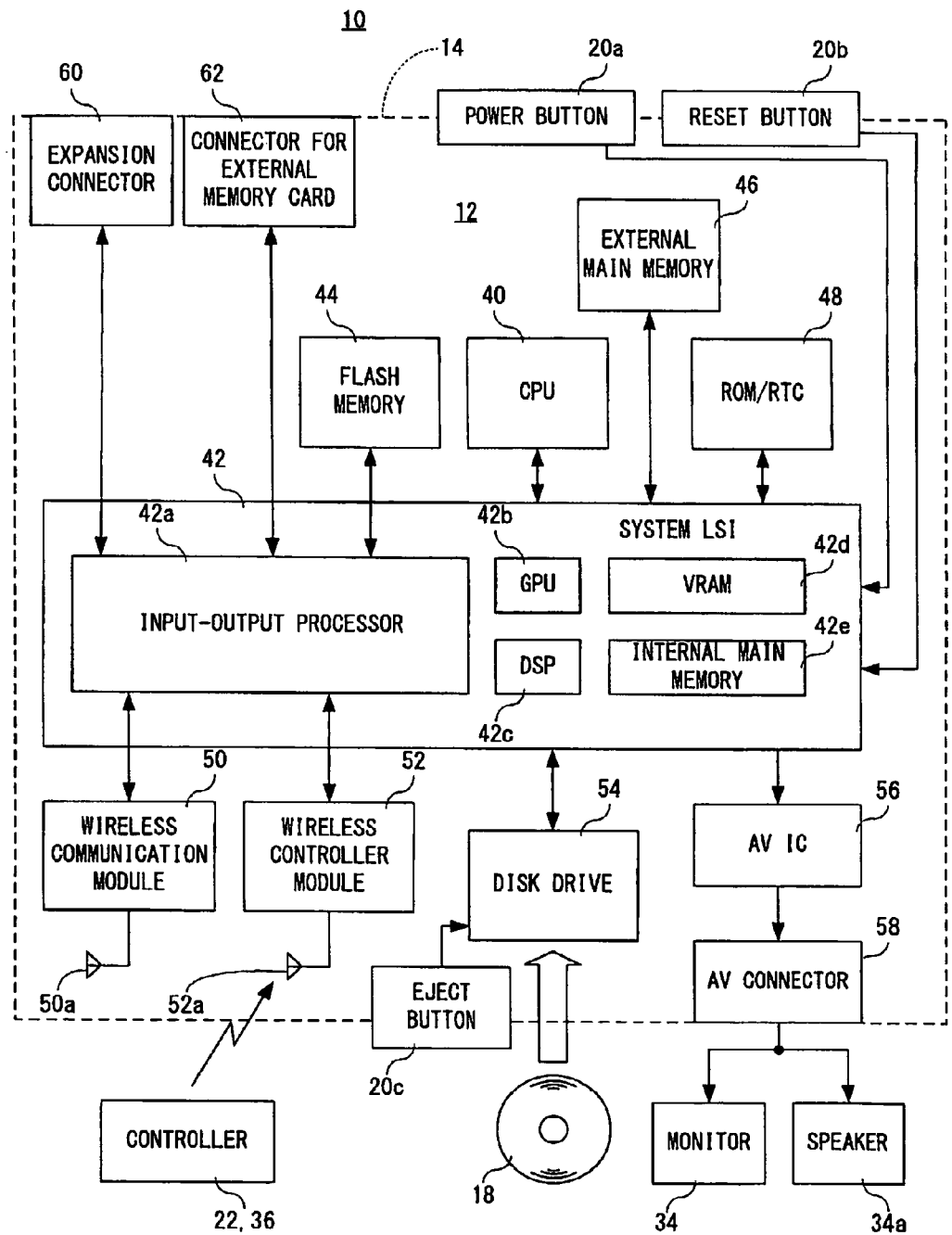
FIG. 2 is a block diagram showing one example of an electric configuration of the game system shown in FIG. 1.

FIG. 2 is a block diagram showing an electric configuration of the video game system 10 shown in FIG. 1 embodiment. Although illustration is omitted, respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program data, texture data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted.

The input-output processor (I/O processor) 42a executes transmitting and receiving data and executes downloading of the data. Reception and transmission and download of the data are explained in detail later.

The GPU 42b is made up of a part of a drawing means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction instruction. Additionally, the CPU 40 writes image data required for drawing to the VRAM 42d via the GPU 42b. The GPU 42b accesses the VRAM 42d to create game image data for drawing.

In this embodiment, a case that the GPU 42b generates game image data is explained, but in a case of executing an arbitrary application except for the game application, the GPU 42b generates image data as to the arbitrary application.

Furthermore, the DSP 42c functions as an audio processor, and generates audio data corresponding to a sound, a voice, music, or the like to be output from the speaker 34a by means of the sound data and the sound wave (tone) data stored in the internal main memory 42e and the external main memory 46.

The game image data and audio data generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

The input-output processor 42a can communicate with other game apparatuses and various servers to be connected to a network via a wireless communication module 50. It should be noted that it is possible to directly communicate with another game apparatus without going through the network. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. If the received data does not satisfy a predetermined condition, the reception data is abandoned as it is. In addition, the input-output processor 42a can receive data (download data) downloaded from the download server via the network, the antenna 50a and the wireless communication module 50, and store the download data in the flash memory 44.

Furthermore, the input-output processor 42a receives input data transmitted from the controller 22 and the load controller 36 via the antenna 52a and the wireless controller module 52, and (temporarily) stores it in the buffer area of the internal main memory 42e or the external main memory 46. The input data is erased from the buffer area after being utilized in game processing by the CPU 40.

In this embodiment, as described above, the wireless controller module 52 makes communications with the controller 22 and the load controller 36 in accordance with Bluetooth standards.

Furthermore, for the sake of the drawings, FIG. 2 collectively shows the controller 22 and the load controller 36.

In addition, the input-output processor 42a is connected with the expansion connector 60 and the connector for external memory card 62. The expansion connector 60 is a connector for interfaces, such as USB, SCSI, etc., and can be connected with medium such as an external storage, and peripheral devices such as another controller. Furthermore, the expansion connector 60 is connected with a cable LAN adaptor, and can utilize the cable LAN in place of the wireless communication module 50. The connector for external memory card 62 can be connected with an external storage like a memory card. Thus, the input-output processor 42a, for example, accesses the external storage via the expansion connector 60 and the connector for external memory card 62 to store and read the data.

Although a detailed description is omitted, as shown in FIG. 1, the game apparatus 12 (housing 14) is furnished with the power button 20a, the reset button 20b, and the eject button 20c. The power button 20a is connected to the system LSI 42. When the power button 20a is turned on, the system LSI 42 sets a mode of a normal energized state (referred to as "normal mode") in which the respective components of the game apparatus 12 are supplied with power through an AC adapter not shown. On the other hand, when the power button 20a is turned off, the system LSI 42 sets a mode in which a part of the components of the game apparatus 12 is supplied with power, and the power consumption is reduced to minimum (hereinafter referred to as "standby mode"). In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, the standby mode is a mode in which the CPU 40 never executes an application.

Although the system LSI 42 is supplied with power even in the standby mode, supply of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired to be utilized, when the power button 20a is turned off, by making the standby mode unusable, the power supply to all the circuit components are completely stopped.

Furthermore, switching between the normal mode and the standby mode can be performed by turning on and off the power switch 26h (see FIG. 3) of the controller 22 by remote control. If the remote control is not performed, setting is made such that the power supply to the wireless controller module 52 is not performed in the standby mode.

The reset button 20b is also connected with the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

Figure 3:
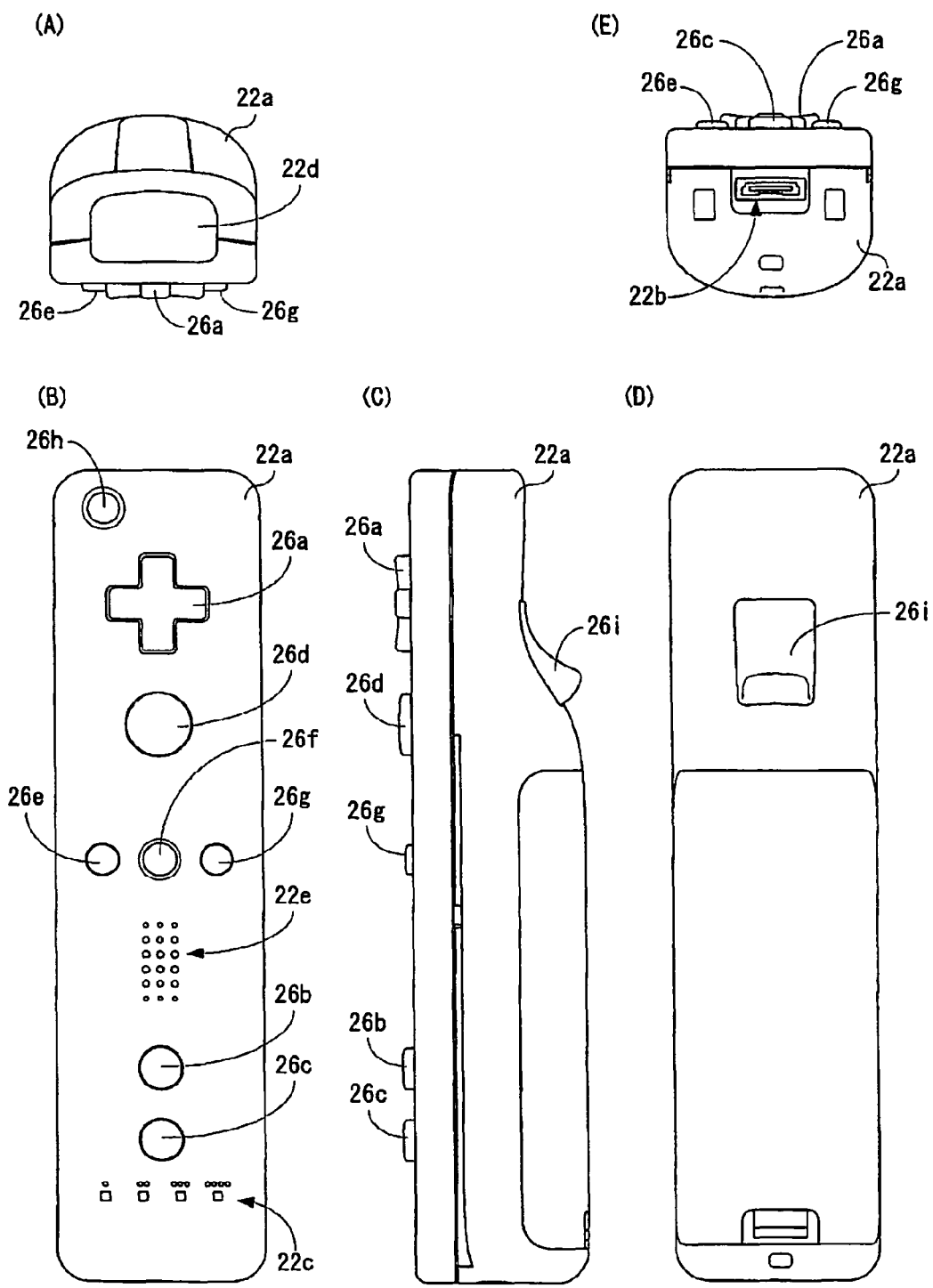
FIG. 3 is an illustrative view showing an appearance of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a lower surface of the controller 22, and FIG. 3 (E) shows a back end surface of the controller 22.

Referring to FIG. 3 (A) and FIG. 3 (E), the controller 22 has a housing 22a formed by plastic molding, for example. The housing 22a is formed into an approximately rectangular parallelepiped shape and has a size small enough to be held by one hand of a user. The housing 22a (controller 22) is provided with the input means (a plurality of buttons or switches) 26. Specifically, as shown in FIG. 3 (B), on an upper face of the housing 22a, there are provided a cross key 26a, a 1 button 26b, a 2 button 26c, an A button 26d, a –button 26e, a HOME button 26f, a +button 26g and a power switch 26h. Moreover, as shown in FIG. 3 (C) and FIG. 3 (D), an inclined surface is formed on a lower surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 26b and the 2 button 26c are respectively push button switches, and are used for adjusting a viewpoint position and a viewpoint direction on displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth.

The –button 26e, the HOME button 26f, the +button 26g, and the power supply switch 26h are also push button switches. The –button 26e is used for selecting a game mode. The HOME button 26f is used for displaying a game menu (menu screen). The +button 26g is used for starting (re-starting) or pausing the game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action determined by the A-button 26d.

As shown in FIG. 3 (E), an external expansion connector 22b is provided on a back end surface of the housing 22a, and as shown in FIG. 3 (B), an indicator 22c is provided on the top surface and the side of the back end surface of the housing 22a. The external expansion connector 22b is utilized for connecting another expansion controller not shown. The indicator 22c is made up of four LEDs, for example, and shows identification information (controller number) of the controller 22 corresponding to the lighting LED by lighting any one of the four LEDs, and shows the remaining amount of power of the controller 22 depending on the number of LEDs to be emitted.

In addition, the controller 22 has an imaged information arithmetic section 80 (see FIG. 4), and as shown in FIG. 3 (A), on the front end surface of the housing 22a, light incident opening 22d of the imaged information arithmetic section 80 is provided. Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3 (B).

Note that, the shape of the controller 22 and the shape, number and setting position of each input means 26 shown in FIG. 3 (A) to FIG. 3 (E) are simply examples, and needless to say, even if they are suitably modified, the present invention can be realized.

Figure 4:
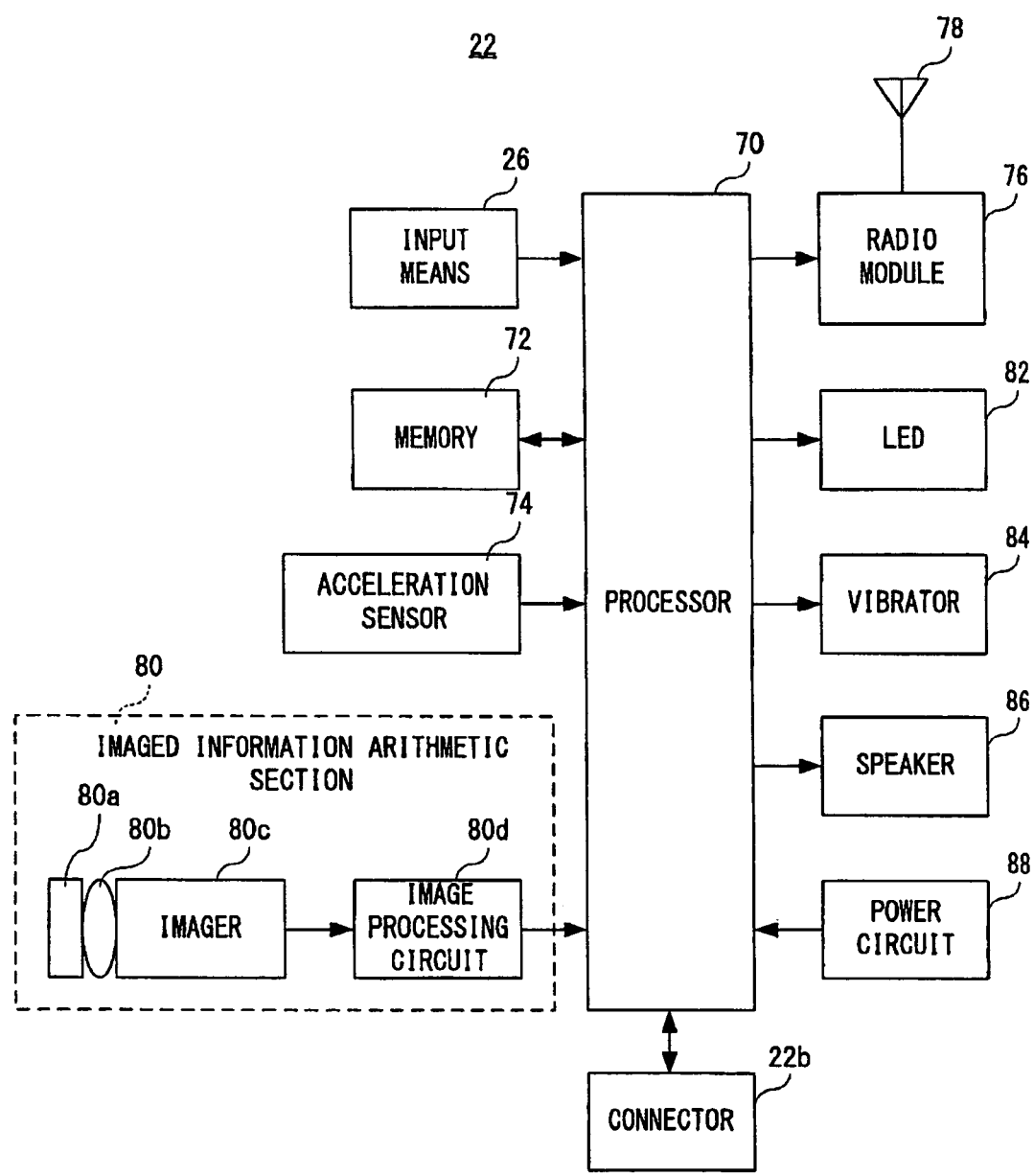
FIG. 4 is a block diagram showing one example of an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), a vibrator 84, a speaker 86, and a power supply circuit 88 by an internal bus (not shown). Moreover, an antenna 78 is connected to the radio module 76.

The processor 70 is in charge of an overall control of the controller 22, and transmits (inputs) information (input information) inputted by the input means 26, the acceleration sensor 74, and the imaged information arithmetic section 80 as input data, to the game apparatus 12 via the radio module 76 and the antenna 78. At this time, the processor 70 uses the memory 72 as a working area or a buffer area.

An operation signal (operation data) from the aforementioned input means 26 (26a to 26i) is inputted to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected in the processor 70. For example, the acceleration sensor 74 detects the acceleration in each direction of the axes in a range from −2.0 g to 2.0 g (g indicates a gravitational acceleration. The same thing can be said hereafter.) The processor 70 detects the acceleration data given from the acceleration sensor 74 for each second predetermined time, and stores it in the memory 72 once. The processor 70 creates input data including at least one of the operation data, acceleration data and marker coordinate data as described later, and transmits the input data thus created to the game apparatus 12 for each third predetermined time (5 msec, for example).

In this embodiment, although omitted in FIG. 3 (A) to FIG. 3 (E), the acceleration sensor 74 is provided inside the housing 22a and in the vicinity on the circuit board where the cross key 26a is arranged.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs game processing, following the input data and the program (game program).

In addition, as described above, the controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared rays filter 80a, it is possible to image the image of the markers 340m and 340n more accurately. The lens 80b condenses the infrared rays passing thorough the infrared rays filter 80a to emit them to the imager 80c. The imager 80c is a solid imager, such as a CMOS sensor and a CCD, for example, and images the infrared rays condensed by the lens 80b. Accordingly, the imager 80c images only the infrared rays passing through the infrared rays filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data for each fourth predetermined time. It should be noted that a description of the process in the image processing circuit 80d is made later.

Figure 5:
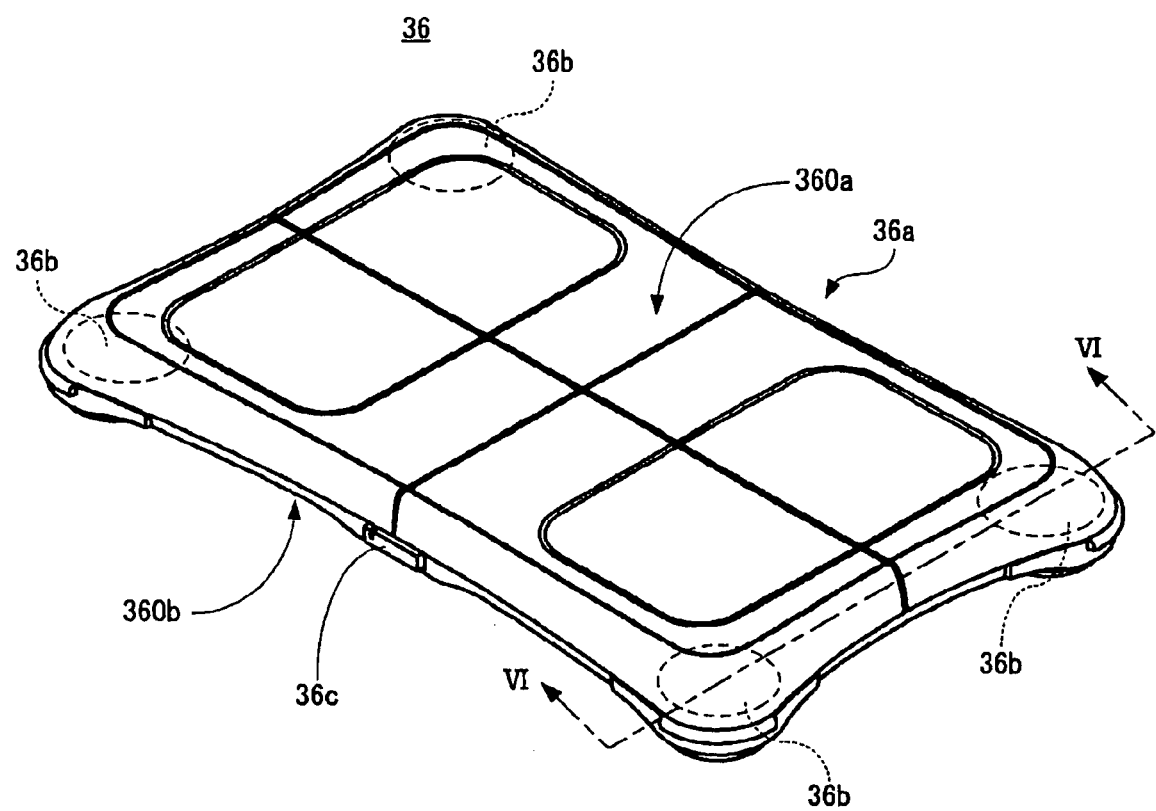
FIG. 5 is a perspective view showing a load controller shown in FIG. 1.

FIG. 5 is a perspective view showing an appearance of the load controller 36 shown in FIG. 1. The load controller 36 includes a board 36a on which a player rides (a player puts his or her foot) and at least four load sensors 36b that detect loads applied on the board 36a. The load sensors 36b are accommodated in the board 36a (see FIG. 7), and the arrangement of the load sensors 36b is shown by dotted line in FIG. 5.

The board 36a is formed in a substantially rectangle, and the board 36a has a substantially rectangular shape when viewed from above. For example, a short side of the rectangular is set in the order of about 30 cm, and a long side thereof is set in the order of 50 cm. An upper surface of the board 36a on which the player rides is formed in flat. Side faces at four corners of the board 36a are formed so as to be partially projected in a cylindrical shape.

In the board 36a, the four load sensors 36b are arranged at predetermined intervals. In the embodiment, the four load sensors 36b are arranged in peripheral portions of the board 36a, specifically, at the four corners. The interval between the load sensors 36b is set an appropriate value such that player's intention can accurately be detected for the load applied to the board 36a in a game manipulation.

Figure 6:
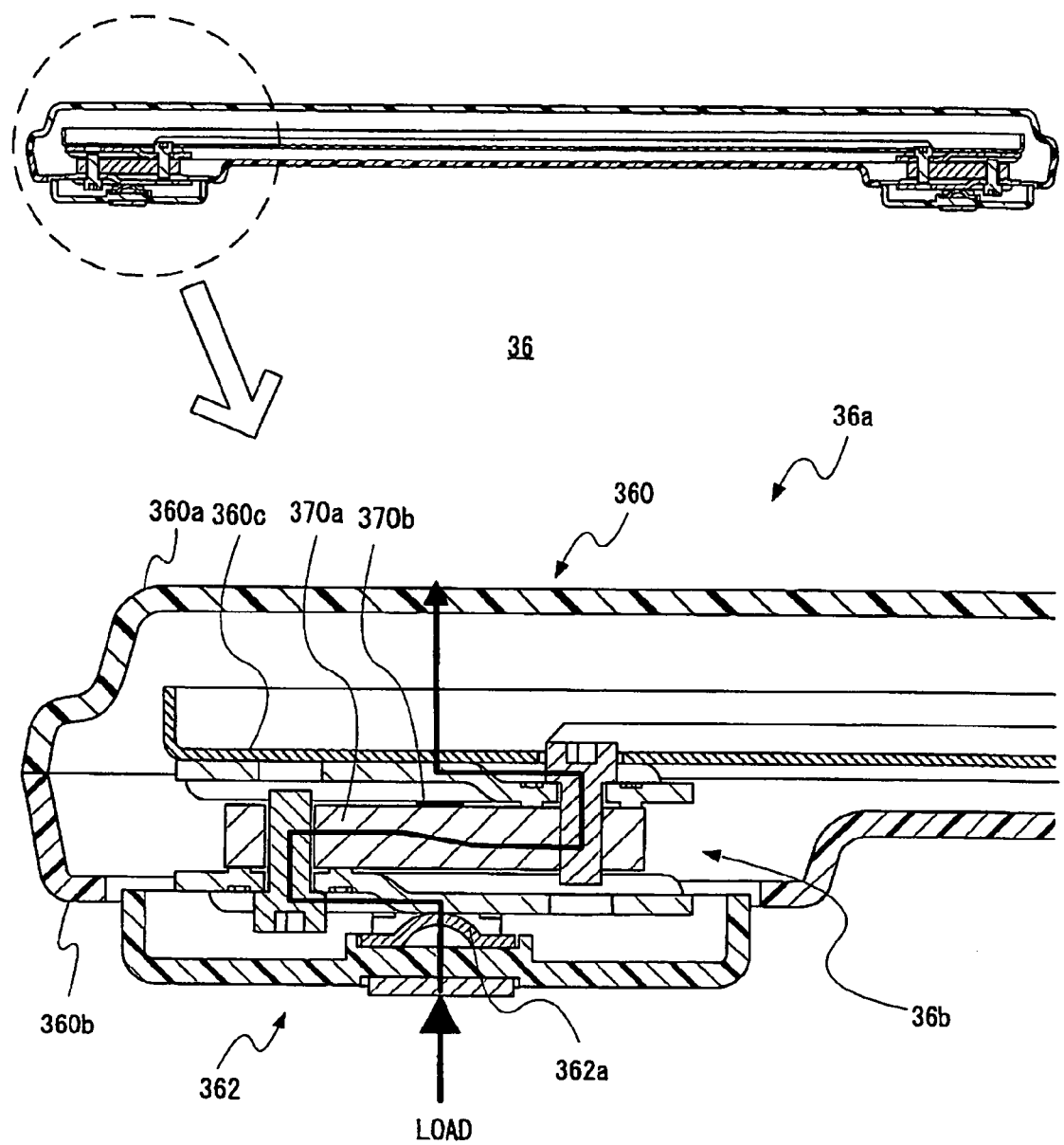
FIG. 6 is an illustrative view showing a cross section of the load controller shown in FIG. 5 taken along the line VI-VI.

FIG. 6 shows a sectional view taken along the line VI-VI of the load controller 36 shown in FIG. 5, and also shows an enlarged corner portion disposed in the load sensor 36b. As can be seen from FIG. 6, the board 36a includes a support plate 360 on which the player rides and legs 362. The legs 362 are provided at positions where the load sensors 36b are arranged. In the embodiment, because the four load sensors 36b are arranged at four corners, the four legs 362 are provided at the four corners. The leg 362 is formed in a cylindrical shape with bottom by, e.g., plastic molding. The load sensor 36b is placed on a spherical part 362a provided in the bottom of the leg 362. The support plate 360 is supported by the leg 362 while the load sensor 36b is interposed.

The support plate 360 includes an upper-layer plate 360a that constitutes an upper surface and an upper side face, a lower-layer plate 360b that constitutes a lower surface and a lower side face, and an intermediate-layer plate 360c provided between the upper-layer plate 360a and the lower-layer plate 360b. For example, the upper-layer plate 360a and the lower-layer plate 360b are formed by plastic molding and integrated with each other by bonding. For example, the intermediate-layer plate 360c is formed by pressing one metal plate. The intermediate-layer plate 360c is fixed onto the four load sensors 36b. The upper-layer plate 360a has a lattice-shaped rib (not shown) in a lower surface thereof, and the upper-layer plate 360a is supported by the intermediate-layer plate 360c while the rib is interposed. Accordingly, when the player rides on the board 36a, the load is transmitted to the support plate 360, the load sensor 36b, and the leg 362. As shown by an arrow in FIG. 6, reaction generated from a floor by the input load is transmitted from the legs 362 to the upper-layer plate 360a through the spherical part 362a, the load sensor 36b, and the intermediate-layer plate 360c.

The load sensor 36b is formed by, e.g., a strain gage (strain sensor) type load cell, and the load sensor 36b is a load transducer that converts the input load into an electric signal. In the load sensor 36b, a strain inducing element 370a is deformed to generate a strain according to the input load. The strain is converted into a change in electric resistance by a strain sensor 370b adhering to the strain inducing element 370a, and the change in electric resistance is converted into a change in voltage. Accordingly, the load sensor 36b outputs a voltage signal indicating the input load from an output terminal.

Other types of load sensors such as a folk vibrating type, a string vibrating type, an electrostatic capacity type, a piezo-electric type, a magneto-striction type, and gyroscope type may be used as the load sensor 36b.

Returning to FIG. 5, the load controller 36 is further provided with a power button 36c. When the power button 36c is turned on, power is supplied to the respective circuit components (see FIG. 7) of the load controller 36. It should be noted that the load controller 36 may be turned on in accordance with an instruction from the game apparatus 12. Furthermore, the power of the load controller 36 is turned off when a state that the player does not ride continues for a given time of period (30 seconds, for example). Alternatively, the power may be turned off when the power button 36c is turned on in a state that the load controller 36 is activated.

Figure 7:
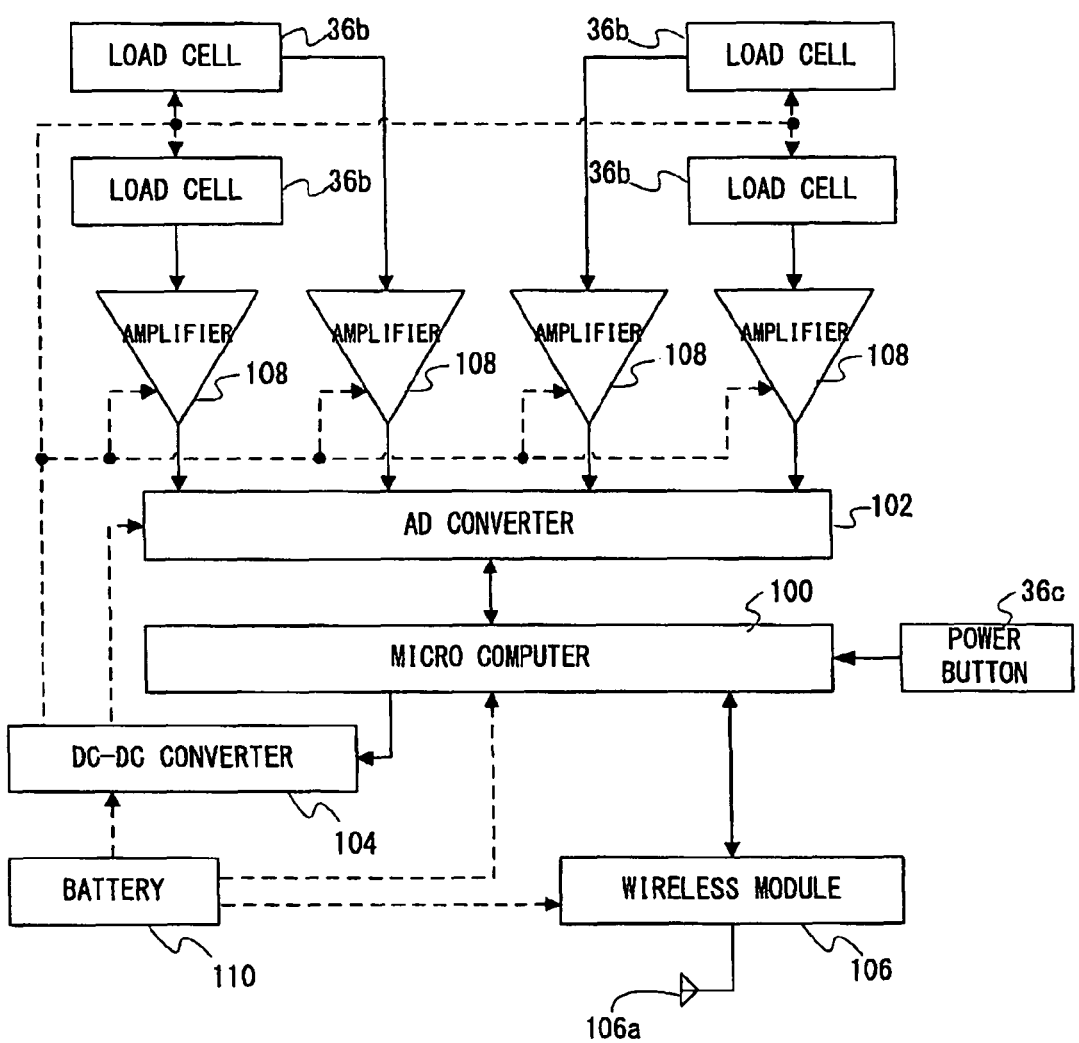
FIG. 7 is a block diagram showing one example of an electric configuration of the load controller shown in FIG. 5.

FIG. 7 is a block diagram showing an example of an electric configuration of the load controller 36. In FIG. 7, the signal and communication stream are indicated by solid-line arrows, and electric power supply is indicated by broken-line arrows.

The load controller 36 includes a microcomputer 100 that controls an operation of the load controller 36. The microcomputer 100 includes a CPU, a ROM and a RAM (not shown), and the CPU controls the operation of the load controller 36 according to a program stored in the ROM.

The microcomputer 100 is connected with the power button 36c, the A/D converter 102, a DC-DC converter 104 and a wireless module 106. In addition, the wireless module 106 is connected with an antenna 106a. Furthermore, the four load sensors 36b are displayed as a load cell 36b in FIG. 3. Each of the four load sensors 36b is connected to the A/D converter 102 via an amplifier 108.

Furthermore, the load controller 36 is provided with a battery 110 for power supply. In another embodiment, an AC adapter in place of the battery is connected to supply a commercial power supply. In such a case, a power supply circuit has to be provided for converting alternating current into direct current and stepping down and rectifying the direct voltage in place of the DC-DC converter. In this embodiment, the power supply to the microcomputer 100 and the wireless module 106 are directly made from the battery. That is, power is constantly supplied to a part of the component (CPU) inside the microcomputer 100 and the wireless module 106 to thereby detect whether or not the power button 36c is turned on, and whether or not a power-on (load detection) command is transmitted from the game apparatus 12. On the other hand, power from the battery 110 is supplied to the load sensor 36b, the A/D converter 102 and the amplifier 108 via the DC-DC converter 104. The DC-DC converter 104 converts the voltage level of the direct current from the battery 110 into a different voltage level, and applies it to the load sensor 36b, the A/D converter 102 and the amplifier 108.

The electric power may be supplied to the load sensor 36b, the A/D converter 102, and the amplifier 108 if needed such that the microcomputer 100 controls the DC-DC converter 104. That is, when the microcomputer 100 determines that a need to operate the load sensor 36b to detect the load arises, the microcomputer 100 may control the DC-DC converter 104 to supply the electric power to each load sensor 36b, the A/D converter 102, and each amplifier 108.

Once the electric power is supplied, each load sensor 36b outputs a signal indicating the input load. The signal is amplified by each amplifier 108, and the analog signal is converted into digital data by the A/D converter 102. Then, the digital data is inputted to the microcomputer 100. Identification information on each load sensor 36b is imparted to the detection value of each load sensor 36b, allowing for distinction among the detection values of the load sensors 36b. Thus, the microcomputer 100 can obtain the pieces of data indicating the detection values of the four load sensors 36b at the same time.

On the other hand, when the microcomputer 100 determines that the need to operate the load sensor 36b does not arise, i.e., when the microcomputer 100 determines it is not the time the load is detected, the microcomputer 100 controls the DC-DC converter 104 to stop the supply of the electric power to the load sensor 36b, the A/D converter 102 and the amplifier 108. Thus, in the load controller 36, the load sensor 36b is operated to detect the load only when needed, so that the power consumption for detecting the load can be suppressed.

Typically, the time the load detection is required shall means the time the game apparatus 12 (FIG. 1) obtains the load data. For example, when the game apparatus 12 requires the load information, the game apparatus 12 transmits a load obtaining command to the load controller 36. When the microcomputer 100 receives the load obtaining command from the game apparatus 12, the microcomputer 100 controls the DC-DC converter 104 to supply the electric power to the load sensor 36b, etc., thereby detecting the load. On the other hand, when the microcomputer 100 does not receive the load obtaining command from the game apparatus 12, the microcomputer 100 controls the DC-DC converter 104 to stop the electric power supply.

Alternatively, the microcomputer 100 determines it is the time the load is detected at regular time intervals, and the microcomputer 100 may control the DC-DC converter 104. In the case when the microcomputer 100 periodically detects the load, information on the period may initially be imparted from the game apparatus 12 to the microcomputer 100 of the load controller 36 or previously stored in the microcomputer 100.

The data indicating the detection value from the load sensor 36b is transmitted as the manipulation data (input data) of the load controller 36 from the microcomputer 100 to the game apparatus 12 (FIG. 1) through the wireless module 106 and the antenna 106a. For example, in the case where the command is received from the game apparatus 12 to detect the load, the microcomputer 100 transmits the detection value data to the game apparatus 12 when receiving the detection value data of the load sensor 36b from the A/D converter 102. Alternatively, the microcomputer 100 may transmit the detection value data to the game apparatus 12 at regular time intervals. If the transmission cycle is longer than the detection cycle of the load, data including load values of the plurality of detection timings detected by the transmission timing is transmitted.

Additionally, the wireless module 106 can communicate by a radio standard (Bluetooth, wireless LAN, etc.) the same as that of the radio controller module 52 of the game apparatus 12. Accordingly, the CPU 40 of the game apparatus 12 can transmit a load obtaining command to the load controller 36 via the radio controller module 52, etc. The microcomputer 100 of the load controller 36 can receive a command from the game apparatus 12 via the wireless module 106 and the antenna 106a, and transmit input data including load detecting values (or load calculating values) of the respective load sensors 36b to the game apparatus 12.

For example, in the case of a game performed based on the simple total value of the four load values detected by the four load sensors 36b, the player can take any position with respect to the four load sensors 36b of the load controller 36, that is, the player can play the game while riding on any position of the board 36a with any orientation. However, depending on the type of the game, it is necessary to perform processing while determining toward which direction the load value detected by each load sensors 36b is orientated when viewed from the player. That is, it is necessary to understand a positional relationship between the four load sensors 36*b* of the load controller 36 and the player. For example, the positional relationship between the four load sensors 36*b* and the player is previously defined, and it may be assumed that the player rides on the board 36*a* such that the predetermined positional relationship is obtained. Typically, there is defined such the positional relationship that each two load sensors 36*b* exist at the front and the back of and on right and left sides of the player riding on the center of the board 36*a*, i.e. such the positional relationship that the load sensors 36*b* exist in the right front, left front, right rear, and left rear directions from the center of the player respectively when the player rides on the center of the board 36*a* of the load controller 36. In this case, in this embodiment, the board 36*a* of the load controller 36 takes shape of a rectangle in a plane view, and the power button 36*c* is provided on one side (long side) of the rectangle, and therefore, by means of the power button 36*c* as a mark, the player is informed in advance that he or she rides on the board 36*a* such that the long side on which the power button 36*c* is provided is positioned in a predetermined direction (front, back, left or right). Thus, a load value detected at each load sensor 36*b* becomes a load value in a predetermined direction (right front, left front, right back and left back) when viewed from the player. Accordingly, the load controller 36 and the game apparatus 12 can understand that to which direction each load detecting value corresponds, seen from the player on the basis of the identification information of each load sensor 36*b* included in the load detection value data and the arrangement data set (stored) in advance for indicating a position or a direction of each load sensor 36*b* with respect to the player. This makes it possible to grasp an intention of a game operation by the player such as an operating direction from front to back and from side to side, for example.

The arrangement of the load sensors 36*b* relative to the player is not previously defined but the arrangement may be set by the player's input in the initial setting, setting in the game, or the like. For example, the load is obtained while the screen in which the player instructed to ride on the portion in a predetermined direction (such as the right front, left front, right rear, and left rear directions) when viewed from the player. Therefore, the positional relationship between each load sensor 36*b* and the player can be specified, and the information on the arrangement by the setting can be generated and stored. Alternatively, a screen for selecting an arrangement of the load controller 36 is displayed on the screen of the monitor 34 to allow the player to select by an input with the controller 22 to which direction the mark (power button 36*c*) exists when viewed from the player, and in response to the selection, arrangement data of each load sensor 36*b* may be generated and stored.

Figure 8:
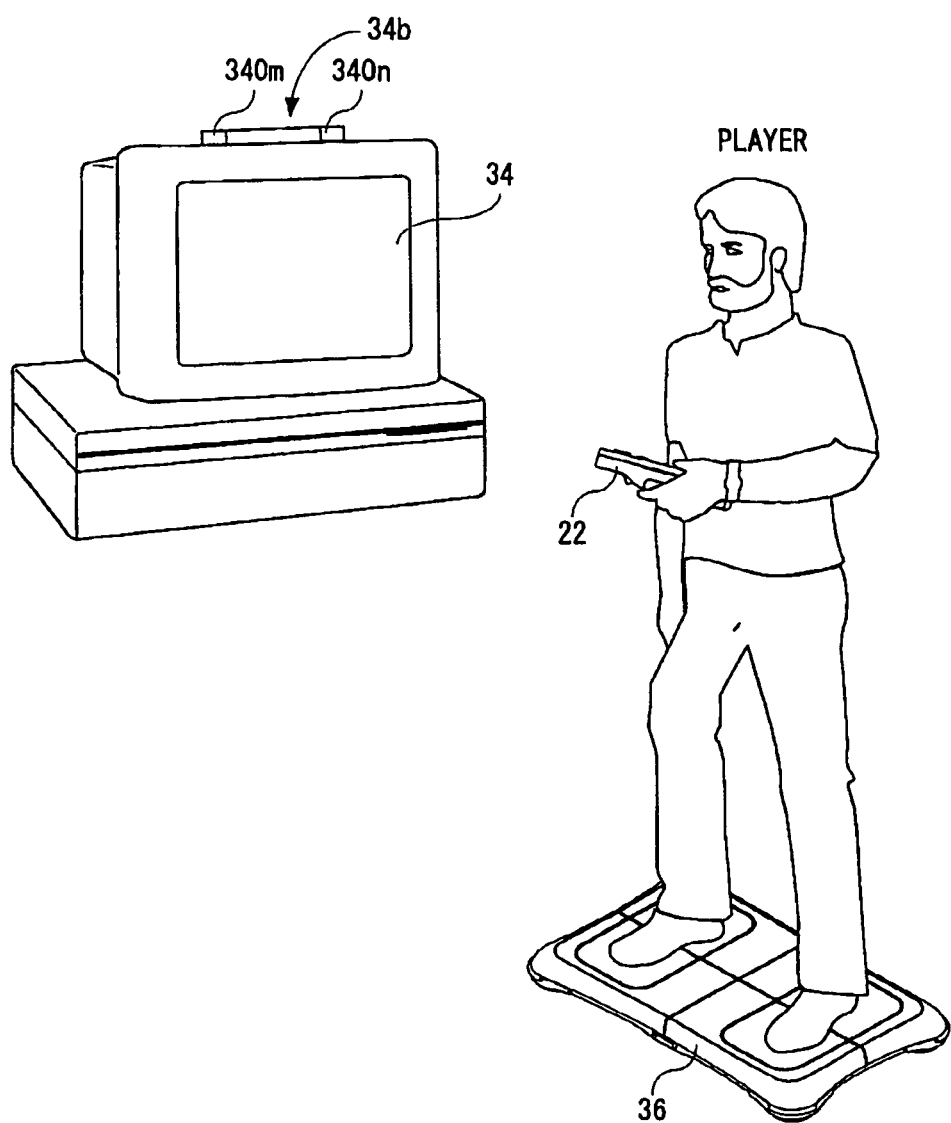
FIG. 8 is an illustrative view roughly explaining a state when a game is played by using the controller and the load controller.

FIG. 8 is an illustrative view roughly explaining a state in which the game is played using the controller 22 and load controller 36. As shown in FIG. 8, when playing a game by utilizing the controller 22 and the load controller 36 in the video game system 10, the player grasps the controller 22 in one hand while riding on the load controller 36. Exactly, the player grasps the controller 22 with the front-end surface (the side of the incident port 22*d* to which the light imaged by the imaged information arithmetic section 80 is incident) of the controller 22 orientated toward the markers 340*m* and 340*n* while riding on the load controller 36. However, as can be seen from FIG. 1, the markers 340*m* and 340*n* are disposed in parallel with the crosswise direction of the screen of the monitor 34. In this state of things, the player changes the position on the screen indicated by the controller 22 or the distance between the controller 22 and the marker 340*m* or 340*n* to perform the game manipulation.

Additionally, although FIG. 8 shows that by placing the load controller 36 vertically to the screen of the monitor 34 (placing it such that the direction of the long side is vertical to the screen), the player is transverse to the screen, a position of the load controller 36 and a direction of the player with respect to the screen may arbitrarily be changed depending on the kind of the game, and by placing (by placing it such that the long side direction is parallel with the screen) the load controller 36 horizontally to the screen, the player may be oriented to face with the screen, for example.

Figure 9:
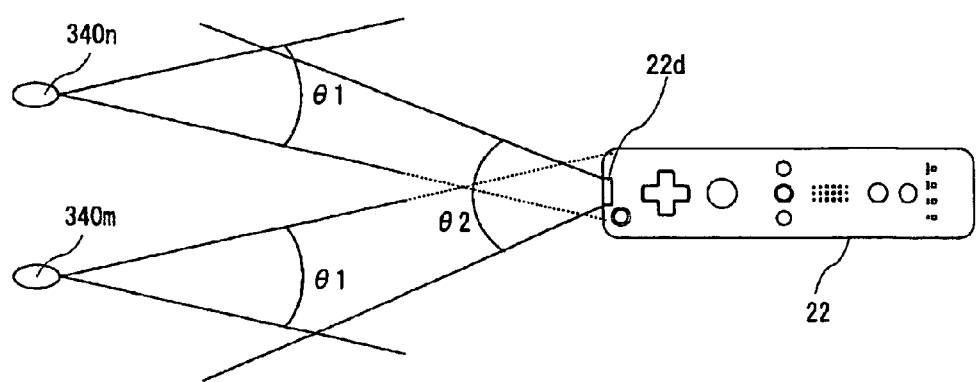
FIG. 9 is an illustrative view showing viewing angles of markers and the controller shown in FIG. 1.

FIG. 9 is an illustrative view for explaining view angles of the markers 340*m* and 340*n* and controller 22. As shown in FIG. 9, the markers 340*m* and 340*n* each emit the infrared ray in a range of a view angle $\theta 1$. The imager 80*c* of the imaged information arithmetic section 80 can receive the incident light in a range of a view angle $\theta 2$ around a visual axis direction of the controller 22. For example, each of the markers 340*m* and 340*n* has the view angle $\theta 1$ of 34° (half-value angle), and the imager 80*c* has the view angle $\theta 2$ of 41°. The player grasps the controller 22 such that the imager 80*c* is set to the position and orientation at which the infrared rays can be received from the two markers 340*m* and 340*n*. Specifically, the player grasps the controller 22 such that at least one of the markers 340*m* and 340*n* exists in the view angle $\theta 2$ of the imager 80*c* while the controller 22 exists in the view angle $\theta 1$ of at least one of the markers 340*m* and 340*n*. In this state, the controller 22 can detect at least one of the markers 340*m* and 340*n*. The player can change the position and orientation of the controller 22 to perform the game manipulation in the range satisfying this state.

In the case where the position and orientation of the controller 22 are out of the range, the game manipulation cannot be performed based on the position and orientation of the controller 22. Hereinafter the range is referred to as "manipulable range".

Figure 10:
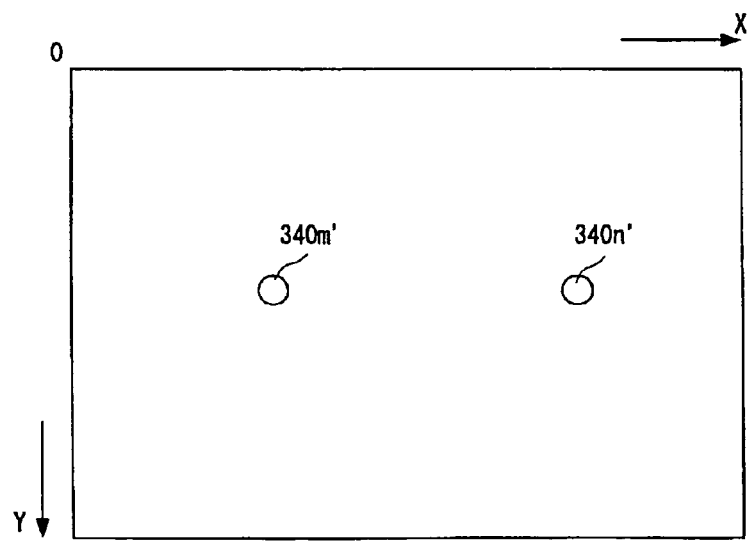
FIG. 10 is an illustrative view showing one example of an imaged image including target images.

In the case where the controller 22 is grasped in the manipulable range, the images of the markers 340*m* and 340*n* are taken by the imaged information arithmetic section 80. That is, the imaged image obtained by the imager 80*c* includes the images (target images) of the markers 340*m* and 340*n* that are of the imaging target. FIG. 10 is a view showing an example of the imaged image including the target image. Using the image data of the imaged image including the target image, the image processing circuit 80*d* computes the coordinate (marker coordinate) indicating the position in the imaged images of the markers 340*m* and 340*n*.

Because the target image appears as a high-brightness portion in the image data of the imaged image, the image processing circuit 80*d* detects the high-brightness portion as a candidate of the target image. Then, the image processing circuit 80*d* determines whether or not the high-brightness portion is the target image based on the size of the detected high-brightness portion. Sometimes the imaged image includes not only images 340*m*' and 340*n*' corresponding to the two markers 340*m* and 340*n* that are of the target image but also the image except for the target image due to the sunlight from a window or a fluorescent light. The processing of the determination whether or not the high-brightness portion is the target image is performed in order to distinguish the images 340*m*' and 340*n*' of the makers 340*m* and 340*n* that are of the target image from other images to exactly detect the target image. Specifically, the determination whether or not the detected high-brightness portion has the size within a predetermined range is made in the determination processing. When the high-brightness portion has the size within the predetermined range, it is determined that the high-brightness portion indicates the target image. On the contrary, when the high-brightness portion does not have the size within the predetermined range, it is determined that the high-brightness portion indicates the image except for the target image.

Then, the image processing circuit 80*d* computes the position of the high-brightness portion for the high-brightness portion in which it is determined indicate the target image as a result of the determination processing. Specifically, a position of the center of gravity of the high-brightness portion is computed. Hereinafter, the coordinate of the position of the center of gravity is referred to as marker coordinate. The position of the center of gravity can be computed in more detail compared with resolution of the imager 80*c*. At this point, it is assumed that the image taken by the imager 80*c* has the resolution of 126×96 and the position of the center of gravity is computed in a scale of 1024×768. That is, the marker coordinate is expressed by an integer number of (0, 0) to (1024, 768).

The position in the imaged image is expressed by a coordinate system (XY-coordinate system) in which an origin is set to an upper left of the imaged image, a downward direction is set to a positive Y-axis direction, and a rightward direction is set to a positive X-axis direction.

In the case where the target image is correctly detected, two marker coordinates are computed because the two high-brightness portions are determined as the target image by the determination processing. The image processing circuit 80*d* outputs the pieces of data indicating the two computed marker coordinates. As described above, the outputted pieces of marker coordinate data are added to the input data by the processor 70 and transmitted to the game apparatus 12.

When the game apparatus 12 (CPU 40) detects the marker coordinate data from the received input data, the game apparatus 12 can compute the position (indicated coordinate) indicated by the controller 22 on the screen of the monitor 34 and the distances between the controller 22 and the markers 340*m* and 340*n* based on the marker coordinate data. Specifically, the position toward which the controller 22 is orientated, i.e., the indicated position is computed from the position at the midpoint of the two marker coordinates. Accordingly, the controller 22 functions as a pointing device for instructing an arbitrary position within the screen of the monitor 34. The distance between the target images in the imaged image is changed according to the distances between the controller 22 and the markers 340*m* and 340*n*, and therefore, by computing the distance between the marker coordinates, the game apparatus 12 can compute the current distances between the controller 22 and the markers 340*m* and 340*n*.

Figure 11:
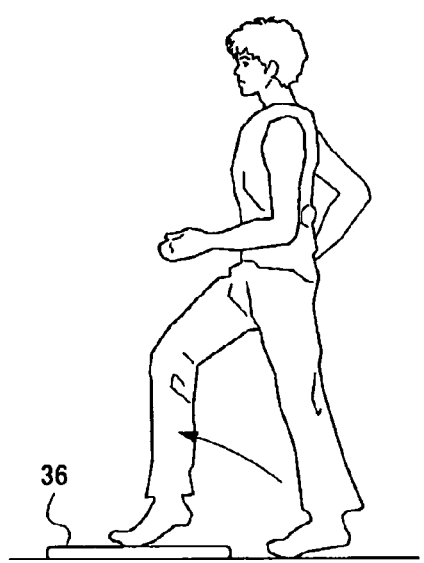
FIG. 11 is an illustrative view showing one example of respective motions of a step-up-and-down exercise.
Figure 11:
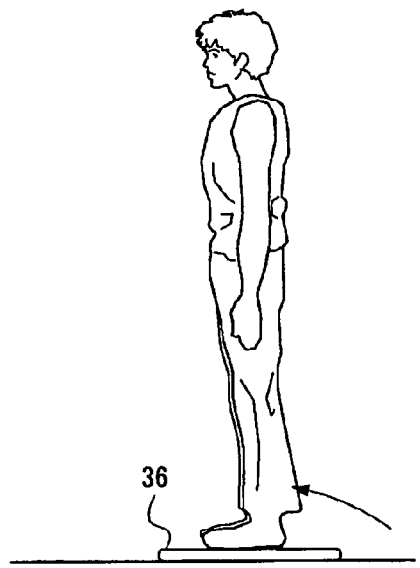
Figure 11:
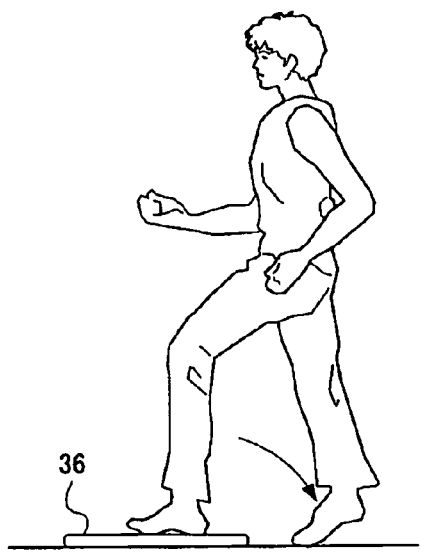
Figure 11:
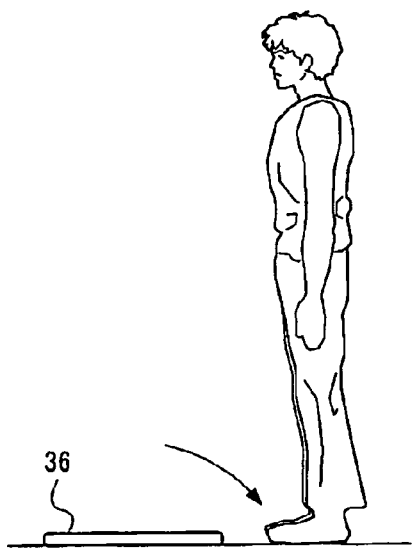

In the game system 10, a game is performed by a player's motion by putting the feet on and down from the load controller 36. In this embodiment, a step-up-and-down exercise game is performed. The step-up-and-down exercise is an exercise of repetitively putting the foot of a person on and down from the board. As shown in FIG. 11, the player plays the game by performing a motion of putting the foot on and down it from the load controller 36 while regarding the load controller 36 as a stepping board.

FIG. 11 shows a case that the player performs a step-up-and-down exercise from the right foot on the load controller 36 placed in front of him as one example. More specifically, as a first step (FIG. 11(A)), the right foot is put on, as a second step (FIG. 11(B)), the left foot is put on, as a third step (FIG. 11(C)), the right foot is put down backward, and as a fourth step (FIG. 11(D)), the left foot is put down backward.

The motion of stepping up and down the load controller 36 is according to an instruction on the game screen described below, and can be changed as necessary. Accordingly, FIG. 11 shows that the stepping up and down exercise starts from the right foot, but may start from the left foot. Furthermore, FIG. 11 shows that the player first puts down the foot which has formerly been ridden, but may first put down the foot which has later been ridden. In FIG. 11, the player steps up and down while moving forward and backward. Alternatively, the player may step up and down while moving from side to side, or may step up and down while moving backward and forward, and from side to side in combination.

Figure 12:
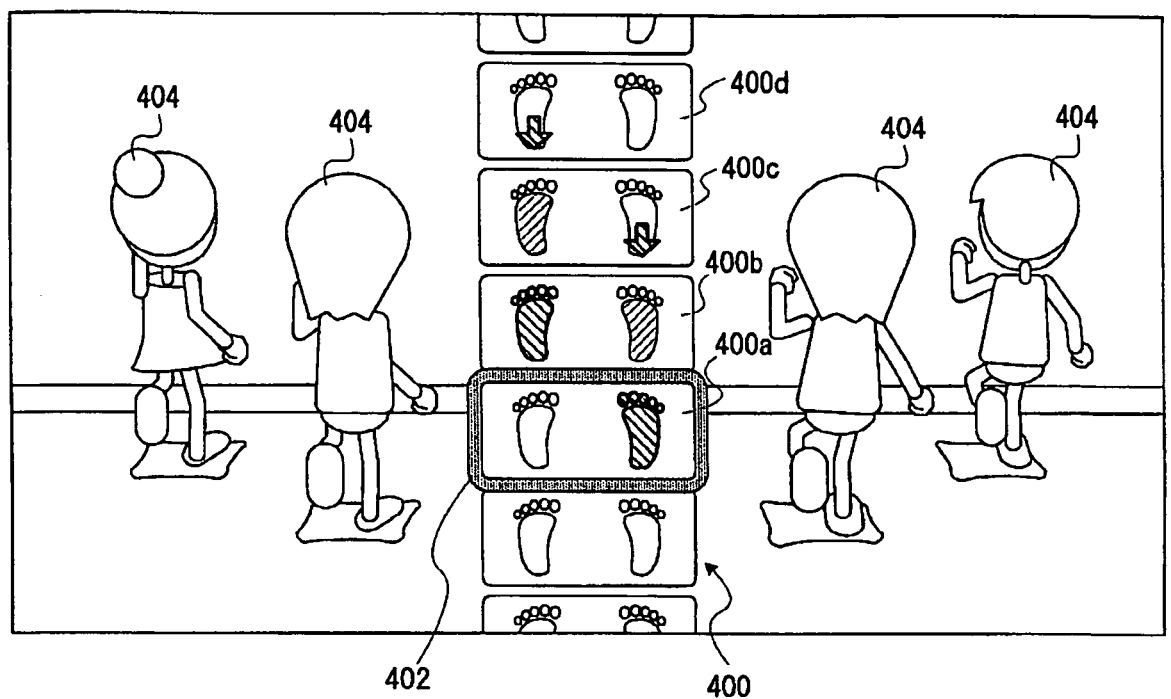
FIG. 12 is an illustrative view showing one example of a game screen.

FIG. 12 shows one example of a game screen. At the center in the horizontal direction of the screen, a plurality of panels 400 are displayed for instructing the player how to move. Each panel 400 shows a part of motion making up of the motions of the step-up-and-down exercise in this embodiment. The arrangement of the plurality (four in this embodiment) of panels 400 in a predetermined order can inform the motion to be executed by the player in the step-up-and-down exercise as a series of motions.

More specifically, in each panel 400, two right and left foot prints are drawn, and by changing a color, a shape, a pattern, etc. of the foot prints, a stepping up and down motion to be performed by the right and left feet is represented. Additionally, as a basic manner of the panel 400, a base color is drawn in white, and a line of the foot prints is drawn in gray, for example. If no motion is required to be executed, the panel 400 in this basic manner is used. In FIG. 12, a series of motions of the step-up-and-down exercise shown in FIG. 11 is instructed by four panels 400*a*-400*d*. The panel 400*a* is a panel for instructing the player to put a right foot on as a first step as shown in FIG. 11(A). For example, the foot print of the right foot is represented in red to show that the right foot is ridden from a state that no foot is ridden. The panel 400*b* is a panel for instructing the player to put the left foot on as a second step as shown in FIG. 11(B). For example, the left foot print is colored red, and the red of the right foot print is paled. This shows that the left step is further ridden from the state that the right foot is ridden. The panel 400*c* is a panel for instructing the player to put the right foot down as a third step as shown in FIG. 11(C). For example, the red of the left foot print is paled, and a red down arrow is drawn on the right foot print. This shows that the right foot is put down rearward from a state that both of the feet are ridden. The panel 400*d* is a panel for instructing the player to put the left foot down as a fourth step as shown in FIG. 11(D). For example, a red down arrow is drawn on the left foot print. This shows that the left foot is put down rearward in a state that the left foot is ridden.

Each panel 400 is constructed so as to sequentially appear from the upper end of the screen, move down, and disappear to the lower end of the screen. At a predetermined position below the center of the screen, a frame 402 is fixedly arranged. The frame 402 is provided on the moving path of the panels 400, and the panel 400 is stopped within the frame 402 for a set amount of time. The frame 402 can instruct the panel 400 for a motion to currently be executed. The panel 400 moving into the position of the frame 402 out of the plurality of panels 400 indicates a motion to be currently executed.

In addition, on the screen, a plurality of characters 404 are displayed at the right and left of the panel 400, for example. These characters 404 are controlled so as to make their actions according to the instruction by the panel 400 and the frame 402. In FIG. 12, since the panel 400*a* moves into the frame 402, each of the characters 404 performs a motion of putting the right foot on the board. By the action of each of the characters 404, it is possible to confirm the motion instructed on the panel 400.

The player performs a motion on the load controller 36 according to a motion instruction. In the game apparatus 12, it is determined whether or not the instructed motion is performed by the player on the basis of a load value detected by the load controller 36. If it is determined that the motion is performed, the player can gain a score. In addition, the timing of the motion is judged, and if the timing is good, a high score can be gained.

Figure 13:
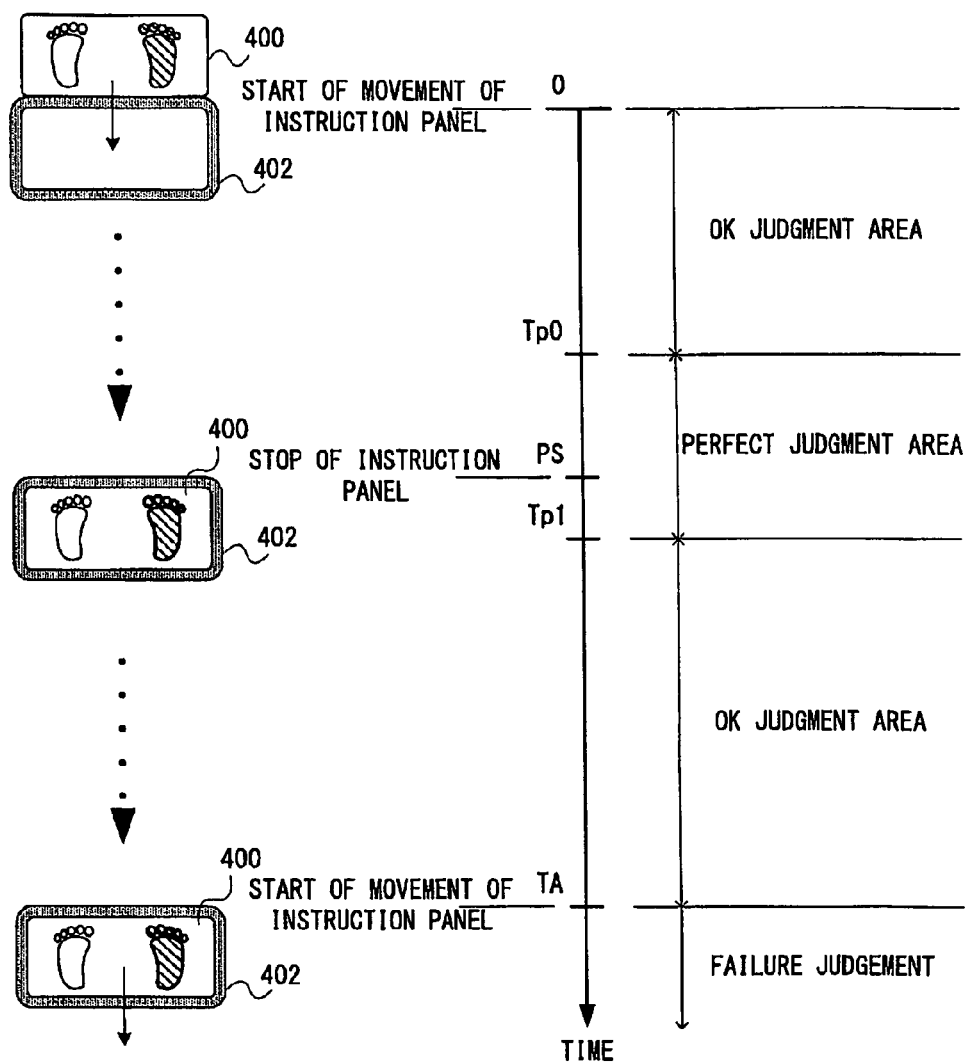
FIG. 13 is an illustrative view for explaining a moving manner of instruction panels and judgment of a motion.

As shown in FIG. 13, in this embodiment, the judgment of the motion is performed by being brought into association with a state of the movement of the panel 400 for instructing a motion. As described above, the plurality of panels 400 are controlled so as to move from top to bottom in a predetermined alignment on the screen, and to stop within the frame 402 for a set amount of time, so that a panel 400 moving from top stops for a set amount of time in a state that it is adjacent to the frame 402, and then starts moving. The motion instructed to the player by the panel 400 is required to be executed from when the panel 400 stars entering into the frame 402 to when the panel 400 starts going out from the frame 402. Thus, a time limit is prepared for the judgment of the motion, and the time limit is decided to be a suitable value in advance as a success-or-failure judgment time TA. The success-or-failure judgment time (time limit) TA is set to a suitable value depending on how fast the player is made to perform the motion of stepping up and down, for example.

Furthermore, the panel 400 is stopped within the frame 402 after a predetermined time PS elapses from the start of the movement, and then continues to be stopped until the time limit TA expires. The provision of the stopping period to the movement of the panels can clearly show the player when an instruction of each motion is started and ended. The panel stopping time PS is set to a proper value in advance by experiments, etc. so as to be timing suitable for a motion of stepping up and down, for example. For example, the timing when the foot moving for stepping up and down accurately touches the load controller 36 or the ground (floor) may be adopted. Thus, the player can perform a motion according to the moving state of the panels 400 such that he or she puts the foot down and on another place while the panels 400 moves, and completely puts the foot on in order to prepare for a next position while the panel 400 is stopped.

If it is not determined that the motion is performed from when the instruction panel 400 starts to move to when the time limit TA expires, it is determined that the execution of the motion fails. If it is a failure judgment, the player is not scored.

On the other hand, if it is determined that the motion is performed by the time when the time limit TA expires, it is determined that the execution of the motion succeeds, and the player is scored. Accordingly, for example, even if the motion is performed by a foot different from the instructed foot, if the motion is done again by the accurate foot by the time when the time limit TA expires, a success judgment is performed.

In addition, in this embodiment, a score corresponding to the timing when it is determined that a motion is performed may be given. Out of the success judgment, a motion performed in good timing called a perfect judgment, and the rest is called an OK judgment. As a time for discriminating the perfect judgment from the OK judgment, a perfect judgment time from Tp0 to Tp1 is set. When the elapsed time when it is determined that the motion is performed falls in the range from Tp0 to Tp1, the perfect judgment is made. That is, the period when the elapsed time falls in the range from Tp0 to Tp1 is a perfect judgment area, the period when the elapsed time falls in the range from 0 to Tp0 and the period when the elapsed time falls in the range from Tp1 to TA are OK judgment areas.

The perfect judgment times Tp0 and Tp1 are decided to be a value suitable for a motion of stepping up and down by experiments. In a case that the panel stopping time PS is determined to be timing suitable for the motion as described above, predetermined times before and after the panel stopping time PS are adopted as perfect judgment areas. In this case, the player can easily obtain a perfect judgment if the foot is put on the load controller 36 or the ground at right timing when the instruction panel 400 on the screen is stopped.

As to the motions of step-up-and-down exercise at first to third steps, by a detected load value, whether each motion is performed or not can be determined, and by the timing when the motion is performed, whether the OK judgment or the perfect judgment can be determined. However, as to a motion at the fourth step for putting down the left foot which was put on the load controller 36 on the floor to thereby put the both feet on the floor, it is difficult to determine the timing when the motion is performed by the detected load value. The reason why that at a time when the foot is put down from the load controller 36, the load value already becomes approximately zero, and it is impossible to observe from a change of the load value that the foot is put on the floor, so that the motion at the fourth step is finished.

Figure 14:
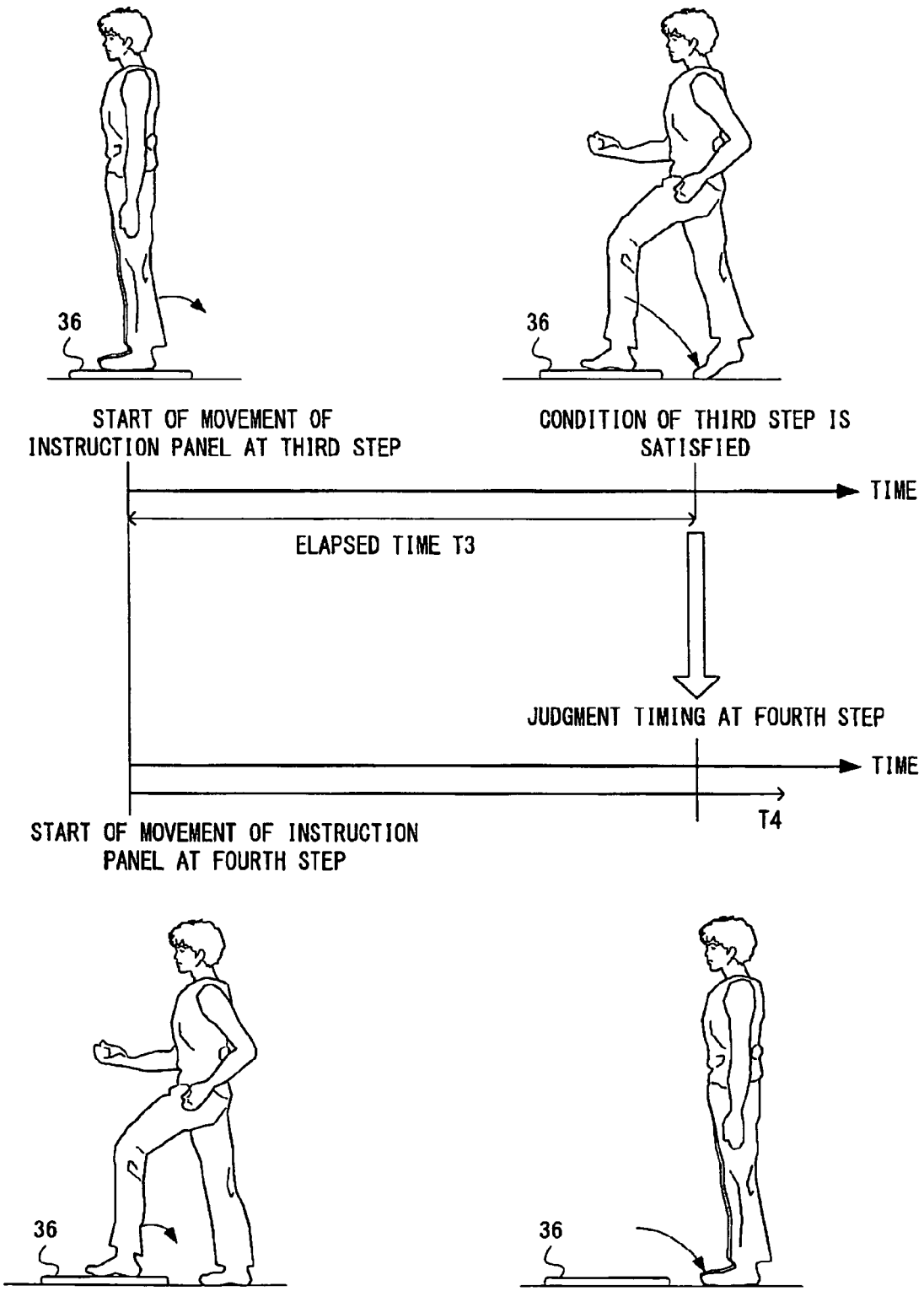
FIG. 14 is an illustrative view explaining a judgment timing of a motion at a fourth step of a step-up-and-down exercise.

Here, in this embodiment, the judgment timing of a motion at the fourth step is decided on the basis of an elapsed time from when the instruction of the motion is given. More specifically, as shown in FIG. 14, the timing when it is determined that a motion at the third step is performed is utilized as the judgment timing of the motion at the fourth step. The motion at the fourth step is a motion of putting the foot down from the load controller 36 similarly to the motion at the third step, and the third step is a motion immediately before, and therefore, the motion at the fourth step is expected to be performed in much the same way as the motion at the third step. The judgment condition of a motion at the third step is set on the basis of the load value detected when the left foot which was put down from the load controller 36 is put on the ground as described later. Accordingly, an elapsed time T3 from when the movement of the instruction panel 400 at the third step is started to when the condition of the third step is satisfied is measured, and the elapsed time T3 is set as a judgment timing of the fourth step. That is, the judgment of the motion at the fourth step is performed when an elapsed time T4 from the start of the movement of the instruction panel 400 at the fourth step is equal to or more than T3. Thus, since the judgment timing of the motion at the fourth step can be decided on the basis of the timing when execution of the motion at the third step is judged, it is possible to make a suitable judgment with simple processing.

Here, in a case that the player does not perform a motion according to an instruction, it is impossible to measure the elapsed time T3 at the third step, and therefore, in this case, when a predetermined time elapses from the start of the instruction of the fourth step, a judgment timing of a motion at the fourth step is decided to thereby make a judgment of the motion at the fourth step on the basis of the load value. As described above, since the stopping time PS of the panel 400 is set so as to be suitable for a motion of stepping up and down, and the perfect judgment areas are set before and after the PS, it is expected that the player puts the feet together in response to the stop of the panel 400. Accordingly, in this embodiment, by utilizing the panel stopping time PS as a judgment timing of a motion at the fourth step, it is possible to determine the motion at an appropriate timing. That is, in a case that the elapsed time T3 at the third step cannot be detected, the judgment of a motion at the fourth step is performed after the elapsed time from the start of the movement of the panel 400 is equal to or more than the panel stopping time PS.

Thus, on the basis of the elapsed time from the instruction of the motion at the fourth step, the judgment timing of the motion at the fourth step is decided, and therefore, it is possible to appropriately decide the judgment timing of a motion by the player.

Figure 15:
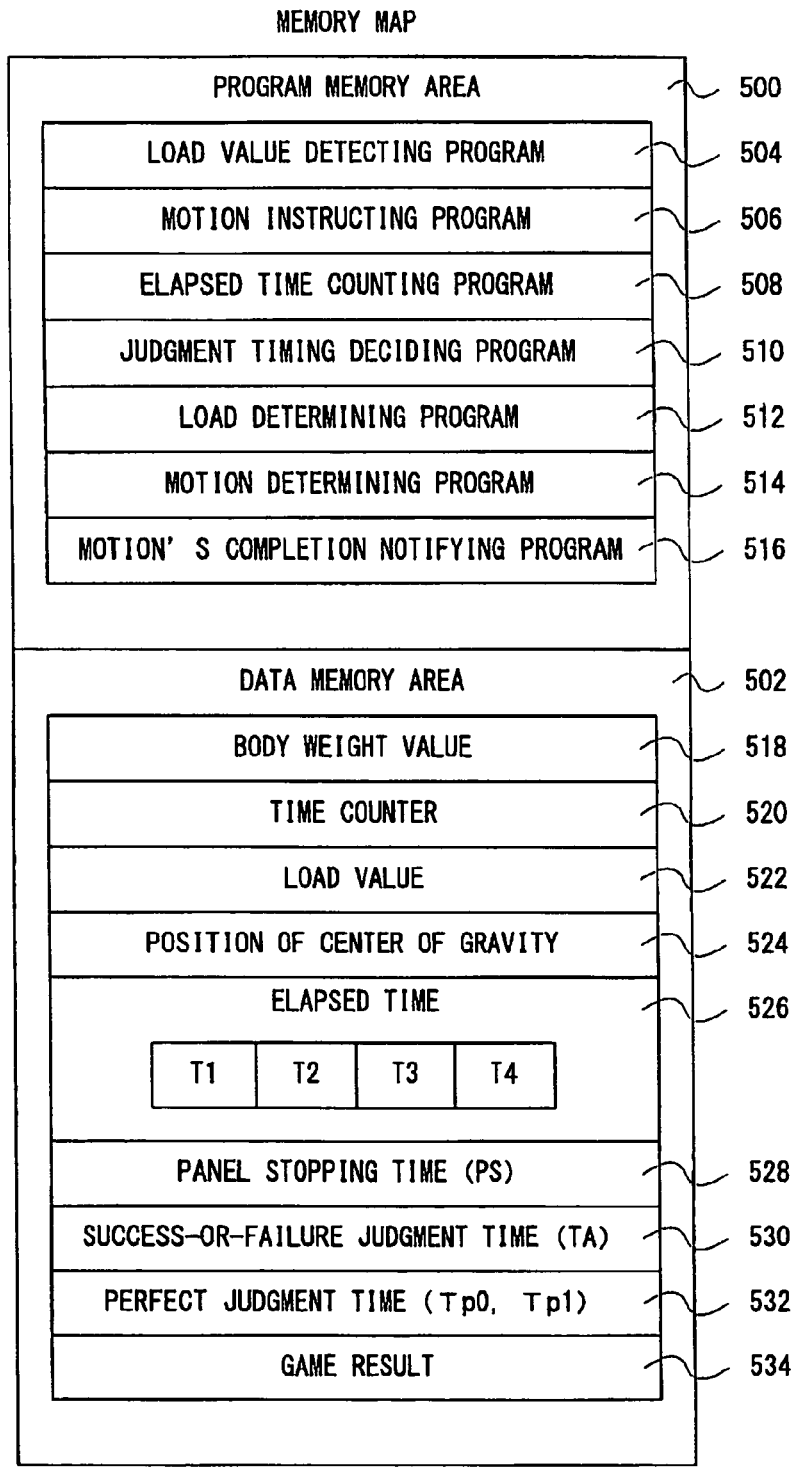
FIG. 15 is an illustrative view showing a memory map of a game apparatus.

FIG. 15 shows one example of a memory map of the game apparatus 12. The memory map includes a program memory area 500 and a data memory area 502. The program and the data are read from the optical disk 18 entirely at a time, or partially and sequentially as necessary so as to be stored into the external memory 46 or the internal memory 42*e*. Furthermore, in the data memory area 502, data generated or fetched by the processing is also stored. The program is a load detecting program for making the game system 10 function as a load detecting apparatus.

Additionally, FIG. 15 shows only a part of the memory map, and other programs and data necessary for processing are also stored. For example, sound data for outputting a sound such as a voice, a sound effect, music, etc., image data for generating a screen, a sound output program, an image generating and displaying program, etc. are read from the optical disk 18, and stored in the data memory area 502 or the program memory area 500. It should be noted that in this embodiment, a program and data are read from the optical disk 18, but in another embodiment, a program and data stored in advance in a nonvolatile storage medium such as the flash memory 44, etc. incorporated in the game apparatus 12 is read so as to be stored in the external memory 46 or the internal memory 42*e*. Alternatively, a program, etc. downloaded via a network by utilizing the radio communication module 50 of the game apparatus 12 or a communication module connected to the expansion connector 60 may be stored in the storage medium.

A memory area 504 stores a load value detecting program. The program is for detecting a load value of the load controller 36. For example, when a load is required, a load obtaining command is transmitted to the load controller 36 via the radio controller module 52, and a load value of each load sensor 36*b* is detected from the data of the load controller 36 received in the radio controller module 52. At a time of a judgment of the motion, a load value is fetched at an interval of a constant period, such as one frame (1/60 seconds), for example.

A memory area 506 stores a motion instructing program. The program is for instructing a player of a motion to be executed. The movements and stops of the plurality of panels 400 for instructing a series of motions are controlled on the basis of the success-or-failure judgment time TA and the panel stopping time PS, etc. as described above.

The elapsed time counting program is a program for measuring a lapse of time after the instruction of a motion. More specifically, the time when a panel 400 starts to move from the position upwardly adjacent to the frame 402 into the frame 402 is the time when the motion corresponding to the panel 400 is instructed, and therefore, the time is counted from when the panel 400 starts to move into the frame 402.

A memory area 510 stores a judgment timing deciding program. The program is for deciding whether a judgment timing of the motion or not on the basis of an elapsed time. In this embodiment, the judgment timing of a motion at the fourth step of the step-up-and-down exercise is decided. More specifically, as described above, it is determined whether or not the elapsed time T4 from the instruction of a motion at the fourth step is equal to or more than the elapsed time T3 measured at a motion at the third step. Or, it is determined whether or not the elapsed time T4 is equal to or more than the panel stopping time PS.

A memory area 512 stores a load determining program. The program is for determining whether or not the detected load value becomes a predetermined state. The predetermined state is a state in which a condition for determining each motion of the step-up-and-down exercise is satisfied. The judgment condition of each motion is a ratio of a load value to a body weight value of the player, and a position of the center of gravity of the load value. In this embodiment, it is determined whether or not the load value detected as to a motion at the third step of the step-up-and-down exercise becomes a predetermined state, and the elapsed time T3 from when the instruction of the motion is started to when it is determined that the load value becomes the predetermined state is adopted as a judgment timing of a motion at the fourth step.

A memory area 514 stores a motion determining program. The program is, when it is determined that the judgment timing of a motion has come, for determining whether or not the motion is performed on the basis of the load value. In this embodiment, when it is determined that the judgment timing of a motion at the fourth step of the step-up-and-down exercise has come, it is determined whether or not the motion is performed on the basis of the detected load value.

A memory area 516 stores a motion's completion notifying program. The program is for notifying the player that the motion is performed when it is determined that the instructed motion is performed. This makes it possible to easily inform the player whether or not the motion is executed. In this embodiment, by outputting a predetermined sound indicating that execution of the instructed motion is determined from the speaker 34*a*, it is possible to inform the player that the instructed motion is performed. Furthermore, this may be informed by an image display such as change of a color of the panel 400 corresponding to the instructed motion, and display of letters representing a success on the screen, for example.

A memory area 518 of the data memory area 502 stores a body weight value of the player. The body weight value is calculated by summing load values of all the load sensors 36*b* detected when the player rides still on the load controller 36. Additionally, when the body weight value is measured, a screen for instructing the player to gently ride on the load controller 36 with both feet is displayed before start of the step-up-and-down exercise.

A memory area 520 stores a time counter. The time counter is a counter for counting an elapsed time from an instruction of each motion. In this embodiment, the count is performed at an interval of a preset time (1 frame).

A memory area 522 stores a load value of each of the load sensors 36*b* detected by the load detecting program. When judgment of the condition of a motion is performed by the load determining program or the motion determining program, a ratio between a sum of the load values and a body weight value, and a position of the center of gravity are calculated.

A memory area 524 stores a position of the center of gravity. The position of the center of gravity is a position of the center of gravity of a load value of each load sensor 36*b* of the load controller 36. In this embodiment, as understood from that the two foot prints are arranged in a direction of the long side of the rectangle instruction panel 400 shown in FIG. 12, the step-up-and-down exercise is performed such that the long side of the rectangular board 36*a* of the load controller 36 positions in a back-and-forth direction of the player, and the short side positions in a right and left direction of the player. Then, since a position of the center of gravity in the right and left direction is used for the judgment of the motion, the position of the center of gravity in the right and left direction is calculated on the basis of the fetched load value of each of the load sensors 36*b* acquired in the memory area 522, and stored in the memory area 524.

When a load value detected by the load sensor 36*b* at the left front of the player is a, when a load value detected by the load sensor 36*b* at the left back is b, when a load value detected by the load sensor 36*b* at the right front is c, when a load value detected by the load sensor 36*b* at the right back is d, the position of the center of gravity in the right and left direction XG is calculated by Equation 1 below.

$$XG=((c+d)-(a+b))*m \quad \text{[Equation 1]}$$

Here, m is a constant, and set to a value satisfying −1≤XG≤1.

Additionally, although not utilized in this embodiment, in another embodiment, judgment may be decided on the basis of a position of the center of gravity in a back and forth direction depending on the motion, and in this case, a position of the center of gravity in a back and forth direction YG is calculated by a following Equation 2.

$$YG=((a+c)-(b+d))*n \quad \text{[Equation 2]}$$

Here, n is a constant, and set to a value satisfying −1≤YG≤1.

Thus, a position of the center of gravity in a right and left direction XG is calculated on the basis of the difference between the load value (c+d) at the right of the player and the load value (a+b) at the left of the player, and the position of the center of gravity in a back-and-forth direction YG is calculated on the basis of the difference between the load value (a+c) in front of the player and the load value (b+d) at the rear of the player.

It should be noted toward which direction (right front, right back, left front, left back in this embodiment) each load sensor 36*b* exists when viewed from the player can be grasped from the arrangement data which is decided in advance or set by the player so as to be stored as described above.

A memory area 526 stores an elapsed time counted by the elapsed time counting program. More specifically, an elapsed time from when a motion instruction at the first step of the step-up-and-down exercise is given to when it is determined that the motion is performed is stored as T1. For example, the time when the motion instruction is given is a time when the panel 400 of the motion starts to move into the frame 402, and the time when it is determined that the motion is performed is a time when a motion completion sound is output. Similarly, an elapsed time as to a motion at the second step is stored as T2, and an elapsed time as to a motion at the third step is stored as T3. Furthermore, as to an elapsed time T4 of a motion at the fourth step, an elapsed time from when a motion at the fourth step instruction is given to the present is stored.

A memory area 528 stores a panel stopping time PS indicating a time during which the instruction panel 400 is stopped. A memory area 530 stores the success-or-failure judgment time TA indicating a time limit for judging a motion to be currently executed. A memory area 532 stores the perfect judgment time Tp0, Tp1 for defining the perfect judgment area. The panel stopping time PS, the success-or-failure judgment time TA, and the perfect judgment time Tp0, Tp1 are read from the optical disk 18. In this embodiment, a common value suitable for the respective motions at the first to fourth steps is set in each of the PS, the TA, the Tp0 and the Tp1 such that the step-up-and-down exercise is performed at a constant rhythm. It should be noted that in another embodiment, different values for each motion may be set to the PS, the TA, the Tp0 and the Tp1.

A memory area 534 stores a result of the game. As a game result, a score of the player, an evaluation (perfect, OK or failure), etc. of the respective motions at the first to the fourth steps are stored.

Figure 16:
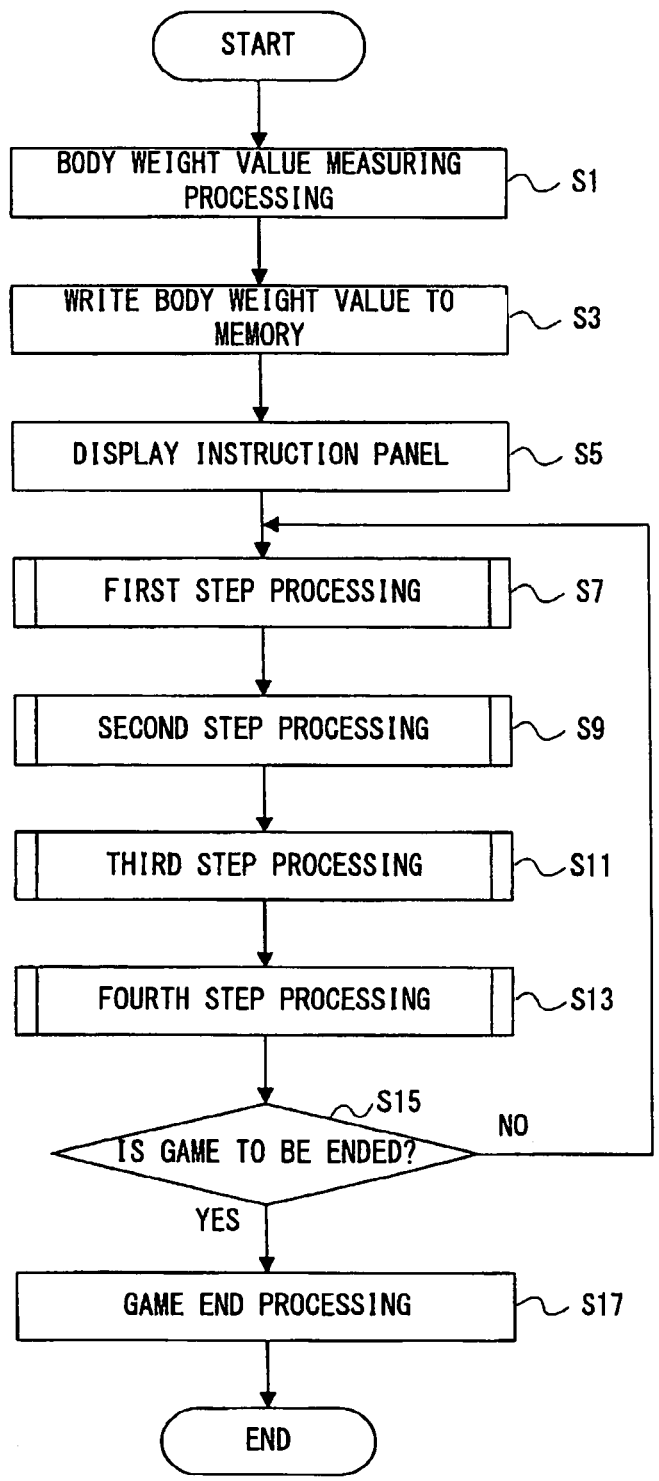
FIG. 16 is a flowchart showing one example of an operation of the game apparatus.

FIG. 16 shows one example of an operation of the game apparatus 12 when a step-up-and-down exercise is performed. In a step S1, the CPU 40 executes body weight value measuring processing. A load value of each load sensor 36*b* when the player calmly rides on the load controller 36 is detected. More specifically, the CPU 40 transmits a load obtaining command to the load controller 36 via the radio controller module 52, etc. In response thereto, the microcomputer 100 of the load controller 36 detects a load value of each of the load sensors 36*b*, and transmits input data including each of the load values to the game apparatus 12 via the wireless module 106, etc. The CPU 40 receives the input data including each of the load values via the radio controller module 52, etc., and detects each of the load values so as to store the same in the memory area 522. Then, a body weight value is calculated by summing all the load values of all the load sensors 36*b*. Additionally, a screen for instructing the player to ride on the load controller 36 with both feet may be displayed on the monitor 34.

In a succeeding step S3, the CPU 40 writes the body weight value to the external main memory 46. Thus, the body weight value of the player is stored in the memory area 518.

Then, in a step S5, the CPU 40 displays the instruction panels 400. More specifically, the CPU 40 generates a game screen shown in FIG. 12 including the instruction panels 400 by utilizing the GPU 42*b*, etc. of the system LSI 42 to display the same on the monitor 34. Here, as described above, each of the panels 400 for instructing each motion of the step-up-and-down exercise is displayed at a predetermined initial position at the top of the center of the screen in a predetermined order and downwardly moves toward the frame 402 while including a constant stopped time. The control of the movement from the time when the motion of each panel 400 becomes a motion to be currently executed is executed in processing for each motion, and therefore, in the step S5, the processing is executed until the instruction panel 400 at the first step is a motion to be executed, that is, the instruction panel 400 at the first step is stopped upwardly adjacent to the frame 402.

Figure 17:
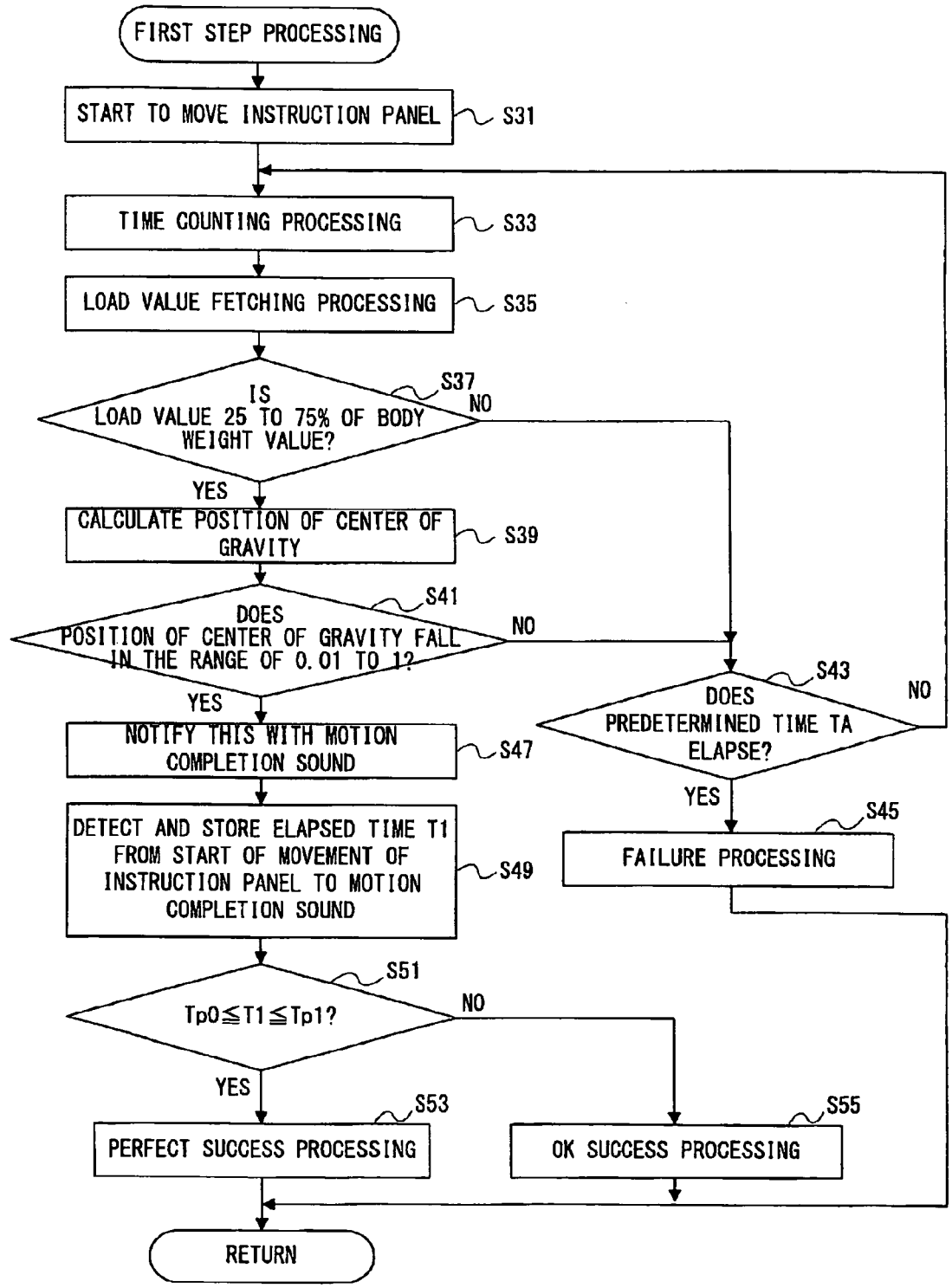
FIG. 17 is a flowchart showing one example of an operation of first step processing shown in FIG. 16.
Figure 18:
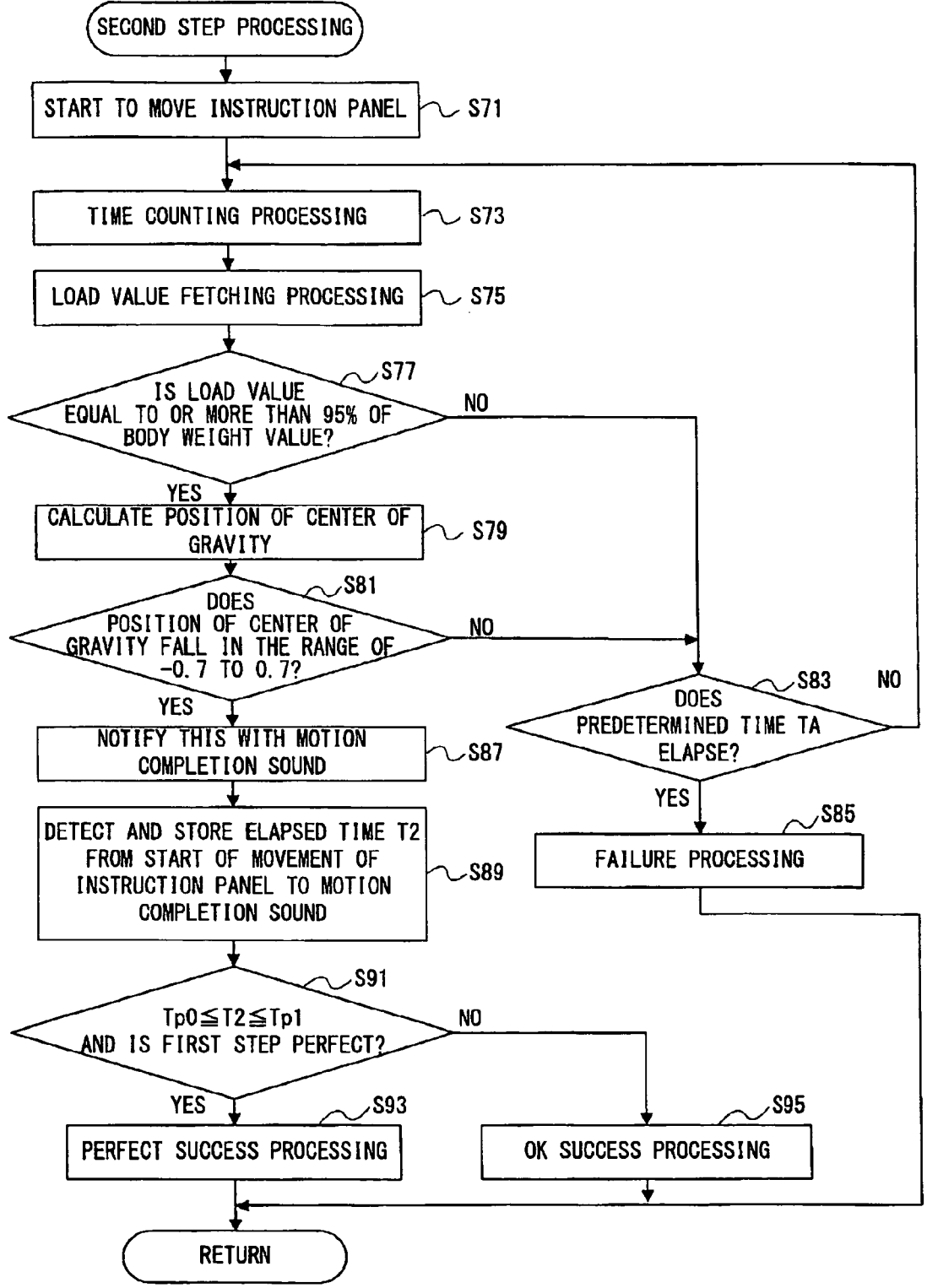
FIG. 18 is a flowchart showing one example of an operation of second step processing shown in FIG. 16.
Figure 19:
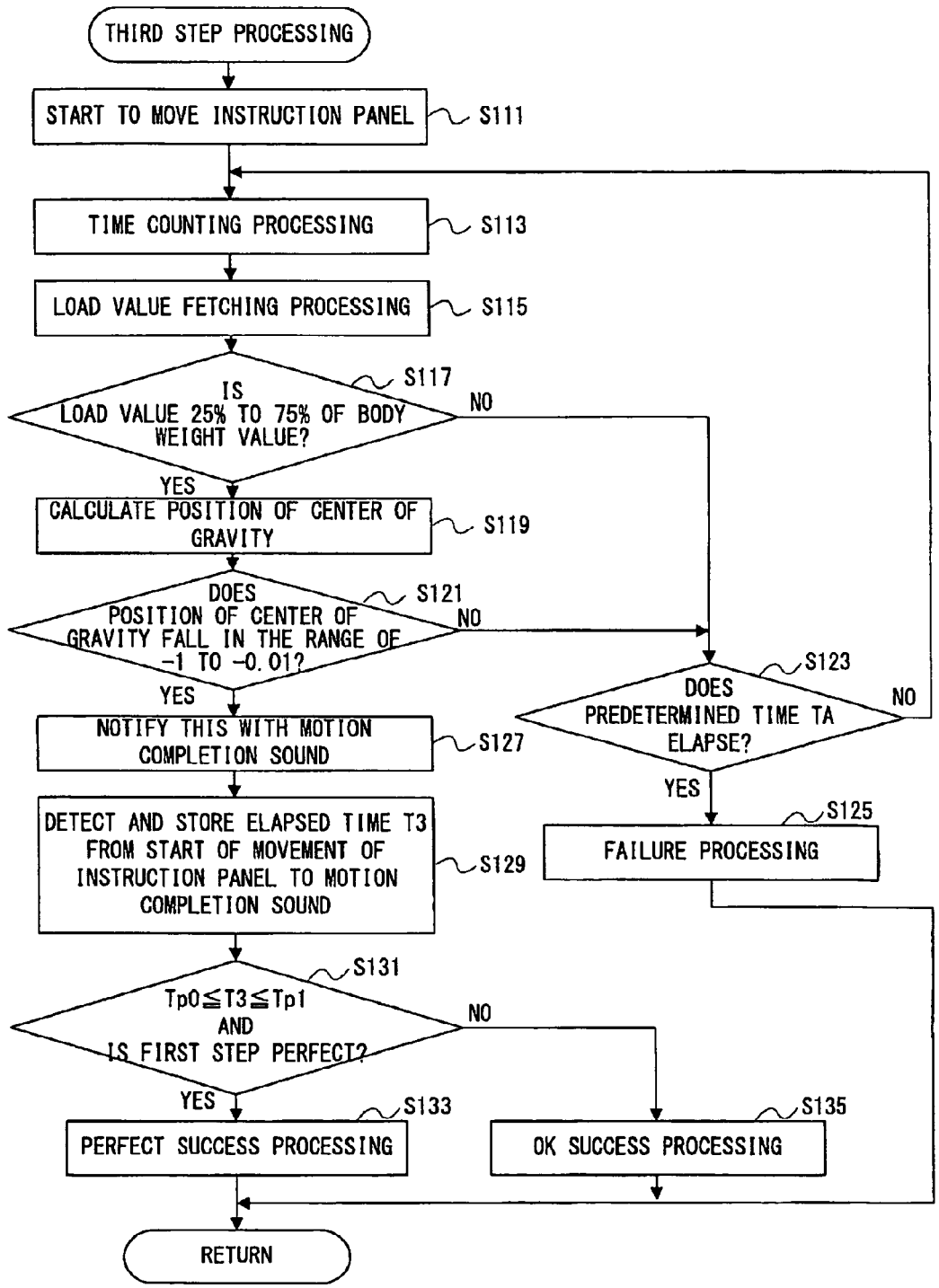
FIG. 19 is a flowchart showing one example of an operation of third step processing shown in FIG. 16.
Figure 20:
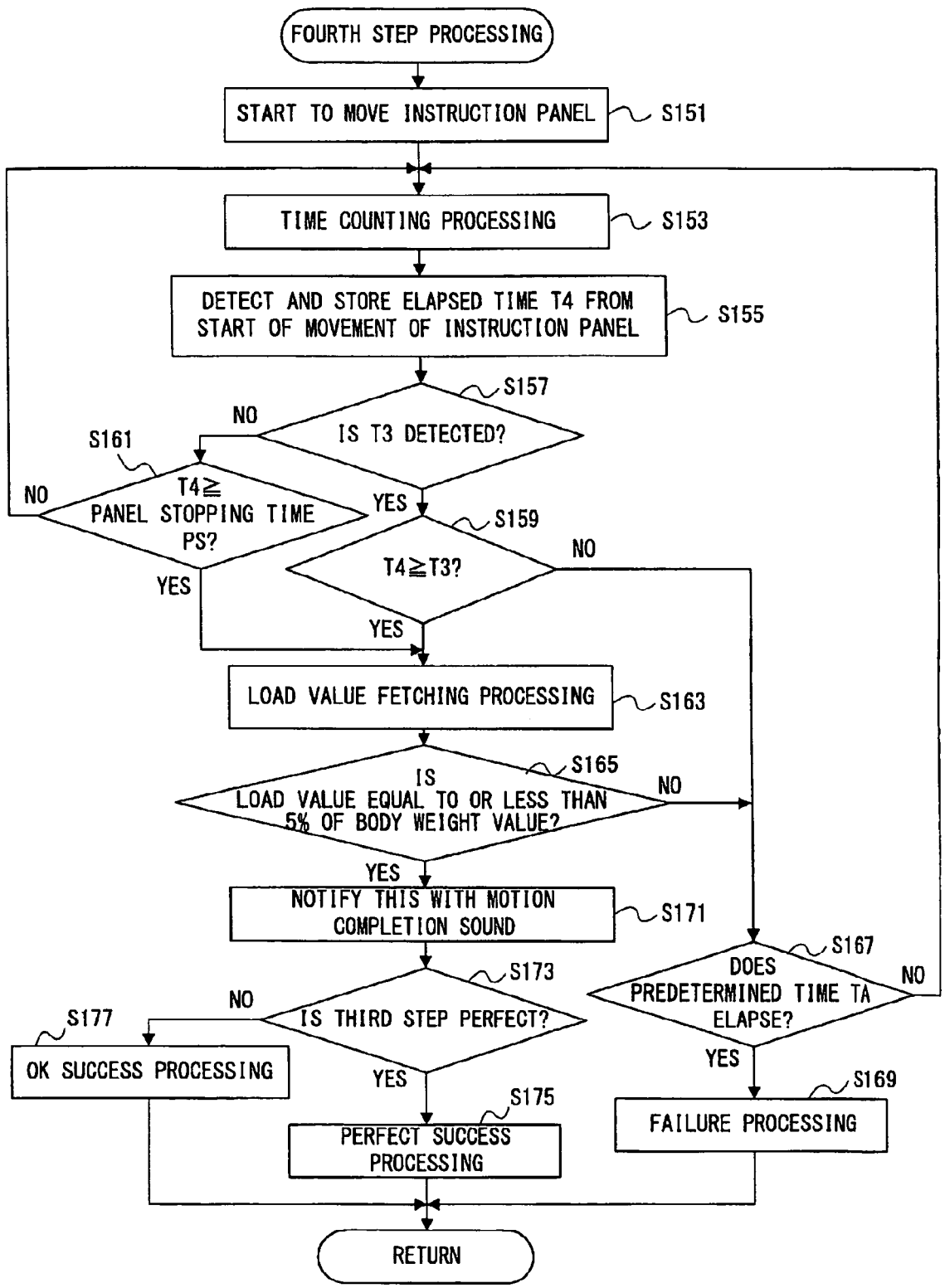
FIG. 20 is a flowchart showing one example of an operation of fourth step processing shown in FIG. 16.

Succeedingly, in a step S7, the CPU 40 executes first step processing for judging a motion at the first step of the step-up-and-down exercise. The detail of the first step processing is shown in FIG. 17 described later. Furthermore, in each of steps S9, S11 and S13, the CPU 40 executes second step processing for judging a motion at the second step, third step processing for judging a motion at the third step and fourth step processing for judging a motion at the fourth step. The detail of the second step processing, the third step processing and the fourth step processing are shown in FIG. 18, FIG. 19 and FIG. 20, respectively, described later.

In a step S15, the CPU 40 determines whether or not a game is to be ended. For example, it is determined whether or not the step-up-and-down exercise is performed for a predetermined time period or at a predetermined number of times. If "NO" in the step S15, the process returns to the step S7 to judge each of the motions of the step-up-and-down exercise again. On the other hand, in a case that it is determined that the game end condition is satisfied in the step S15, the CPU 40 executes game end processing in a step S17 to end the game processing of the step-up-and-down exercise. For example, the sum of the scores obtained by the successes of the respective motions of the step-up-and-down exercise is calculated, the score and a result of the evaluation corresponding to the score are displayed, and so forth.

FIG. 17 shows one example of an operation of the CPU 40 in the first step processing shown in the step S7. The first step of the step-up-and-down exercise is a motion of putting the right foot on the load controller 36 as shown in FIG. 11(A). When the first step processing is started, the CPU 40 starts movement processing of the instruction panels 400 according to the motion instructing program in a step S31. The panel 400 for instructing a motion at the first step is the panel 400a shown in FIG. 12. The movement processing of the panels 400 started in the step S1 is executed in parallel with other processing in FIG. 17. By the movement processing of the panels 400, the panel 400a moves into the frame 402 from the position upwardly adjacent to the frame 402. As shown in FIG. 13, the panel 400a is controlled such that the panel 400a is within the frame 402 when the predetermined time PS elapses from the start of the movement, and continues to be stopped within the frame 402 until the predetermined time TA elapses from the start of the movement.

The processing in succeeding steps S33-S43 is executed at a set intervals of times (one frame) until it is determined that a motion at the first step is performed on the basis of the load values in the step S41, or until it is determined that a motion at the first step is not performed within the time limit in the step S43.

In the step S33, the CPU 40 executes time counting processing. For example, by incrementing the time counter, the value of the time counter of the memory area 520 is updated. By the time counting processing, it is possible to count an elapsed time from when the motion instruction is given.

Furthermore, in the step S35, the CPU 40 executes load value fetching processing. More specifically, the CPU 40 transmits a load obtaining command to the load controller 36 via the radio controller module 52, etc. In response thereto, input data including the detected load values is transmitted from the load controller 36. The CPU 40 detects the load values of the respective load sensors 36b from the input data received by the wireless controller module 52, and stores the same in the memory area 522.

It is determined whether or not the instructed motion on the panel 400 is performed on the basis of the detected load values. The judgment of the motion is performed on the basis of a ratio of the load values to the body weight value, and a position of the center of gravity.

More specifically, in the step S37, the CPU 40 determines whether or not the load value is 25-75% of the body weight value. The load value compared with the condition here is a sum of the load values of the respective load sensors 36b stored in the memory area 522. The ratio of the sum of the load values to the body weight value in the memory area 518 is calculated, and it is determined whether or not the ratio is within the range of 25-75% as a judgment condition of the first step. The judgment condition relating to the ratio is set to an appropriate value by experiments in advance and stored. The motion at the first step in this embodiment is a motion of putting the right foot on the load controller 36. Here, when the motion of the right foot is performed, the left foot remains to be put on the ground, so that the half of all the player's weight is put on the load controller 36. Thus, in view of the difference of the balance of the loads put on the right and left feet due to a habit for each player, etc., if the sum of the detected loads is 25-75% of the body weight value, it can be determined that one foot is put on the load controller 36.

If "YES" in the step S37, that is, if the condition of the ratio of the load values is satisfied, the CPU 40 calculates a position of the center of gravity in order to perform the judgment of a condition of the position of the center of gravity in the step S39 and stores it in the memory area 524. The position of the center of gravity is calculated on the basis of the load values of the respective load sensors 36b stored in the memory area 522 according to the above-described Equation 1.

Then, in the step S41, the CPU 40 determines whether or not the position of the center of gravity falls in the range of 0.01 to 1 as a judgment condition at the first step. The motion at the first step in this embodiment is a motion of putting the right foot on the load controller 36, and the right foot is put on the right side of the load controller 36 when viewed from the player, and therefore, the position of the center of gravity appears on the right side of the load controller 36 when viewed from the player. Accordingly, if the calculated position of the center of gravity falls in the range of 0.01 to 1, it can be determined that the right foot is put on the load controller 36.

If "NO" in the step S41, that is, if the condition of the position of the center of gravity is not satisfied, it can be determined that the motion at the first step is not performed. Furthermore, if "NO" in the step S37, that is, if the condition of the ratio of the load values is also not satisfied, the same is true for this. In these cases, the CPU 40 determines whether or not the predetermined time TA elapses from the start of the movement of the panel in the step S43. The elapsed time from the start of the movement of the panel to the present can be fetched by the value of the time counter of the memory area 520. Furthermore, the predetermined time TA is a success-or-failure judgment time of the memory area 530, that is, a time limit. If "NO" in the step S43, that is, if the elapsed time falls within the time limit of the motion judgment at the first step, the process returns to the step S33. Accordingly, until the time limit expires, the motion judgment at the first step is continued on the basis of the detected load value.

On the other hand, if "YES" in the step S43, that is, if the time limit expires without the motion at the first step being performed, the CPU 40 executes failure processing in a step S45. Since it is determined that the player cannot perform the instructed motion at the first step by the panel 400, a score is not given to the player. Furthermore, data indicating the failure judgment as to the motion at first step is stored in the game result memory area 534. Alternatively, a failure of the motion may be displayed on the screen by letters of FAILURE, etc.

Furthermore, if "YES" in the step S41, that is, if it is determined that the motion at the first step is performed, the CPU 40 informs the player of this with a motion completion sound in a step S47. More specifically, the CPU 40 generates audio data for outputting a motion completion sound on the basis of predetermined sound data by utilizing the DSP 42c, etc., and outputs the sound from the speaker 34a via the AV IC 56, etc. Thus, the player is easily informed that the motion at the first step is successful.

In a succeeding step S49, the CPU 40 detects an elapsed time T1 from the start of the movement of the instruction panel 400 to the notification with the motion completion sound, that is, detects the elapsed time T1 from when the motion instruction is given to when it is determined that the motion is performed on the basis of the value of the time counter in the memory area 520, and stores the same in the memory area 526.

Then, in a step S51, the CPU 40 determines whether or not the elapsed time T1 is equal to or more than Tp0 and equal to or less than Tp1. The Tp0 and Tp1 are threshold values for a perfect judgment, and stored in the memory area 532. If "YES" in the step S51, that is, if the elapsed time T1 is a value within the perfect judgment area, the CPU 40 executes perfect success processing in a step S53. More specifically, a score higher than that in the OK judgment is given to the player, and is added to the score data of the player in the game result memory area 534. Furthermore, evaluation data indicating the perfect judgment as to the motion at the first step is also stored in the memory area 534. Additionally, the fact the motion is perfect may be displayed on the screen by letters of PERFECT, etc.

On the other hand, if "NO" in the step S51, that is, if the motion is not performed at timing within the perfect judgment area, the CPU 40 executes OK success processing in a step S55. More specifically, a score lower than that in the perfect judgment is given to the player, and is added to the score data of the player in the game result memory area 534. Furthermore, evaluation data indicating the OK judgment as to the motion at the first step is also stored in the memory area 534. Additionally, the fact the motion is OK may be displayed on the screen by letters of PERFECT, etc.

When the processing in the step S45, the step S53 or the step S55 is ended, the first step processing is ended, and the process proceeds to the second step processing in the step S9.

FIG. 18 shows one example of an operation of the CPU 40 in the second step processing in the step S9. The second step in the step-up-and-down exercise is a motion of putting the left foot on the load controller 36 as shown in FIG. 11(B).

Additionally, as shown in FIG. 13 described above, the instruction panel 400 stops when a predetermined time PS elapses from when it starts to move into the frame 402, and the instruction panel 400 starts to move outside the frame 402 when a further predetermined time TA elapses. At the same time, an instruction panel 400 of a next motion starts to move into the frame 402. That is, when the predetermined time TA elapses from when the previous panel 400 starts to move, the next panel 400 starts to move to thereby instruct the player to when to move. Accordingly, the second step processing is executed when the predetermined time TA elapses from the start of the movement of the instruction panel 400 in the first step processing. If the perfect success processing in the step S53 or the OK success processing in the step S55 is performed in the first step processing, execution of the second step processing is waited until the predetermined time TA elapses.

When starting the second step processing, the CPU 40 starts movement processing of the instruction panels 400 in a step S71. The movement processing of the panels 400 is similar to that in the above-described step S31. Here, the panel 400 for instructing a motion at the second step is the panel 400b shown in FIG. 12.

Processing in succeeding steps S73-S83 is executed at a set intervals of times (one frame) until it is determined that a motion at the second step is performed on the basis of the load value in the step S81, or it is determined that the motion at the second step is not performed within the time limit in the step S83.

In the step S73, the CPU 40 executes time counting processing similar to the above-described step S33. Furthermore, in the step S75, the CPU 40 executes load value fetching processing similar to the above-described step S35.

Then, in the step S77, the CPU 40 determines whether or not the load value is equal to or more than 95% of the body weight value. A judgment condition of a ratio of the load value to the body weight value with respect to the motion at the second step is set to equal to or more than 95% in advance. The motion at the second step is a motion of further putting the left foot on the load controller 36 from a state the right foot is put thereon, and when the motion at the second step is completed, almost all the player's weight is put on the load controller 36. If the sum of the detected loads is equal to or more than 95% of the body weight value, it can be determined that both of the feet are put on the load controller 36.

If "YES" in the step S77, the CPU 40 calculates a position of the center of gravity similar to the above-described step S39 in the step S79. Then, in the step S81, the CPU 40 determines whether or not the position of the center of gravity falls in the range of −0.7 to 0.7 as a judgment condition of the second step. By the motion at the second step, both of the feet are put on the load controller 36, so that the position of the center of gravity appears at approximately the center of the load controller 36. Accordingly, in view of the difference in the position of the center of gravity due to a habit for each player, etc., if the calculated position of the center of gravity falls in the range of −0.7 to 0.7, it can be determined that the motion at the second step is completed and both of the feet are put on the load controller 36.

If "NO" in the step S81, or if "NO" in the step S77, it can be determined that the motion at the second step is not performed. In these cases, the CPU 40 determines whether or not the predetermined time TA elapses from the start of the movement of the panel similar to the above-described step S43 in the step S83. If "NO" in the step S83, the process returns to the step S73.

On the other hand, if "YES" in the step S83, that is, if the time limit expires without execution of the motion at the second step being determined, the CPU 40 executes failure processing similar to the above-described step S45 in a step S85. Here, since the motion judgment is as to the second step, the evaluation data indicating a failure judgment as to the motion at the second step is stored in the game result memory area 534.

Furthermore, if "YES" in the step S81, that is, if it is determined that the motion at the second step is performed, the CPU 40 informs this with a motion completion sound similar to the above-described step S47 in a step S87.

In a succeeding step S89, the CPU 40 detects an elapsed time T2 from the start of the movement of the instruction panel 400 at the second step to the notification with the motion completion sound, that is, detects the elapsed time T2 from when the instruction of the motion at the second step is given to when it is determined the motion is performed on the basis of the value of the time counter of the memory area 520, and stores the same in the memory area 526.

Then, in a step S91, the CPU 40 determines whether or not the elapsed time T2 is equal to or more than Tp0 and equal to or less than Tp1, and whether or not the determination result at the first step is perfect. In this embodiment, in order to obtain the perfect judgment at the second step, the perfect judgment is required to be obtained at the first step as well as the timing when the motion at the second step is performed is within the perfect judgment area. More specifically, it is determined whether or not the elapsed time T2 falls in the perfect judgment area. In addition, with reference to the evaluation data as to the first step stored in the game result memory area 534, it is determined whether the data indicating the perfect judgment or not.

If "YES" in the step S91, that is, if the perfect judgment is performed as to the second step, the CPU 40 executes perfect success processing similar to the above-described step S53 in a step S93. Here, since the motion judgment is as to the second step, the evaluation data indicating the perfect judgment as to the motion at the second step is stored in the game result memory area 534.

On the other hand, if "NO" in the step S91, the CPU 40 executes OK success processing similar to the above-described step S55 in a step S95. Here, since the motion judgment is as to the second step, the evaluation data indicating the OK judgment as to the motion at the second step is stored in the game result memory area 534.

After completion of the step S85, the step S93 or the step S95, the second step processing is ended, and the process proceeds to the third step processing in the step S11.

FIG. 19 shows one example of an operation of the CPU 40 of the third step processing in the step S11. The third step in the step-up-and-down exercise is a motion of putting the right foot down from the load controller 36 from a state that both of the feet are put on the load controller 36 as shown in FIG. 11(C).

Additionally, the third step processing is executed after the predetermined time TA elapses from the start of the movement of the previous instruction panel 400 similar to the above-described second step processing.

When the third step processing is started, in a step S111, the CPU 40 starts movement processing of the instruction panels 400. The movement processing of the panels 400 is similar to that in the above-described step S31. Here, the panel 400 for instructing the motion at the third step is the panel 400c shown in FIG. 12.

The processing in succeeding steps S113-S123 is executed at a set intervals of times (one frame) until it is determined that a motion at the third step is performed on the basis of the load value in the step S121, or it is determined that the motion at the third step is not performed within the time limit in the step S123.

In the step S113, the CPU 40 executes time counting processing similar to the above-described step S33. Furthermore, in the step S115, the CPU 40 executes load value fetching processing similar to the above-described step S35.

Then, in the step S117, the CPU 40 determines whether or not the load value is 25 to 75% of the body weight value similar to the above-described step S37. A judgment condition of a ratio of the load value to the body weight value with respect to the third step is set to 25 to 75% in advance. The motion at the third step is a motion of putting the right foot down from the load controller 36 from a state that both of the feet are put on the load controller 36. When the motion at the third step is completed, the right foot is put on the ground, so that the load of the left foot is only put on the load controller 36. Accordingly, if the sum of the detected loads is 25 to 75% of the body weight value, it can be determined that the right foot is put down from the load controller 36. Here, similar to the motion at the first step, by the motion at the third step, one foot is put on the load controller 36 in a state that the other foot is put on the ground, the condition of the ratio of the load value at the third step is the same as that in the above-described first step.

If "YES" in the step S117, the CPU 40 calculates a position of the center of gravity similar to the above-described step S39 in the step S119. Then, in the step S121, the CPU 40 determines whether or not the position of the center of gravity falls in the range of −1 to −0.01 as the judgment condition of the third step. By the motion at the third step, the right foot is put down from the load controller 36, and only the left foot remains on the load controller 36, so that the position of the center of gravity appears on the left side of the load controller 36 when viewed from the player. Accordingly, if the calculated position of the center of gravity falls in the range of −1 to −0.01, it can be determined that the motion at the third step is completed, and the right foot is put down.

If "NO" in the step S121, or if "NO" in the step S117, it can be determined that the motion at the third step is not performed. In these cases, the CPU 40 determines whether or not the predetermined time TA elapses from the start of the movement of the panel similar to the above-described step S43 in the step S123. If "NO" in the step S123, the process returns to the step S113.

On the other hand, if "YES" in the step S123, that is, if the time limit expires without execution of the motion at the third step being determined, the CPU 40 executes failure processing similar to the above-described step S45 in a step S125. Here, since the motion judgment is as to the third step, the evaluation data indicating a failure judgment as to the motion at the third step is stored in the game result memory area 534.

Furthermore, if "YES" in the step S121, that is, if it is determined the motion at the third step is performed, the CPU 40 notifies this with a motion completion sound similar to the above-described step S47 in a step S127.

In a succeeding step S129, the CPU 40 detects an elapsed time T3 from the start of the movement of the instruction panel 400 at the third step to the notification with the motion completion sound, that is, detects the elapsed time T3 from when the instruction of the motion at the third step is given to when it is determined that the motion is performed on the basis of the value of the time counter of the memory area 520, and stores the same in the memory area 526. The judgment timing of the motion at the third step is utilized as a judgment timing of a motion at the fourth step.

Then, in a step S131, the CPU 40 determines whether or not the elapsed time T3 is equal to or more than Tp0 and equal to or less than Tp1, and whether or not the determination result at the first step is perfect similar to the above-described step S91. In this embodiment, in order to obtain the perfect judgment at the third step, it is necessary that the timing when the motion at the third step is performed is within the perfect judgment area, and the perfect judgment is obtained at the first step.

If "YES" in the step S131, that is, if the perfect judgment is performed with respect to the motion at the third step, the CPU 40 executes perfect success processing similar to the above-described step S53 in a step S133. Here, since the motion judgment is as to the third step, the evaluation data indicating the perfect judgment as to the motion at the third step is stored in the game result memory area 534.

On the other hand, if "NO" in the step S131, the CPU 40 executes OK success processing similar to the above-described step S55 in a step S135. Here, since the motion judgment is as to the third step, the evaluation data indicating the OK judgment as to the motion at the third step is stored in the game result memory area 534.

After completion of the step S125, the step S133 or the step S135, the third step processing is ended, and the process proceeds to the fourth step processing in the step S13.

FIG. 20 shows one example of an operation of the CPU 40 in the fourth step processing in the step S13. The fourth step of the step-up-and-down exercise is a motion of putting the left foot down from the load controller 36 as shown in FIG. 11(D) to thereby bring about the state that both of the feet are put down on the ground.

Additionally, the fourth step processing is executed after the predetermined time TA elapses from the start of the movement of the previous instruction panel 400 similar to the above-described second step processing and third step processing.

When the fourth step processing is started, the CPU 40 starts movement processing of the instruction panels 400 in a step S151. The movement processing of the panels 400 is similar to that in the above-described step S31. Here, the panel 400 for instructing the motion at the fourth step is the panel 400d shown in FIG. 12.

The processing in succeeding steps S153-S167 is executed at a set intervals of times (one frame) until it is determined that a motion at the fourth step is performed on the basis of the load value in the step S165, or it is determined that the motion at the fourth step is not performed within the time limit in the step S167.

In the step S153, the CPU 40 executes time counting processing similar to the above-described step S33. Then, in the step S155, the CPU 40 detects an elapsed time T4 from the start of the movement of the instruction panel 400 at the fourth step on the basis of the value of the time counter in the memory area 520 and stores the same in the memory area 526. The judgment timing of the motion at the fourth step is decided on the basis of the elapsed time T4 described above.

In the succeeding step S157, the CPU 40 determines whether or not the elapsed time T3 is detected with reference to the memory area 526. If "YES" in the step S157, that is, if it is determined that the motion at the third step is performed, the judgment timing of the motion at the third step is utilized as a judgment timing of a motion at the fourth step in FIG. 14 described above. Accordingly, in the step S159, the CPU 40 determines whether or not the elapsed time T4 is equal to or more than the elapsed time T3, that is, whether or not the elapsed time T4 becomes the judgment timing of the motion.

On the other hand, if "NO" in the step S157, that is, if it is not determined that the motion at the third step is performed, it is impossible to determine the judgment timing of the motion at the fourth step on the basis of the judgment timing of the motion at the third step. Thus, as described above, by utilizing the panel stopping time PS set to be timing suitable for the motion of stepping up and down, it is determined whether or not the judgment timing of the motion at the fourth step has come. That is, in the step S161, it is determined whether or not the elapsed time T4 is equal to or more than the panel stopping time PS. If "NO" in the step S161, since the judgment timing of the motion at the fourth step has not come, the process returns to the step S153.

Furthermore, if "YES" in the step S159 or if "YES" in the step S161, that is, if the judgment timing of the motion at the fourth step has come, the CPU 40 executes load value fetching processing similar to the above-described step S35 in the step S163.

Then, in the step S165, the CPU 40 determines whether or not the load value is equal to or less than 5% of the body weight value similar to the above-described step S37. A judgment condition of a ratio of the load value to the body weight value with respect to the fourth step is set to be equal to or less than 5% in advance. The motion at the fourth step is a motion of putting the left foot down from the load controller 36. When the motion at the fourth step is completed, both of the feet are put on the ground, so that the load put on the load controller 36 is substantially zero. Thus, when it is determined that the judgment timing of the motion at the fourth step has come on the basis of the elapsed time, if the sum of the detected loads is equal to or less than 5% of the body weight value, it can be determined that the left foot is put down from the load controller 36.

Here, since the motion at the fourth step is performed to bring about a state that the feet of the player is not put on the load controller 36, in the judgment of the motion at the fourth step, only the condition of the ratio of the load value to the body weight value is taken into account without seeing position of the center of gravity.

On the other hand, if "NO" in the step S165, it can be determined that the motion at the fourth step is not performed. Furthermore, if "NO" in the step S159, since the elapsed time T4 has not reached the judgment timing of the motion, the motion judgment on the basis of the load value is not performed. In these cases, the CPU 40 determines whether or not the predetermined time TA elapses from the start of the movement of the panel similar to the above-described step S43 in the step S167. That is, it is determined whether or not the elapsed time T4 is equal to or more than the predetermined time TA. If "NO" in the step S167, that is, if the elapsed time T4 is within the time limit of the motion at the fourth step, the process returns to the step S153.

On the other hand, if "YES" in the step S167, that is, if the time limit expires without execution of the motion at the fourth step being determined, the CPU 40 executes failure processing similar to the above-described step S45 in a step S169. Here, since the motion judgment is as to the fourth step, the evaluation data indicating the failure judgment as to the motion at the fourth step is stored in the game result memory area 534.

Furthermore, if "YES" in the step S165, that is, if it is determined that the motion at the fourth step is performed, the CPU 40 notifies this with a motion completion sound similar to the above-described step S47 in a step S171.

In a succeeding step S173, the CPU 40 determines whether or not the determination result at the third step is perfect on the basis of the evaluation data at the third step in the game result memory area 534. Here, in this embodiment, in order to obtain the perfect judgment at the fourth step, it is necessary to obtain the perfect judgment at the third step. Since whether or not the judgment timing of the motion at the fourth step is decided on the basis of the judgment timing of the motion at the third step or the panel stopping time PS, it is not determined whether or not the timing when the motion at the fourth step is performed is within the perfect judgment area.

If "YES" in the step S173, that is, if the perfect judgment is performed as to the motion at the fourth step, the CPU 40 executes perfect success processing similar to the above-described step S53 in a step S175. Here, since the motion judgment is as to the fourth step, the evaluation data indicating the perfect judgment as to the motion at the fourth step is stored in the game result memory area 534.

On the other hand, if "NO" in the step S173, the CPU 40 executes OK success processing similar to the above-described step S55 in a step S177. Here, since the motion judgment is as to the fourth step, the evaluation data indicating the OK judgment as to the motion at the fourth step is stored in the game result memory area 534.

After completion of the step S169, the step S175 or the step S177, the fourth step processing is ended, and the process proceeds to the step S15 in FIG. 16.

According to this embodiment, since the judgment timing of the motion at the fourth step of putting the left foot down from the load controller 36 to bring about a state that both of the feet are not put on is decided on the basis of the elapsed time from when the instruction of the motion at the fourth step is given, it is possible to suitably decide the judgment timing of the motion by the player, and thus determine whether or not the motion is performed.

Furthermore, the judgment timing of the motion at the fourth step is judged on the basis of the judgment timing of the motion at the third step of only putting one foot down from the load controller 36 from a state that both of the feet are put thereon, it is possible to make a proper judgment with the simple processing.

In addition, in a case that it is not determined whether or not the motion at the third step is performed, the judgment timing of the motion at the fourth step is decided on the basis of the panel stopping time PS suitably set for the motion, it is possible to perform an appropriate judgment on the basis of the suitable time set in advance.

Figure 21:
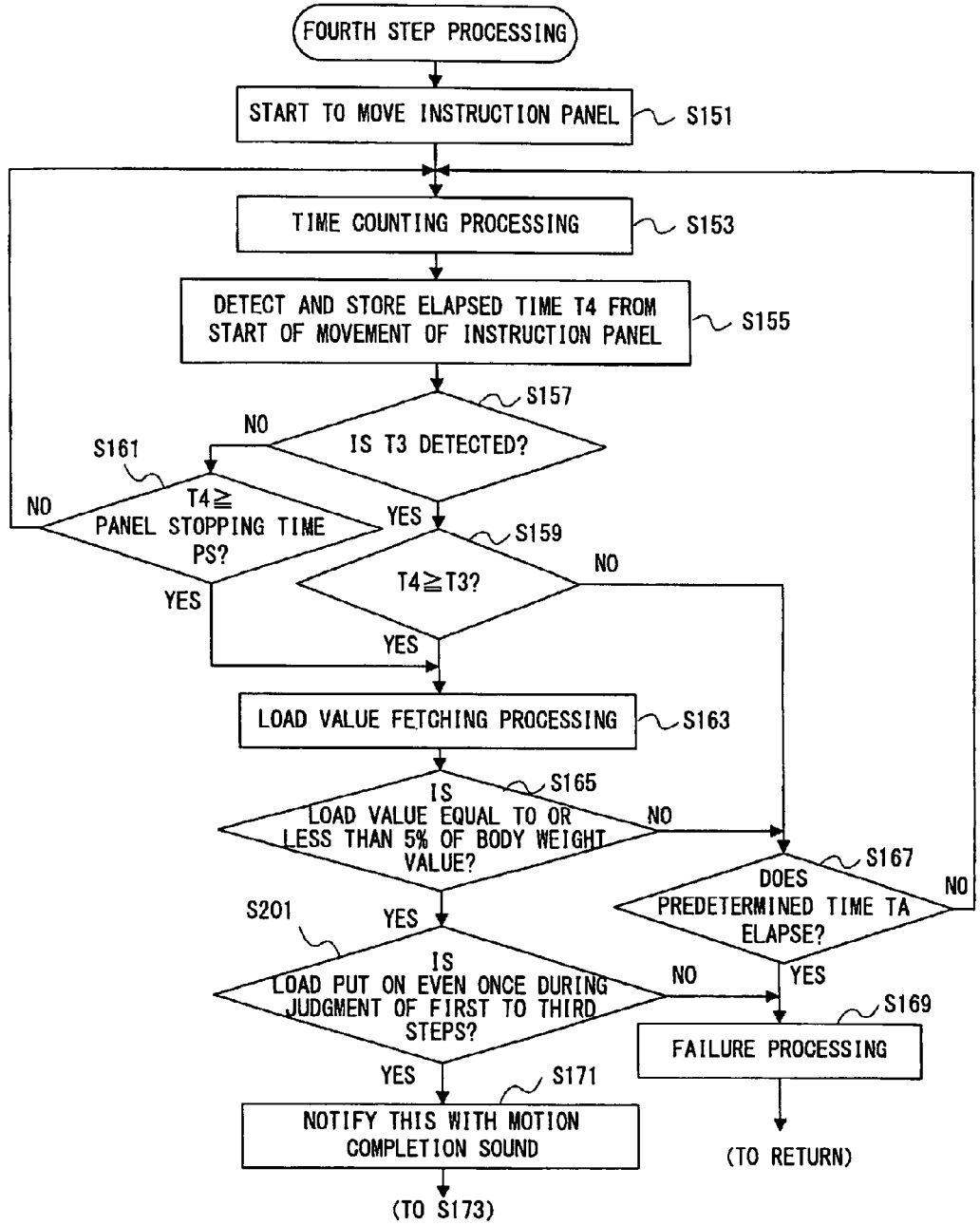
FIG. 21 is a flowchart showing a part of an operation of the fourth step processing in another embodiment.

Additionally, in the above-described embodiment, since a motion at the fourth step is a motion of putting both of the feet down from the controller, the fact that the load values detected at the judgment timing at the fourth step are approximately zero is a condition for deciding that the fourth step is successful. However, in another embodiment, whether or not a load is put on even once during the judgment of the first to third steps may be decided as a condition for a success of the fourth step. FIG. 21 shows one example of an operation of the fourth step processing in this case. Additionally, FIG. 21 is a modification obtained by modifying a part of the operation shown in FIG. 20, and is the same as FIG. 20 except that processing in a step S201 is added between the step S165 and the step S171. Furthermore, in FIG. 21, the processing of the steps S173-S177 (see FIG. 20) to be executed after the step S171 is omitted.

If "YES" in the step S165 in FIG. 21, that is, if the condition of the load value at the fourth step is satisfied, the CPU 40 determines whether or not a load is put on even once during the judgment of the first to third steps in the step S201. More specifically, it is determined whether or not "YES" is determined in the step S37 of the first step processing in FIG. 17, whether or not "YES" is determined in the step S77 of the second step processing in FIG. 18, or whether or not "YES" is determined in the step S117 of the third step processing in FIG. 19. If "YES" in the step S201, it is understood that the player rides on the load controller 36 at least once during the judgments at the first to third steps irrespective of whether or not each of the motions at the first to third steps is successful, and the player puts both of the feet down from the load controller 36 at the judgment timing of the fourth step. Accordingly, in this embodiment, if "YES" in the step S201, it is regarded that the motion at the fourth step of putting both of the feet down is successful, and the process proceeds to the step S171.

On the other hand, if "NO" in the step S201, it is regarded that the player does not ride on the load controller 36 during the judgment of the first to third step, and the motion at the fourth step is unsuccessful, and the process proceeds to step S169.

According to the embodiment in FIG. 21, it is possible to give a score if the player makes at least a motion of riding on and down the load controller 36, and it is possible to prevent a score from being given even though the player has never ridden on the load controller 36.

Furthermore, in each of the above-described embodiments, the judgment timing of a motion at the fourth step is decided on the basis of the judgment timing (elapsed time T3) of a motion at the third step. However, in another embodiment, an average value of the judgment timings (T1, T2 and T3) of the respective motions from the first to third steps, and the judgment timing of the motion at the fourth step may be decided on the basis of the average value. Or, the judgment timings (T3) at the third step detected in the past, that is, the histories of the judgment timing T3 at the third step are stored, and the judgment timing of the motion at the fourth step may be decided on the basis of the average value of the judgment timings at the third step in the past. If so, it is possible to accurately decide the judgment timing at the fourth step. In addition, it is possible to solve the problem that the judgment timing at the fourth step cannot be accurately judged if it is not determined that a motion at the third step directly before is performed.

Figure 22:
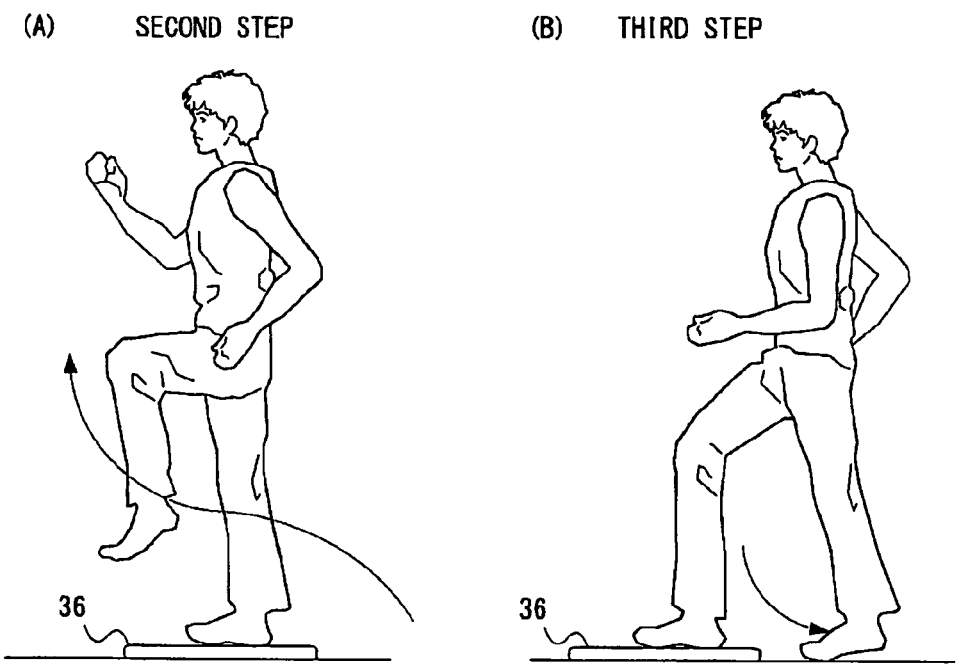
FIG. 22 is an illustrative view showing motions at the second and third steps when lifting a left thigh is included at the second step of the step-up-and-down exercise shown in FIG. 11.

Furthermore, in each of the above-described embodiments, a motion of the step-up-and-down exercise is determined, but a motion instructed to the player can arbitrarily be changed. For example, as shown in FIG. 22, a thigh lifting motion may be incorporated. As shown in FIG. 22(A), a motion of riding on the load controller 36 only with the right foot with the left thigh lifted without the left foot not being touched with the load controller 36 at the second step may be instructed. In this case, as shown in FIG. 22(B), a motion at the third step is a motion of putting the left foot lifted at the second step down on the ground.

Figure 23:
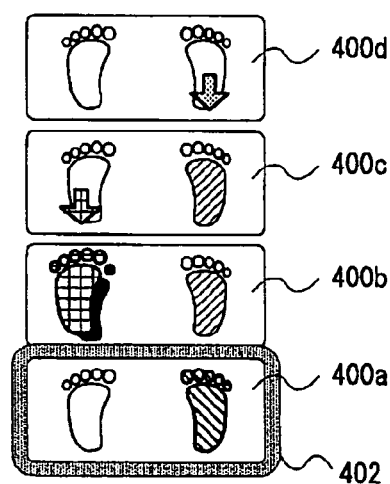
FIG. 23 is an illustrative view showing one example of panels in a case of the motion shown in FIG. 22.

FIG. 23 shows one example of the panel 400 to be displayed on the screen in a case that the motion of lifting a thigh is incorporated. As described above, since the motion of the normal step-up-and-down exercise is shown by means of red, the motion in relation to lifting the thigh is shown by means of a different color, such as green, for example. More specifically, a panel 400b at the second step is for instructing to raise the left thigh, and the color of the left foot print is shown by green, for example. In addition, in order to show that the foot is completely lifted, the left foot print is shaded. Furthermore, a panel 400c at the third step is for instructing a motion of putting the lifted left thigh down, and a green down arrow is drawn on the left foot print, for example. Additionally, a panel 400a at the first step is the same as the panel 400a at the first step of the normal step-up-and-down exercise shown in FIG. 12, is for instructing a motion of putting the right foot on, and the right foot print is shown by red. Furthermore, a panel 400d at the fourth step is for instructing to put the right foot down, and a red down arrows is drawn on the right foot print.

At a judgment of the motion at the second step, in the step S77 of the second step processing shown in FIG. 18, it is determined whether or not the load value is equal to or more than 100% of the body weight value, and in the step S81, it is determined whether or not a position of the center of gravity falls in the range of –0.3 to +1.0. When a motion of lifting a thigh is performed, a pivot foot is depressed, so that a load above the body weight value is put on. Accordingly, the fact that a load value larger than that when both feet are merely put on the load controller 36, that is, larger than the body weight value is detected is set as a judgment condition. Furthermore, since the instruction of the motion at the third step brings about the state that the right foot is put on the load controller 36, and the left foot is put on the ground, the judgment condition with respect to the motion at the third step may be set the same as that of the motion at the first step.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer readable storage medium storing a load detecting program to be executed by a computer of a load detecting apparatus having a support board allowing a player to put feet on, wherein said load detecting program causes said computer to perform functionality comprising:
   detecting a load value applied to said support board;
   instructing said player to perform at least a first motion and a second motion;
   deciding whether or not a motion judgment timing has come for the second motion the basis of a result of a measurement of an elapsed time of completion of the first motion, the first motion being different from the second motion, and determining whether or not said second motion is performed on the basis of the detected load value and said motion judgment timing using the measured elapsed time.

2. The non-transitory computer readable storage medium storing a load detecting program according to claim 1, wherein said load detecting program causes said computer to further perform functionality comprising:
  determining whether or not the detected load value becomes a predetermined state,
  instructing said player to perform the first motion,
  counting the elapsed time from when said instruction of the first motion is given, and
  deciding that said motion judgment timing has come when the elapsed time from the instruction of said second motion reaches the elapsed time from when the instruction of said first motion is given to when said load value becomes the predetermined state.

3. The non-transitory computer readable storage medium storing a load detecting program according to claim 2, wherein
  said motion judgment timing is decided to have come in a case when the load value does not become the predetermined state from the instruction of said first motion, when the elapsed time from the instruction of said second motion becomes a predetermined time.

4. The non-transitory computer readable storage medium storing a load detecting program according to claim 2, wherein
  said second motion is a motion, from a state that one foot of said player is put on said support board and the other foot is put on a ground, of putting said one foot down from said support board, and said first motion is a motion of putting only one foot down from said support board from a state that said player rides on said support board.

5. The non-transitory computer readable storage medium storing a load detecting program according to claim 1, wherein said load detecting program causes said computer to further perform functionality comprising notifying the player that said second motion is performed when said second motion is performed.

6. A load detecting apparatus comprising a support board allowing a player to put feet on, the load detecting apparatus configured to:
  detect a load value applied to said support board;
  instruct said player to perform at least a first motion and a second motion;
  decide whether or not a motion judgment timing has come for the second motion on the basis of a result of a measurement of an elapsed time of completion of the first motion, the first motion being different from the second motion; and
  determine whether or not said second motion is performed on the basis of the detected load value and said motion judgment timing using the measured elapsed time.

7. A load detecting method for processing load data in a load detecting apparatus having a support board allowing a player to put feet on, the method comprising:
  detecting a load value applied to said support board;
  instructing said player to perform at least a first motion and a second motion;
  deciding whether or not a motion judgment timing has come for the second motion on the basis of a result of a measurement of an elapsed time of completion of the first motion, the first motion being different from the second motion; and
  determining whether or not said second motion is performed on the basis of the detected load value and said motion judgment timing using the measured elapsed time.

8. A load detecting system having a support board allowing a player to put feet on, the load detecting system comprising:
  a processing system having at least one processor, the processing system configured to:
    detect a load value applied to said support board,
    instruct said player to perform at least a first motion and a second motion,
    decide whether or not a motion judgment timing has come for the second motion on the basis of a result of a measurement of an elapsed time of completion of the first motion, the first motion being different from the second motion, and
    determine whether or not said second motion is performed on the basis of the detected load value and said motion judgment timing using the measured elapsed time.

9. The load detecting apparatus of claim 6, further configured to:
  determine whether or not the detected load value becomes a predetermined state,
  instruct said player to perform the first motion,
  count the elapsed time from when said instruction of the first motion is given, and
  decide that said motion judgment timing has come when the elapsed time from the instruction of said second motion reaches the elapsed time from when the instruction of said first motion is given to when the load value becomes the predetermined state.

10. The load detecting apparatus of claim 9, wherein
  said motion judgment timing is decided to have come in a case when the load value does not become the predetermined state from the instruction of said first motion, when the elapsed time from the instruction of said second motion becomes a predetermined time.

11. The load detecting apparatus of claim 9, wherein
  said second motion is a motion, from a state that one foot of said player is put on said support board and the other foot is put on a ground, of putting said one foot down from said support board, and said first motion is a motion of putting only one foot down from said support board from a state that said player rides on said support board.

12. The load detecting method of claim 7, further comprising:
  determining whether or not the detected load value becomes a predetermined state;
  instructing said player to perform the first motion;
  counting the elapsed time from when said instruction of the first motion is given; and
  deciding that said motion judgment timing has come when the elapsed time from the instruction of said second motion reaches the elapsed time from when the instruction of said first motion is given to when said load value becomes the predetermined state.

13. The load detecting method of claim 12, wherein
  said motion judgment timing is decided to have come in a case when the load value does not become the predetermined state from the instruction of said first motion, when the elapsed time from the instruction of said second motion becomes a predetermined time.

14. The load detecting method of claim 12, wherein
  said second motion is a motion, from a state that one foot of said player is put on said support board and the other foot is put on a ground, of putting said one foot down from said support board, and said first motion is a motion of putting only one foot down from said support board from a state that said player rides on said support board.

15. The load detecting system of claim 8, wherein the processing system is further configured to:
determine whether or not the detected load value becomes a predetermined state;
instruct said player to perform the first motion;
count the elapsed time from when said instruction of the first motion is given; and
decide that said motion judgment timing has come when the elapsed time from the instruction of said second motion reaches the elapsed time from when the instruction of said first motion is given to when said load value becomes the predetermined state.

16. The load detecting system of claim 15, wherein said motion judgment timing is decided to have come in a case when the load value does not become the predetermined state from the instruction of said first motion, when the elapsed time from the instruction of said second motion becomes a predetermined time.

17. The load detecting system of claim 15, wherein said second motion is a motion, from a state that one foot of said player is put on said support board and the other foot is put on a ground, of putting said one foot down from said support board, and said first motion is a motion of putting only one foot down from said support board from a state that said player rides on said support board.

18. A load detecting system having a support board allowing a player to put feet on, the load detecting system comprising:
a processing system having at least one processor, the processing system configured to:
instruct a player to perform a first motion using said support board,
determine if the player performed the first motion based on a first load value obtained from said support board,
measure an amount of time taken from when the player was instructed to perform the first motion to when the player completed the first motion,
instruct the player to perform a second motion using said support board, and
determine whether the second motion has been performed based on a second load value obtained from said support board and the measured amount of time taken from when the player was instructed to perform the first motion to when the player completed the first motion.

* * * * *